(12) United States Patent
Liu et al.

(10) Patent No.: US 12,277,252 B2
(45) Date of Patent: Apr. 15, 2025

(54) APPLICATION INFORMATION DISPLAY METHOD AND RELATED DEVICE

(71) Applicant: Huawei Technologies Co., Ltd., Shenzhen (CN)

(72) Inventors: Lin Liu, Beijing (CN); Lei Wang, Shenzhen (CN); Wenjun Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 17/905,608

(22) PCT Filed: Mar. 4, 2021

(86) PCT No.: PCT/CN2021/078973
§ 371 (c)(1),
(2) Date: Sep. 2, 2022

(87) PCT Pub. No.: WO2021/175272
PCT Pub. Date: Sep. 10, 2021

(65) Prior Publication Data
US 2023/0110015 A1    Apr. 13, 2023

(30) Foreign Application Priority Data
Mar. 6, 2020    (CN) .......................... 202010153658.1

(51) Int. Cl.
*G06F 21/62*    (2013.01)
(52) U.S. Cl.
CPC ................... *G06F 21/629* (2013.01)

(58) Field of Classification Search
USPC .......................................... 726/26
See application file for complete search history.

(56) References Cited

U.S. PATENT DOCUMENTS

| | | | |
|---|---|---|---|
| 2010/0175104 A1 | 7/2010 | Khalid | |
| 2012/0242603 A1* | 9/2012 | Engelhardt | G06F 21/32 345/173 |
| 2014/0082534 A1* | 3/2014 | Cleron | G06F 3/04883 715/764 |
| 2014/0317759 A1* | 10/2014 | Lee | G06F 3/0483 726/28 |
| 2015/0334219 A1* | 11/2015 | Soundararajan | H04M 1/72403 455/414.1 |

(Continued)

FOREIGN PATENT DOCUMENTS

| | | |
|---|---|---|
| CN | 101910992 A | 12/2010 |
| CN | 104866323 A | 8/2015 |

(Continued)

*Primary Examiner* — Sanchit K Sarker
(74) *Attorney, Agent, or Firm* — Slater Matsil, LLP

(57) ABSTRACT

This application discloses an application information display method and a related device. The method includes: An electronic device detects an update event of application information of a first application, and in response to the update event, the electronic device determines whether the first application is locked by an application lock, where the application information may be a widget or a notification message; and the electronic device displays a locking view over the application message after determining that the first application is locked by the application lock.

20 Claims, 39 Drawing Sheets

(56) References Cited

U.S. PATENT DOCUMENTS

2019/0197226 A1* 6/2019 Hu .......................... G06F 21/32

FOREIGN PATENT DOCUMENTS

| | | | |
|---|---|---|---|
| CN | 105933327 | A | 9/2016 |
| CN | 108629171 | A | 10/2018 |
| CN | 109409070 | A | 3/2019 |
| CN | 110348186 | A | 10/2019 |
| WO | 2012068614 | A1 | 5/2012 |
| WO | 2019227488 | A1 | 12/2019 |

* cited by examiner

APPLICATION INFORMATION DISPLAY METHOD AND RELATED DEVICE

CROSS-REFERENCE TO RELATED APPLICATIONS

This application is a National Stage of International Application No. PCT/CN2021/078973, filed on Mar. 4, 2021, which claims priority to Chinese Patent Application No. 202010153658.1, filed on Mar. 6, 2020, both of which are hereby incorporated by reference in their entireties.

TECHNICAL FIELD

This application relates to the field of electronic technologies, and in particular, to an application information display method and a related device.

BACKGROUND

With the gradual improvement and development of a smartphone ecosystem and the gradual increase of storage of smartphones, applications installed on the smartphones become increasingly diversified. In a process of using an application by a user, a large amount of user information is exchanged, including many pieces of privacy information of the user, for example, a transaction record, a photo, and email information.

To prevent the privacy information of the user from being viewed by others, persons skilled in the art propose a concept of an application lock. The application lock provides a function used to protect privacy information in an application on the smartphone. If an application is locked by an application lock, when the user opens the protected application or requires the smartphone to switch from a current interface to the protected application, the smartphone displays a locking interface to verify a user identity. The smartphone displays a user interface of the application only after the user successfully unlocks the application.

However, in an actual use process, information in the application is displayed in the user interface of the application, and may also be presented in another form, for example, displayed in a widget on a home screen or displayed in a message notification interface. How to improve security of application information is a problem to be urgently resolved by persons skilled in the art.

SUMMARY

This application provides an application information display method and a related apparatus, to improve security of application information.

According to a first aspect, an embodiment of this application provides an application information display method. The method includes: An electronic device detects an update event of first application information, where the first application information is a widget widget or a notification message, and there is a correspondence between the first application information and a first application; and the electronic device displays a locking view over the first application information when the electronic device determines, in response to the update event of the first application information, that the first application is locked by an application lock.

For example, refer to embodiments corresponding to FIG. 4A-1 and FIG. 4A-2 and FIG. 4B. The first application information may be a view 401 of a calendar application, and the first application may be the calendar application. In this example, the calendar application is locked by an application lock, and the electronic device displays a locking view over the view 401 of the calendar application. The locking view may be a locking view 403. For another example, refer to embodiments shown in FIG. 10A and FIG. 10B. The first application information may be a notification message 1001 of a calendar application, and the locking view may be a locking view 1002. Alternatively, the first application information may be a notification message 1003 of a calendar application, and the locking view may be a locking view 1004. In this method, when an application is locked by an application lock, the electronic device displays a locking view on a widget or a notification message corresponding to the application, so that user privacy can be protected, and security of application information can be improved.

With reference to the first aspect, in a possible implementation, if the first application information is a widget, the update event of the first application information includes: The electronic device switches from displaying another interface to displaying a home screen, the electronic device switches from a screen-off state to displaying the home screen, or the first application information is added to one or more items on the home screen, where the another interface is a user interface other than the home screen in user interfaces displayed by the electronic device. If the first application information is a notification message, the update event of the first application information includes: The first application receives the notification message, current time reaches preset display time of the notification message, or one or more items in a notification message list are invoked.

With reference to the first aspect, in a possible implementation, that the electronic device displays a locking view over the first application information when the electronic device determines that the first application is locked by an application lock includes: The electronic device displays the locking view over the first application information when the electronic device determines that the first application is locked by the application lock and the first application is in a locked state. That the electronic device determines that the first application is in a locked state includes: The electronic device determines that time between a current moment and a moment at which the application lock of the first application is successfully unlocked most recently exceeds a first preset time period; the electronic device determines that time between the current moment and a moment at which a user interface of the first application is most recently displayed exceeds a second preset time period; and the electronic device performs one or more items of screen locking after determining that the application lock of the first application is successfully unlocked most recently.

For this possible implementation, refer to an embodiment corresponding to FIG. 4D. In this manner, when an application is protected by an application lock and the application is in the locked state, a locking view is displayed over application information corresponding to the application, so that an application information leak can be avoided, and security of the application information can be improved. In addition, when an application is protected by an application lock and the application is in an unlocked state, the electronic device directly displays application information, so that user operations can be reduced, and efficiency of viewing the application information by a user can be improved.

With reference to the first aspect, in a possible implementation, that the electronic device displays a locking view over the first application information when the electronic device determines that the first application is locked by an application lock includes: The electronic device displays the locking view over the first application information when the electronic device determines that the first application is locked by the application lock and data in the first application information is in an unlocked state. For this possible implementation, refer to the embodiment corresponding to FIG. 5C. In this manner, when an application provides application information in a locked state, the electronic device may normally display the application information, and may reserve a locking manner that is of the application information and that is of the application.

With reference to the first aspect, in a possible implementation, that the electronic device displays a locking view over the first application information when the electronic device determines that the first application is locked by an application lock includes: The electronic device displays the locking view over data in a locked state in the first application information when the electronic device determines that the first application is locked by the application lock and data in the first application information includes the data in the locked state. For this possible implementation, refer to an embodiment corresponding to FIG. 5F. The first application information may be a view 511 of the calendar application. In the view 511, display data "Coal Chemical Project Report Meeting All day" and "Election of Community Owners Committee 5:50 p.m. to 8:00 p.m." is in a locked state. The locking view may be a locking view 512. In this manner, the electronic device may display, in encrypted mode, information that needs to be protected, and normally display basic information.

With reference to the first aspect, in a possible implementation, that the electronic device displays a locking view over the first application information when the electronic device determines that the first application is locked by an application lock includes: The electronic device displays the locking view over the first application information when the electronic device determines that the first application is locked by the application lock, the first application is in a locked state, and data in the first application information is in an unlocked state. For this possible implementation, refer to an embodiment corresponding to FIG. 6A.

With reference to the first aspect, in a possible implementation, the method further includes: The electronic device detects an operation for the locking view; the electronic device displays a password input box in response to the operation, where the password input box is used to receive an unlock password or an unlock track; the electronic device receives an entered unlock password or unlock track; and the electronic device unlocks the locking view when the electronic device determines that the unlock password is the same as a prestored unlock password or the unlock track is the same as a prestored unlock track.

For this possible implementation, refer to embodiments corresponding to FIG. 7A to FIG. 7C. The operation for the locking view may be an operation for a locking view 701. The password input box may be a password input box 703 or a pattern password 704. In some other embodiments, the locking view displayed by the electronic device may include the password input box. The user may directly enter the unlock password through the password input box, or enter the unlock track through a pattern password, and does not need to operate the locking view. For example, refer to an embodiment corresponding to FIG. 10C. A locking view 1006 includes a password input box 1007. For another example, refer to an embodiment corresponding to FIG. 10D. A locking view 1008 includes a password input box 1009. In some other embodiments, the electronic device detects an operation for the locking view; and the electronic device may display a dialog box in response to the operation, where the dialog box may include a password input box. For example, for the dialog box, refer to a dialog box 705 in FIG. 7D. The dialog box may alternatively be a dialog box 707 in FIG. 7E.

With reference to the first aspect, in a possible implementation, the method further includes: The electronic device detects an operation for the locking view; the electronic device obtains physiological data of the user in response to the operation, where the physiological data includes one or more of fingerprint information, voiceprint information, iris information, and face information; and the electronic device unlocks the locking view when the electronic device determines that the physiological data matches prestored physiological data.

With reference to the first aspect, in a possible implementation, there are a plurality of pieces of first application information, and the first application information includes second application information and third application information. The method further includes: The electronic device detects a touch operation for a target locking view, where the target locking view is one of a locking view over the second application information and a locking view over the third application information; the electronic device obtains fingerprint information of the user through a screen area in which the target locking view is located; and the electronic device unlocks the locking view over the second application information when the electronic device determines that the fingerprint information matches prestored fingerprint information and the target locking view is the locking view over the second application information; or the electronic device unlocks the locking view over the third application information when the electronic device determines that the fingerprint information matches prestored fingerprint information and the target locking view is the locking view over the third application information.

For this possible implementation, refer to embodiments corresponding to FIG. 7F and FIG. 7G. The locking view over the second application information may be a locking view 711, and the locking view over the third application information may be a locking view 712. A finger of the user touches a screen area in which the locking view 711 is located, and the electronic device unlocks the locking view 711 if fingerprint information that is recognized based on a fingerprint entered by the user matches the fingerprint information prestored in the electronic device.

With reference to the first aspect, in a possible implementation, there are a plurality of pieces of first application information, and the first application information includes fourth application information and fifth application information. The home screen of the electronic device further includes third application information, or the notification message list of the electronic device further includes the third application information. The method further includes: The electronic device collects an eyeball location and face information of the user; the electronic device determines a gaze location of human eyes based on the eyeball location; and the electronic device unlocks a locking view over the fourth application information when the electronic device determines that the face information matches prestored face information and the gaze location corresponds to the locking view over the fourth application information; or the electronic device unlocks a locking view over the fifth application information when the electronic device determines that the face information matches prestored face information and the gaze location corresponds to the locking view over the fifth application information.

For this possible implementation, refer to an embodiment corresponding to FIG. 7H. The electronic device may collect an eyeball location of the user by using a camera 193, determine a current gaze location of the human eyes, and then determine, based on the gaze location, that application information corresponding to the gaze location is a locking view 733. The electronic device unlocks the locking view 733 when the electronic device determines that face information that is recognized based on a user image obtained by the camera 193 matches the prestored face information.

According to a second aspect, an embodiment of this application provides an application information display method. The method includes: An electronic device detects an operation for invoking a historical task interface, where the historical task interface includes user interfaces of one or more applications running in a background of the electronic device; the electronic device displays a locking view over an application interface of a first application when the electronic device determines, in response to the operation for invoking a historical task interface, that the first application is locked by an application lock, where the first application is an application corresponding to a user interface in the historical task interface.

For example, refer to an embodiment corresponding to FIG. 12. For the historical task interface, refer to a user interface 121. The historical task interface includes a contacts application interface 1201, a WeChat application interface 1201, and a mailbox application interface 1203. In this example, a WeChat application on the electronic device is locked by an application lock, and the electronic device displays a locking view over the WeChat application interface 1201. In this method, when an application is already locked by the application lock, the electronic device may lock an application interface that is of the application and that is in the historical task interface, so that an application information leak can be avoided, and security of application information can be improved.

With reference to the second aspect, in a possible implementation, that the electronic device displays a locking view over an application interface of a first application when the electronic device determines that the first application is locked by an application lock includes: The electronic device displays the locking view over the application interface of the first application when the electronic device determines that the first application is locked by the application lock and the first application is in a locked state. That the electronic device determines that the first application is in a locked state includes: The electronic device determines that time between a current moment and a moment at which the application lock of the first application is successfully unlocked most recently exceeds a first preset time period; the electronic device determines that time between the current moment and a moment at which a user interface of the first application is most recently displayed exceeds a second preset time period; and the electronic device performs one or more items of screen locking after determining that the application lock of the first application is successfully unlocked most recently.

With reference to the second aspect, in a possible implementation, that the electronic device displays a locking view over an application interface of a first application when the electronic device determines that the first application is locked by an application lock includes: The electronic device displays the locking view over the application interface of the first application when the electronic device determines that the first application is locked by the application lock and data in the application interface of the first application is in an unlocked state.

With reference to the second aspect, in a possible implementation, that the electronic device displays a locking view over an application interface of a first application when the electronic device determines that the first application is locked by an application lock includes: The electronic device displays the locking view over data in a locked state in the application interface of the first application when the electronic device determines that the first application is locked by the application lock and data in the application interface of the first application includes the data in the locked state.

With reference to the second aspect, in a possible implementation, that the electronic device displays a locking view over an application interface of a first application when the electronic device determines that the first application is locked by an application lock includes: The electronic device displays the locking view over the application interface of the first application when the electronic device determines that the first application is locked by the application lock, the first application is in a locked state, and data in the application interface of the first application is in an unlocked state.

With reference to the second aspect, in a possible implementation, the method further includes: The electronic device detects an operation for the locking view; the electronic device displays a password input box in response to the operation, where the password input box is used to receive an unlock password or an unlock track; the electronic device receives an entered unlock password or unlock track; and the electronic device unlocks the locking view when the electronic device determines that the unlock password is the same as a prestored unlock password or the unlock track is the same as a prestored unlock track.

With reference to the second aspect, in a possible implementation, the method further includes: The electronic device detects an operation for the locking view; the electronic device obtains physiological data of the user in response to the operation, where the physiological data includes one or more of fingerprint information, voiceprint information, iris information, and face information; and the electronic device unlocks the locking view when the electronic device determines that the physiological data matches prestored physiological data.

With reference to the second aspect, in a possible implementation, the historical task interface includes user interfaces of a plurality of applications running in the background of the electronic device, and the historical task interface includes an application interface of a second application and an application interface of a third application. The method further includes: The electronic device detects a touch operation for a target locking view, where the target locking view is one of a locking view over the application interface of the second application and a locking view over the application interface of the third application; the electronic device obtains fingerprint information of a user through a screen area in which the target locking view is located; and the electronic device unlocks the locking view over the application interface of the second application when the electronic device determines that the fingerprint information matches prestored fingerprint information and the target locking view is the locking view over the application interface of the second application; or the electronic device unlocks the locking view over the application interface of the third application when the electronic device determines that the fingerprint information matches the prestored fingerprint information and the target locking view is the locking view over the application interface of the third application.

With reference to the second aspect, in a possible implementation, the historical task interface includes user interfaces of a plurality of applications running in the background of the electronic device, and the historical task interface includes an application interface of a fourth application and an application interface of a fifth application. The method further includes: The electronic device collects an eyeball location and face information of a user; the electronic device determines a gaze location of human eyes based on the eyeball location; and the electronic device unlocks a locking view over the application interface of the fourth application when the electronic device determines that the face information matches prestored face information and the gaze location corresponds to the locking view over the application interface of the fourth application; or the electronic device unlocks a locking view over the application interface of the fifth application when the electronic device determines that the face information matches the prestored face information and the gaze location corresponds to the locking view over the application interface of the fifth application.

According to a third aspect, an embodiment of this application provides an application information display method. The method includes: The electronic device receives a voice instruction, where the voice instruction is used to obtain application information in a first application; and when the electronic device determines, in response to the voice instruction, that the first application is locked by an application lock, the electronic device does not display or broadcast the application information corresponding to the voice instruction or the electronic device displays or broadcasts prompt information that the first application is locked by the application lock.

For example, refer to an embodiment corresponding to FIG. 13A. When detecting a voice instruction "what is scheduled today" of a user, in response to the voice instruction, the electronic device determines that a calendar application is locked by an application lock. The electronic device may display prompt information 1301 and a fingerprint prompt 1302. The prompt information 1301 is used to prompt the user that the calendar application is protected by the application lock and the calendar application needs to be unlocked if the user wants to view internal information of the application. The fingerprint indicator 1302 is used to indicate a screen area that is on a display and that receives a fingerprint of the user. The user may unlock the application information through fingerprint-based unlocking.

With reference to the third aspect, in a possible implementation, that when the electronic device determines that the first application is locked by an application lock, the electronic device does not display or broadcast the application information corresponding to the voice instruction or the electronic device displays or broadcasts prompt information that the first application is locked by the application lock includes: When the electronic device determines that the first application is locked by the application lock and the first application is in a locked state, the electronic device does not display or broadcast the application information corresponding to the voice instruction, or the electronic device displays or broadcasts the prompt information that the first application is locked by the application lock. That the electronic device determines that the first application is in a locked state includes: The electronic device determines that time between a current moment and a moment at which the application lock of the first application is successfully unlocked most recently exceeds a first preset time period; the electronic device determines that time between the current moment and a moment at which a user interface of the first application is most recently displayed exceeds a second preset time period; and the electronic device performs one or more items of screen locking after determining that the application lock of the first application is successfully unlocked most recently.

With reference to the third aspect, in a possible implementation, the method further includes: The electronic device displays a password input box, where the password input box is used to receive an unlock password or an unlock track; the electronic device receives an entered unlock password or unlock track; and when the electronic device determines that the unlock password is the same as a prestored unlock password or the unlock track is the same as a prestored unlock track, the electronic device displays or broadcasts the application information corresponding to the voice instruction.

With reference to the third aspect, in a possible implementation, the method further includes: The electronic device obtains physiological data of the user, where the physiological data includes one or more of fingerprint information, voiceprint information, iris information, and face information; and when the electronic device determines that the physiological data matches prestored physiological data, the electronic device displays or broadcasts the application information corresponding to the voice instruction. For example, refer to an embodiment corresponding to FIG. 13B. When the electronic device successfully matches fingerprint information entered by the user with prestored fingerprint information, the electronic device queries the calendar application for a schedule of a current day, and displays the schedule on the display. In addition, the electronic device may broadcast content of a prompt message 1303 while displaying the prompt message 1303.

According to a fourth aspect, an embodiment of this application provides an electronic device. The electronic device includes one or more memories and one or more processors, the one or more memories are coupled to the one or more processors, and the one or more memories are configured to store computer program code. The program code includes computer instructions, and when the one or more processors execute the computer instructions, the electronic device is enabled to perform the method described in any one of the first aspect or the possible implementations of the first aspect, or perform the method described in any one of the second aspect or the possible implementations of the second aspect, or perform the method described in any one of the third aspect or the possible implementations of the third aspect.

According to a fifth aspect, this application provides a computer program product. The computer program product includes computer instructions, and when the computer instructions are run on an electronic device, the electronic device is enabled to perform the method described in any one of the first aspect and the possible implementations of the first aspect, or perform the method described in any one of the second aspect and the possible implementations of the second aspect, or perform the method described in any one of the third aspect and the possible implementations of the third aspect.

According to a sixth aspect, this application provides a computer-readable storage medium, including instructions. When the instructions are run on an electronic device, the electronic device is enabled to perform the method described in any one of the first aspect and the possible implementations of the first aspect, or perform the method described in any one of the second aspect and the possible implementations of the second aspect, or perform the method described in any one of the third aspect and the possible implementations of the third aspect.

It may be understood that for beneficial effects that can be achieved by the computer program product in the fifth aspect and the computer-readable storage medium in the sixth aspect, refer to beneficial effects in the corresponding method provided above. Details are not described herein again.

In embodiments of this application, when an application is locked by an application lock, the electronic device displays a locking view over a widget or a notification message corresponding to the application, so that user privacy can be protected, and security of application information can be improved.

DETAILED DESCRIPTION OF ILLUSTRATIVE EMBODIMENTS

Figure 1A:
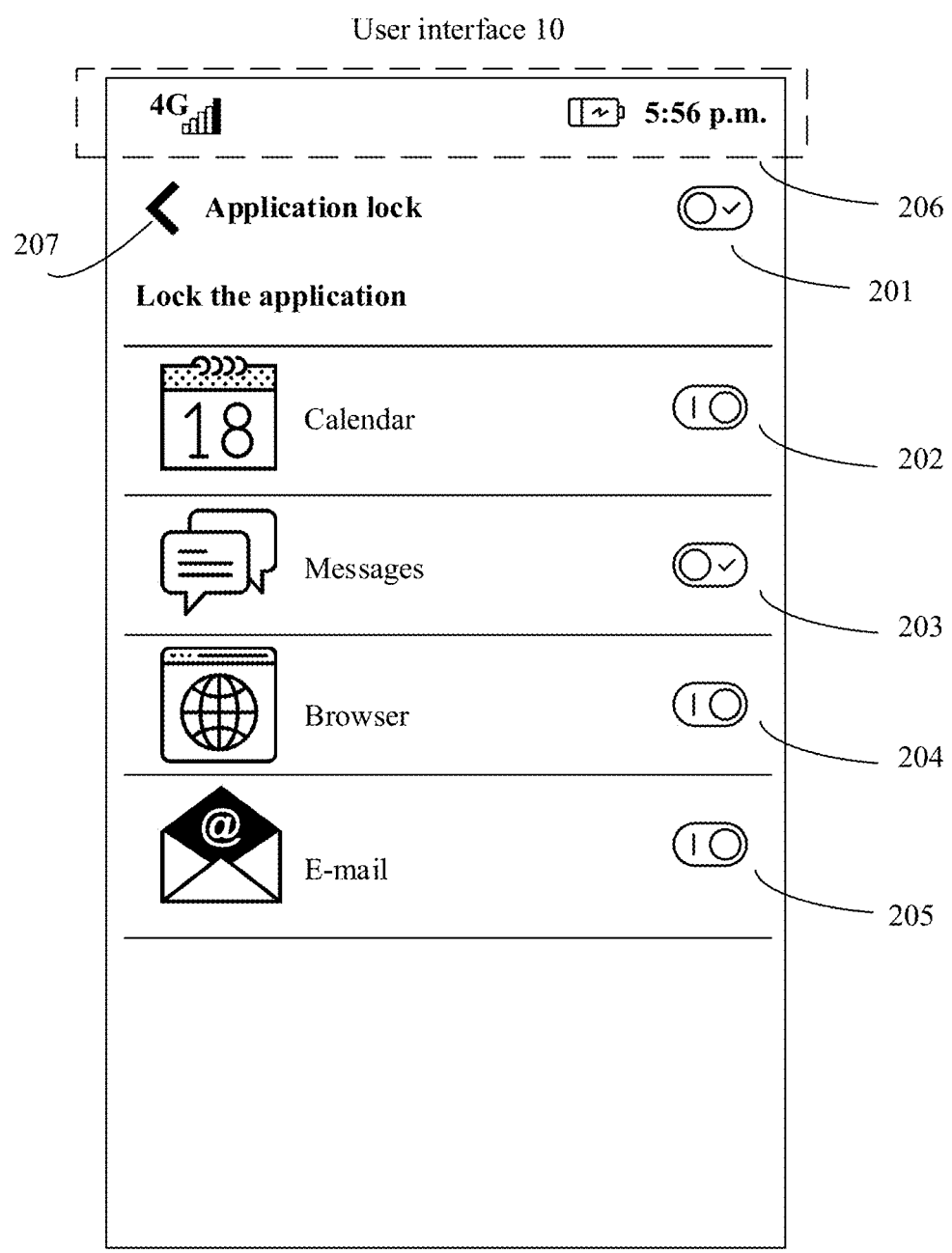
FIG. 1A is a schematic diagram of a user interface of an electronic device according to an embodiment of this application.

The technical solutions according to embodiments of this application are clearly and completely described in the following with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

An electronic device, a user interface used for such an electronic device, and an embodiment used for such an electronic device are described below. In some embodiments, the electronic device may be a personal digital assistant and/or a portable electronic device, for example, a mobile phone, a tablet computer, or a wearable electronic device (such as a smartwatch) having a wireless communications function. An example embodiment of the portable electronic device includes but is not limited to a portable electronic device using iOS®, Android®, Microsoft®, or another operating system. The portable electronic device may alternatively be another portable electronic device, for example, a laptop (Laptop) computer having a touch-sensitive surface or a touch panel. It should be further understood that, in some other embodiments, the electronic device may not be a portable electronic device, but is a desktop computer having a touch-sensitive surface or a touch panel.

The following describes terms used in embodiments of this application.

The term "user interface (user interface, UI)" in the specification, claims, and accompanying drawings of this application is a medium interface for interaction and information exchange between a user and an application or an operating system, and the user interface implements conversion between an internal form of information and a form that can be accepted by the user. A user interface of an application is source code written in a specific computer language, for example, Java or an extensible markup language (extensible markup language, XML). Interface source code is parsed and rendered on an electronic device, and is finally presented as content that can be identified by the user, for example, a control such as a picture, a text, or a button. A control (control) is a basic element of a user interface. Typical controls include a button (button), a widget (widget), a toolbar (toolbar), a menu bar (menu bar), a text box (text box), a scrollbar (scrollbar), a picture, and a text. Attributes and content of controls in an interface are defined by tags or nodes. For example, controls included on an interface are defined by nodes such as <Textview>, <ImgView>, and <VideoView> in the XML. One node corresponds to one control or attribute in the interface. After being parsed and rendered, the node is presented as user-visible content. In addition, interfaces of a plurality of applications such as a hybrid application (hybrid application) usually further include a web page. A web page, also referred to as a page, may be understood as a special control embedded in an interface of an application. A web page is source code written in a specific computer language, for example, a hypertext markup language (hypertext markup language, HTML), cascading style sheets (cascading style sheets, CSS), or JavaScript (JavaScript, JS). The web page source code may be loaded and displayed as user-recognizable content by a browser or a web page display component with a function similar to a function of the browser. Specific content included in the web page is also defined by using a label or a node in the web page source code. For example, the HTML defines an element and an attribute of the web page by using <p>, <img>, <video>, or <canvas>.

The user interface is usually represented in a form of a graphical user interface (graphical user interface, GUI), and is a user interface that is related to a computer operation and that is displayed in a graphic manner. The graphical user interface may be an interface element such as an icon, a window, or a control displayed on a display of an electronic device.

The term application lock in the specification, claims, and accompanying drawings of this application is a function of locking an application, and can protect privacy information of a user. If an application is protected by an application lock, when a user starts the protected application or requires a smartphone to switch from a current interface to the protected application or switch from the current interface to some preset protected interfaces (for example, an interface on which consumption records are displayed and an interface on which a hidden album is displayed) of the protected application, or requires the smartphone to display some protected views (for example, a widget, a notification message, and a historical task interface) of the protected application, the smartphone may display a locking interface through a home screen application, to verify a user identity, or may display a locking interface through the protected application, to verify the user identity. The smartphone displays a user interface of the application only after the user successfully unlocks the application.

For example, FIG. 1A is a schematic diagram of a user interface of an electronic device according to an embodiment of this application. A user interface 10 is used to display a setting interface of an application lock. The user interface 10 includes a status bar 206, a return control 207, an on/off control 201, an on/off control 202, an on/off control 203, an on/off control 204, and an on/off control 205.

The status bar 206 may include icons such as a signal indicator, a power indicator, and a time indicator.

The return control 207 may be used to switch to a previous interface of a current interface. It should be noted that the previous interface is determined during program setting of an application.

The on/off control 201 may be used to enable or disable an application lock function. The on/off control 201 in FIG. 1A is in an on state. When a user performs a tap operation on the on/off control 201, in response to the tap operation, the electronic device disables the application lock function, and switches the on/off control 201 from displaying the on state to displaying an off state (refer to a display status of the control 202).

The on/off control 202 may be used to enable or disable an application lock function of a calendar application. The on/off control 202 in FIG. 1A is in the off state. When the user performs a tap operation on the on/off control 202, in response to the tap operation, the electronic device enables the application lock function of the calendar application, and switches the on/off control 202 from displaying the on state to displaying the on state (refer to the display status of the control 202). After the application lock function of the calendar application is enabled, when the user enables the calendar application or requires the electronic device to switch from the current interface to the calendar application, the smartphone displays a locking interface to verify a user identity. Similarly, the user may open or close, through the on/off control 203, the on/off control 204, and the on/off control 205, an application lock of an application corresponding to each of the on/off control 203, the on/off control 204, and the on/off control 205. Details are not described herein again.

Figure 1B:
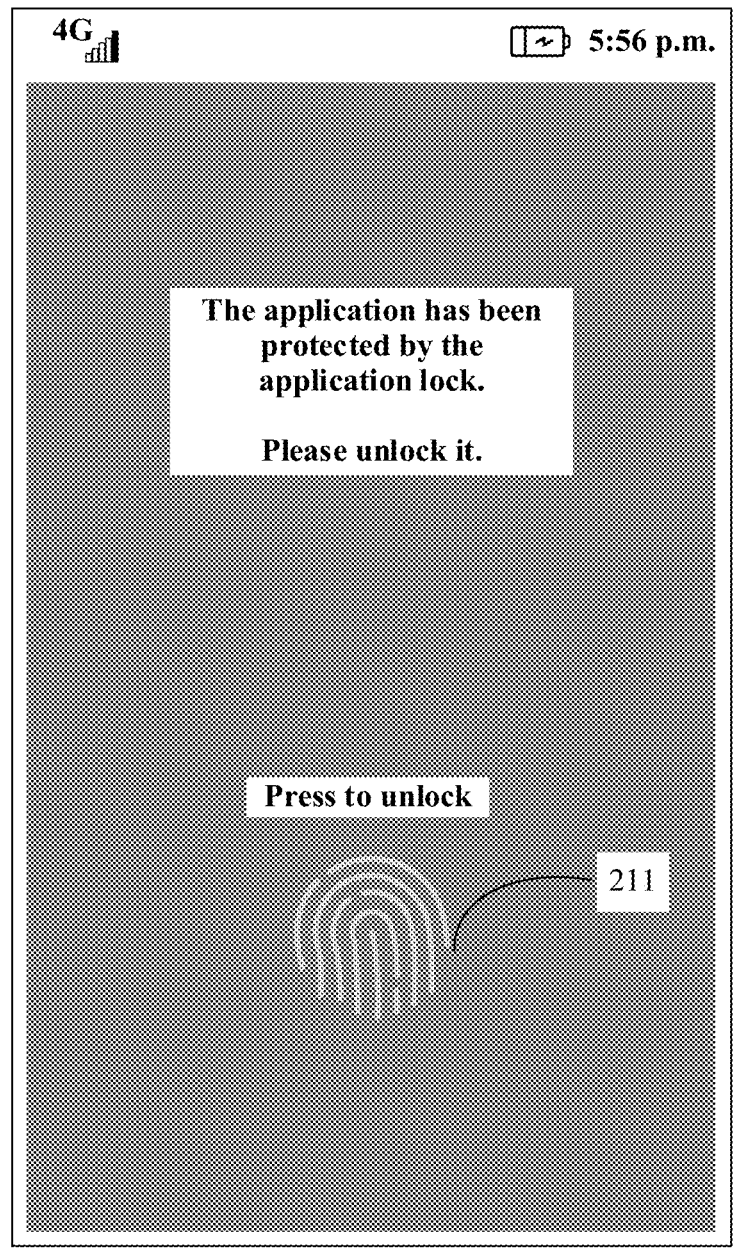
FIG. 1B is a schematic diagram of a locking interface according to an embodiment of this application.

FIG. 1B is a schematic diagram of a locking interface according to an embodiment of this application. A user interface ii includes an unlock indicator 211. Fingerprint information of a user may be received in a screen area in which the unlock indicator 211 is located. When the received fingerprint information of the user matches prestored fingerprint information, an electronic device successfully verifies a user identity, and the electronic device no longer displays the locking interface, and switches to displaying a user interface of a calendar application. It should be noted that the electronic device may further unlock an application lock in another manner, for example, facial recognition, iris recognition, voiceprint recognition, password verification, or pattern verification. Corresponding to different forms of unlocking manners, the locking interface may alternatively be a user interface in another form.

Figure 1C:
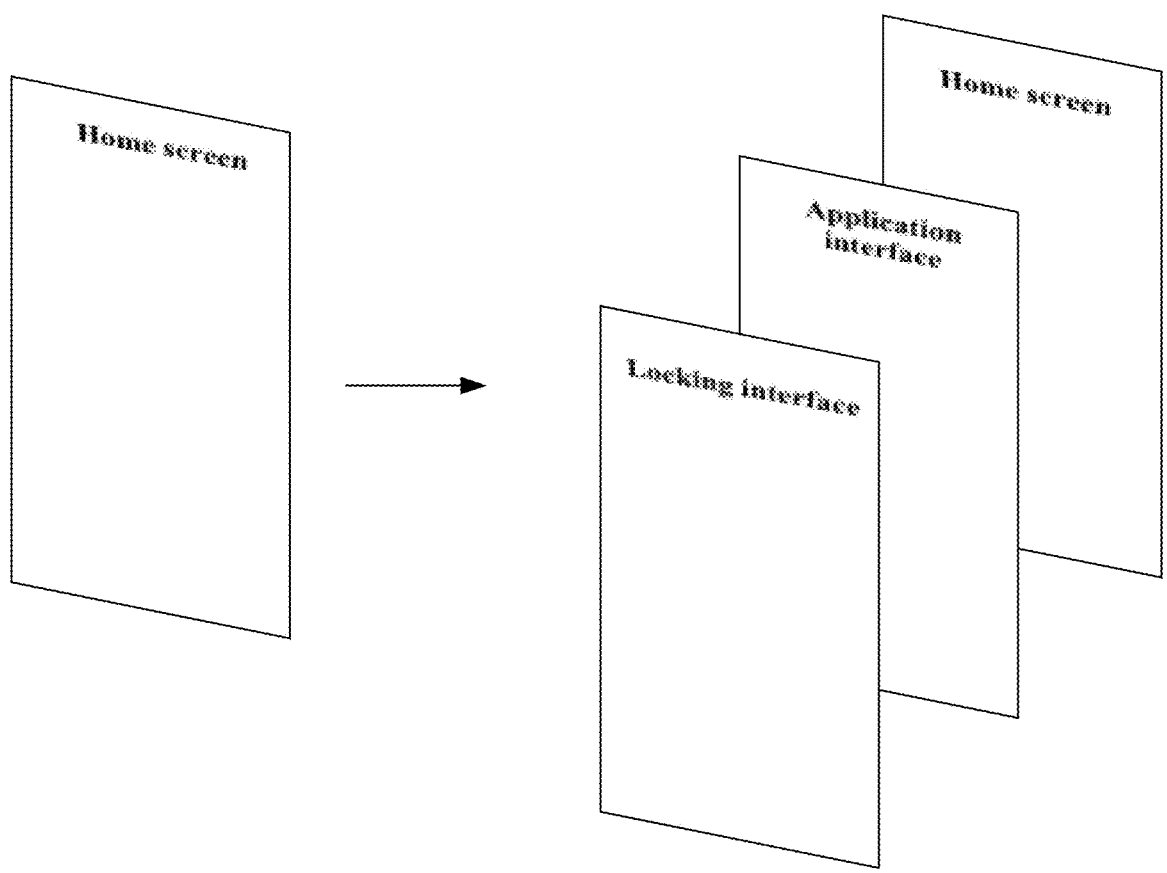
FIG. 1C is a flowchart of displaying a locking interface on an electronic device according to an embodiment of this application.

FIG. 1C is a schematic flowchart of displaying a locking interface on an electronic device according to an embodiment of this application. First, the electronic device displays a home screen on a display, and application icons of a plurality of applications may be displayed on the home screen. Then, the electronic device loads an application interface of a calendar application in response to an operation (for example, a tap operation or a double-tap operation) performed by a user on an application icon (for example, an application icon of the calendar application). If the electronic device detects that an application lock of the calendar application is enabled, the electronic device superimposes the locking interface over the application interface. In this manner, the user cannot view the application interface of the calendar application, and user information in the calendar application can be protected. In addition, after the user unlocks the locking interface, the electronic device displays the application interface under the locking interface.

In the specification, claims, and accompanying drawings of this application, the term widget (or referred to as widget or widget) widget is a presentation form of application information. There is a correspondence between a widget and an application. For example, there is a correspondence between a calendar widget and the calendar application, and there is a correspondence between a mailbox widget and a mailbox application. The widget may be embedded into another application (for example, a home screen application), and may update information presented by the widget. The user may view application information of another application through a widget on the home screen. Usually, the user may customize a widget displayed on the home screen of the electronic device. For example, widgets displayed on the home screen of the electronic device may include a clock, weather, a calendar, a memo, and the like. For example, for the widget on the home screen, refer to a calendar widget 221 in FIG. 2A, a view 402 of the mailbox application in FIG. 4A-1 and FIG. 4A-2, and the like.

Figure 2A:
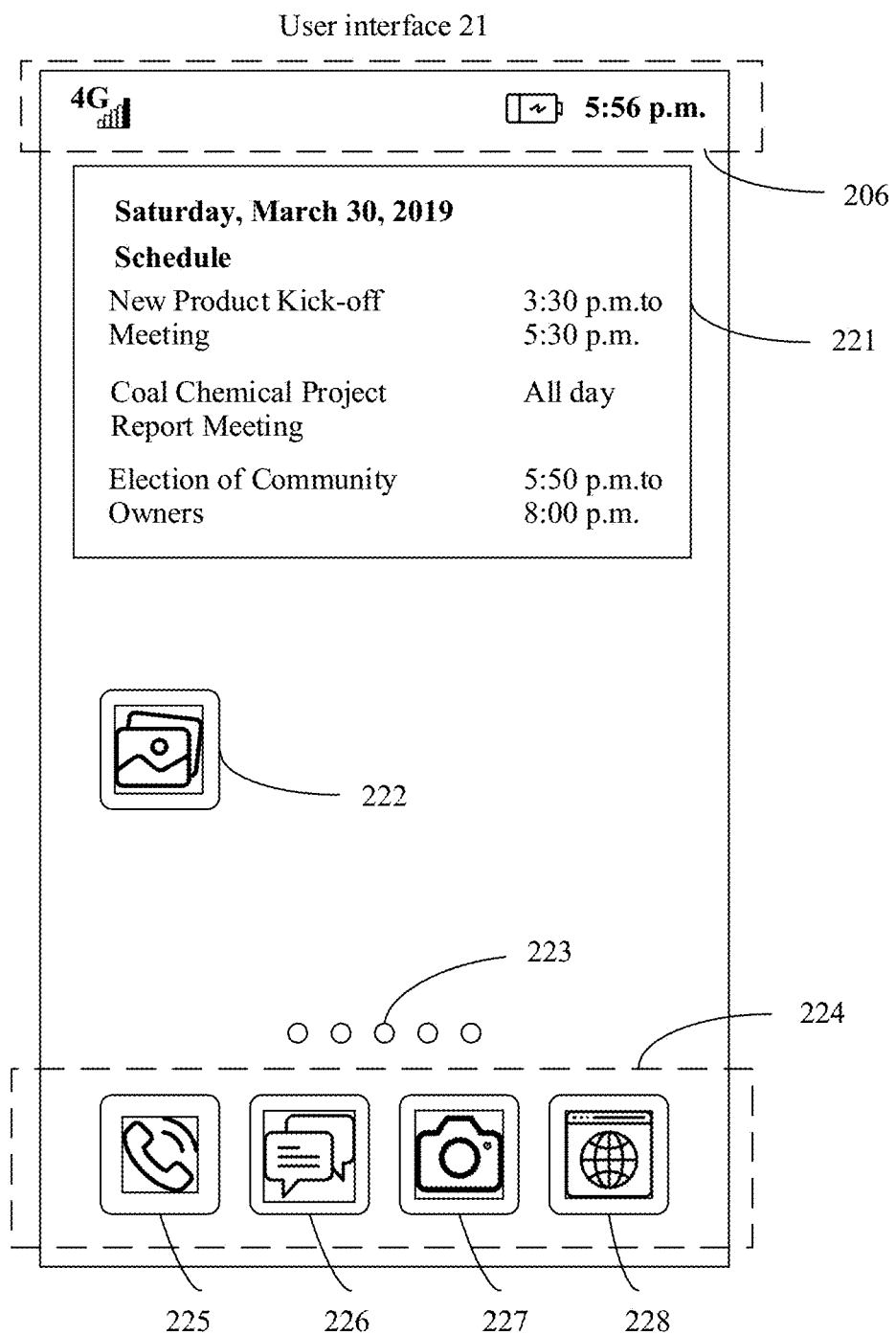
FIG. 2A is a schematic diagram of a home screen of an electronic device according to an embodiment of this application.

The term home screen (home screen) in the specification, claims, and accompanying drawings of this application is a user interface of the electronic device. The home screen application on the electronic device may be used to display the home screen of the electronic device. The home screen usually includes a status bar, one or more application icons, a page indicator, a tray including icons of frequently used applications, and the like. Optionally, the user may add some widgets to the home screen as required. For example, FIG. 2A is a schematic diagram of a home screen of an electronic device according to an embodiment of this application. A user interface 21 includes a status bar 206, a calendar widget 221, an application icon 222, a page indicator 223, and a tray 224 including icons of frequently used applications. Herein, for the status bar 206, refer to the description in the foregoing content. Details are not described herein again.

The application icon 222 is an icon of an application installed on the electronic device. It should be noted that the home screen of the electronic device may further include an application icon of another application, for example, an icon of WeChat (WeChat), an icon of QQ, an icon of Twitter (Twitter), an icon of Mailbox, and an icon of Settings.

The page indicator 223 may be used to indicate a quantity of pages and a page that is currently browsed by a user. In addition, the user may swipe leftward or rightward on a current page to browse an application icon on another page.

The tray 224 including icons of frequently used applications may display the icon of the application frequently used by the user. For example, an icon 225 of Phone, an icon 226 of Messages, an icon 227 of Camera, and an icon 228 of Browser are displayed in the tray 224 icons of frequently used applications. The user may customize an application icon included in the tray 224 including icons of frequently used applications.

The calendar widget 221 is a widget provided by a calendar application, and may be used to indicate current time, for example, a date and a day of a week. The calendar widget 221 may be further used to display schedule information set by the user. For example, the schedule information includes a name of a project set by the user and time information corresponding to the project. It should be noted that a display form and included content of the calendar widget 221 may be determined by a design of the calendar application. View information that is of the calendar widget 221 and displayed on the home screen is provided by the calendar application.

In some embodiments, the electronic device may further include a home button. The home button may be a physical button or a virtual button. The home button may be used to receive an instruction of the user, to return to the home screen from a currently displayed user interface, so that the user can conveniently view the home screen at any time. The instruction may be specifically an operation instruction of pressing the home button once by the user, may be an operation instruction of consecutively pressing the home button twice within a short time period by the user, or may be an operation instruction of touching and holding the home button within a predetermined time period by the user. In some other embodiments, the electronic device does not include a home button, and the electronic device may return to the home screen from a currently displayed user interface based on a preset operation. For example, the preset operation may be an operation of swiping up from a lower direction of the display of the electronic device.

Figure 2B:
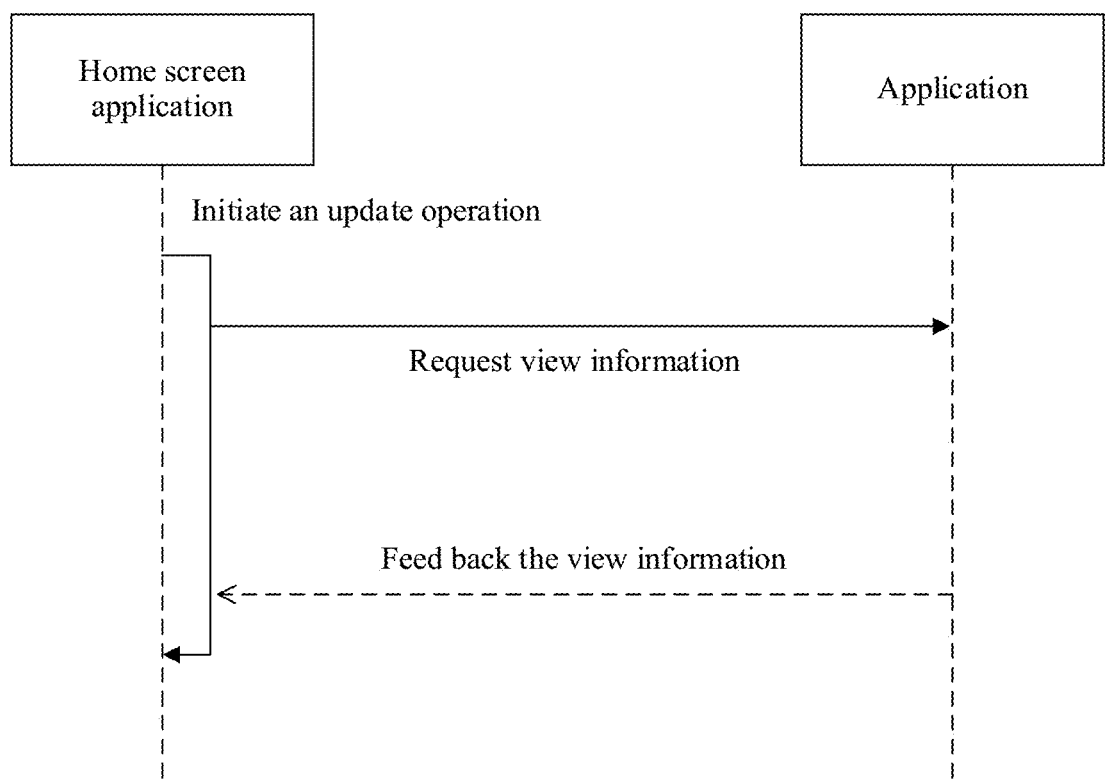
FIG. 2B is a flowchart of updating view information of a widget according to an embodiment of this application.

FIG. 2B is a flowchart of updating view information of a widget according to an embodiment of this application. A home screen application of an electronic device detects a widget update event, and the home screen application initiates an update operation. For example, the widget update event may include an event, for example, turning a page of a home screen, powering on the electronic device, turning on a screen after the screen is locked, switching from an application interface to the home screen, or adding a new widget. The home screen application sends a request to an application corresponding to the widget, where the request is used to request the view information. In response to the request, the application feeds back the view information to the home screen application. The view information may include information such as a display style, a location, and display data of the widget.

Figure 3A:
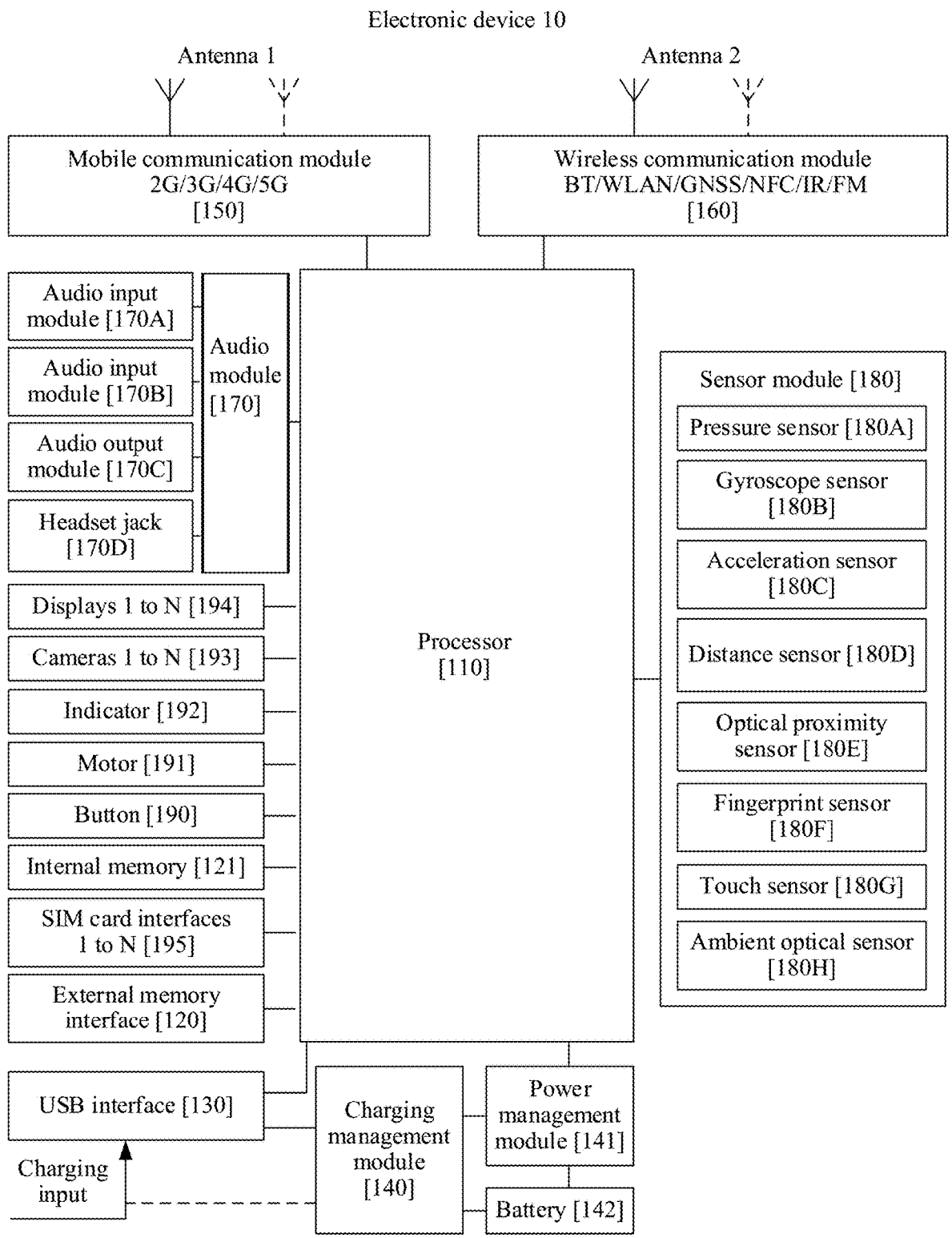
FIG. 3A is a schematic diagram of a structure of an electronic device according to an embodiment of this application.

The following describes a hardware structure of the electronic device. The following uses an electronic device 10 as an example for description. FIG. 3A is a schematic diagram of a structure of the electronic device 10 according to this embodiment of this application.

The electronic device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the electronic device 10 shown in FIG. 3A is merely an example, and may have more or fewer components than those shown in FIG. 3A, or may combine two or more components, or may have different component configurations. Components shown in the figure may be implemented by hardware, software, or a combination of hardware and software that includes one or more signal processing and/or application-specific integrated circuits.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 10. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDA) and a serial clock line (serial clock line, SCL). The processor 110 may be coupled to the touch sensor 180K through the I2C interface, so that the processor 110 communicates with the touch sensor 180K through an I2C bus interface, to implement a touch function of the electronic device 10.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be configured to perform audio communication, and sample, quantize, and code an analog signal. In some embodiments, the audio module 170 may be coupled to the wireless communication module 160 through a PCM bus interface.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the display 194 through the DSI interface, to implement a display function of the electronic device 10.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like.

The USB interface 130 is an interface that conforms to a USB standard specification, and may be specifically a mini USB interface, a micro USB interface, a USB T e-C interface, or the like. The USB poll 130 may be used to connect to a charger to charge the electronic device 10, may be used to transmit data between the electronic device 10 and a peripheral device, or It may be understood that an interface connection relationship between the modules that is shown in this embodiment of the present invention is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

The charging management module 140 is configured to receive a charging input from the charger. The charger may be a wireless charger or a wired charger. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display screen 194, the camera 193, the wireless communication module 160, and the like.

A wireless communication function of the electronic device 10 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 10 may be configured to cover one or more communication frequency bands. Different antennas may be further multiplexed, to improve antenna utilization. For example, the antenna 1 may be multiplexed as a diversity antenna of a wireless local area network. In other embodiments, the antenna may be used in combination with a tuning switch.

The mobile communication module 150 may provide a solution that is applied to the electronic device 10 and that includes wireless communication such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is applied to the electronic device 10.

In some embodiments, the antenna 1 of the electronic device 10 is coupled to the mobile communication module 150, and the antenna 2 is coupled to the wireless communication module 160, so that the electronic device 10 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like.

The electronic device 10 implements a display function through a GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 10 may include one or N displays 194, where N is a positive integer greater than 1.

The electronic device 10 may implement an image shooting function by using the ISP, the camera 193, the video codec, the GPU, the display 194, the application processor, and the like.

The ISP is configured to process data fed back by the camera 193. For example, during image shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 may be configured to capture a static image or a video. In some embodiments, the electronic device 10 may include one or N cameras 193, where N is a positive integer greater than 1.

The digital signal processor is configured to process a digital signal. In addition to the digital image signal, the digital signal processor may further process another digital signal. For example, when the electronic device 10 selects a frequency, the digital signal processor is configured to perform Fourier transform and the like on frequency energy.

The video codec is configured to compress or decompress a digital video. The electronic device 10 may support one or more types of video codecs. In this way, the electronic device 10 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU can implement applications such as intelligent cognition of the electronic device 10, such as image recognition, facial recognition, speech recognition, and text understanding.

The external memory interface 120 may be configured to connect to an external memory card, for example, a micro SD card, to extend a storage capability of the electronic device 10. The external storage card communicates with the processor 110 through the external memory interface 120, to implement a data storage function. For example, files such as music and videos are stored in the external storage card.

The internal memory 121 may be configured to store computer executable program code. The executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 10.

The electronic device 10 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal.

The speaker 170A, also referred to as a "loudspeaker", is configured to convert an audio electrical signal into a sound signal. The electronic device 10 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 10, the receiver 170B may be put close to a human ear to listen to a voice.

The microphone 170C, also referred to as a "mike" or a "voice transmitter", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 10.

The headset jack 170D is configured to connect to a wired headset. The headset jack 170D may be the USB interface 130, or may be a 3.5 mm open mobile terminal platform (open mobile terminal platform, OMTP) standard interface or a Cellular Telecommunications Industry Association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. When a touch operation is performed on the display 194, the electronic device 10 detects intensity of the touch operation by using the pressure sensor 180A. The electronic device 10 may calculate a touch location based on a detection signal of the pressure sensor 180A. In some embodiments, touch operations that are performed in a same touch location but have different touch operation intensity may correspond to different operation instructions.

The gyroscope sensor 180B may be configured to determine a motion posture of the electronic device 10. In some embodiments, an angular velocity of the electronic device 10 around three axes (namely, axes x, y, and z) may be determined by using the gyroscope sensor 180B. The gyroscope sensor 180B may be configured to implement image stabilization during image shooting. The gyroscope sensor 180B may also be used in a navigation scenario and a somatic game scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall effect sensor. The electronic device 10 may detect opening and closing of a flip cover by using the magnetic sensor 180D.

The acceleration sensor 180E may detect accelerations in various directions (usually on three axes) of the electronic device 10, and may detect magnitude and a direction of gravity when the electronic device 10 is still. The acceleration sensor 180E may be further configured to identify a posture of the electronic device, and used in an application such as switching between a landscape mode and a portrait mode or a pedometer.

The distance sensor 180F is configured to measure a distance. The electronic device 10 may measure the distance in an infrared or a laser manner.

The optical proximity sensor 180G may include, for example, a light emitting diode (LED) and an optical detector, for example, a photodiode. The light emitting diode may be an infrared light emitting diode. The electronic device 10 emits infrared light by using the light emitting diode. The electronic device 10 detects infrared reflected light from a nearby object by using the photodiode.

The ambient light sensor 180L is configured to sense ambient light brightness. The electronic device 10 may adaptively adjust brightness of the display 194 based on the sensed ambient light brightness.

The fingerprint sensor 180H is configured to collect a fingerprint. The electronic device 10 may implement fingerprint-based unlocking, application lock access, fingerprint-based image shooting, fingerprint-based call answering, and the like by using a feature of the collected fingerprint.

The temperature sensor 180J is configured to detect a temperature. In some embodiments, the electronic device 10 executes a temperature processing policy based on the temperature detected by the temperature sensor 180J.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. For example, the touch event type may be a tap event, a double-tap event, a touch-and-hold event, a force touch (force touch) event, a drag event, or the like. A visual output related to the touch operation may be provided through the display 194. In some other embodiments, the touch sensor 180K may alternatively be disposed on a surface of the electronic device 10 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The electronic device 10 may receive a button input, and generate a button signal input related to user settings and function control of the electronic device 10.

The motor 191 may generate a vibration prompt. The motor 191 may be configured to provide an incoming call vibration prompt and a touch vibration feedback. For example, touch operations performed on different applications (for example, image shooting and audio playing) may correspond to different vibration feedback effects.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 10. The electronic device 10 may support one or N SIM card interfaces, where N is a positive integer greater than 1. The SIM card interface 195 may support a nano-SIM card, a micro-SIM card, a SIM card, and the like. In some embodiments, the electronic device 10 uses an eSIM, that is, an embedded SIM card. The eSIM card may be embedded in the electronic device 10, and cannot be separated from the electronic device 10.

A software system of the electronic device 10 may use a layered architecture, an event-driven architecture, a micro-kernel architecture, a micro service architecture, or a cloud architecture. In embodiments of this application, an Android system with a layered architecture is used as an example to describe a software structure of the electronic device 10.

Figure 3B:
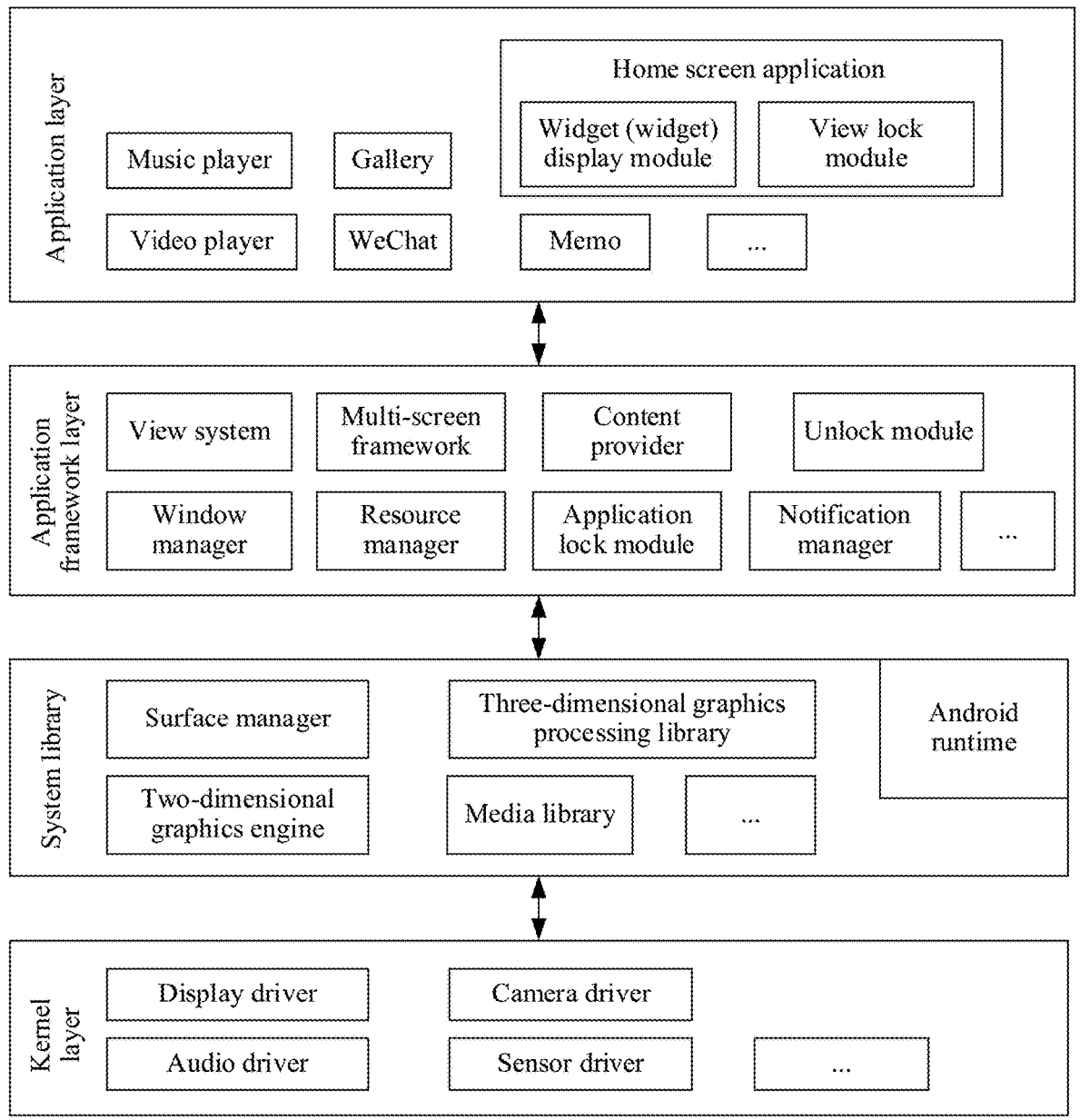
FIG. 3B is a block diagram of a software structure of an electronic device according to an embodiment of this application.

FIG. 3B is a block diagram of a software structure of the electronic device 10 according to an embodiment of this application.

In a layered architecture, software is divided into several layers, and each layer has a clear role and task. The layers communicate with each other through a software interface. In some embodiments, the Android system is divided into four layers, that is, an application layer, an application framework layer, an Android runtime (Android runtime) and system library, and a kernel layer from top to bottom.

The application layer may include one or more applications. For example, the application layer may include applications such as Music player, Video player, Gallery, WeChat, a home screen application, and Memo. It should be noted that the application layer may further include other applications, which are not listed one by one herein. The home screen application may be used to display a home screen of the electronic device, and may include a widget display module and a view lock module. The widget display module may be used to display a widget on the home screen. The view lock module may be used to determine whether a view is locked. Whether the view is locked may be related to a lock state of an application corresponding to the view.

The application framework layer provides an application programming interface (application programming interface, API) and a programming framework for an application at the application layer. The application framework layer includes some predefined functions.

As shown in FIG. 3B, the application framework layer may include a window manager, a content provider, a view system, an application lock module, a resource manager, a notification manager, an unlock module, and the like.

The window manager is used to manage a window program. The window manager may obtain a size of the display, determine whether there is a status bar, perform screen locking, take a screenshot, and the like.

The content provider is used to store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying an image. The view system may be used to construct an application. A display interface may include one or more views. For example, a display interface including an SMS message notification icon may include a text display view and an image display view.

The resource manager provides various resources for an application, such as a localized character string, an icon, an image, a layout file, and a video file.

The notification manager enables an application to display notification information in a status bar, and may be used to transmit a notification-type message. The displayed information may automatically disappear after a short pause without user interaction. For example, the notification manager is used to notify download completion, give a message notification, and the like. The notification manager may alternatively be a notification that appears in a top status bar of the system in a form of a graph or a scroll bar text, for example, a notification of an application running in the background, or a notification that appears on the screen in a form of a dialog window. For example, text information is prompted in the status bar, a prompt tone is produced, a smart terminal vibrates, or an indicator light blinks. The notification manager may be further used to display notification information in a notification message list.

The application lock module may be used to implement an application lock function. A user may set a protected (or referred to as locked) application through the application lock module.

The unlock module may be used to implement a function of unlocking an application lock. It should be noted that an unlocking manner corresponding to the unlock module includes but is not limited to password unlocking, fingerprint-based unlocking, in-screen fingerprint-based unlocking, facial recognition unlocking, iris recognition unlocking, voiceprint recognition unlocking, and the like. In addition, the module may return, to the home screen application, a result indicating whether an application lock is successfully unlocked.

The Android runtime includes a kernel library and a virtual machine. The Android runtime is responsible for scheduling and management of the Android system.

The core library includes two parts: a function that needs to be invoked in java language, and a core library of Android.

The application layer and the application framework layer are run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of function modules, for example, a surface manager (surface manager), media libraries (Media Libraries), a three-dimensional graphics processing library (for example, OpenGL ES), and a 2D graphics engine (for example, SGL).

The surface manager is used to manage a display subsystem and provide fusion of 2D and 3D layers for a plurality of applications.

The media library supports playback and recording of a plurality of common audio and video formats, a static image file, and the like. The media library may support a plurality of audio and video coding formats, such as MPEG-4, G.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

An application information display method provided in embodiments of this application is described in detail below based on the electronic device 10 described in the foregoing content with reference to other accompanying drawings.

Figures 1, 4A:
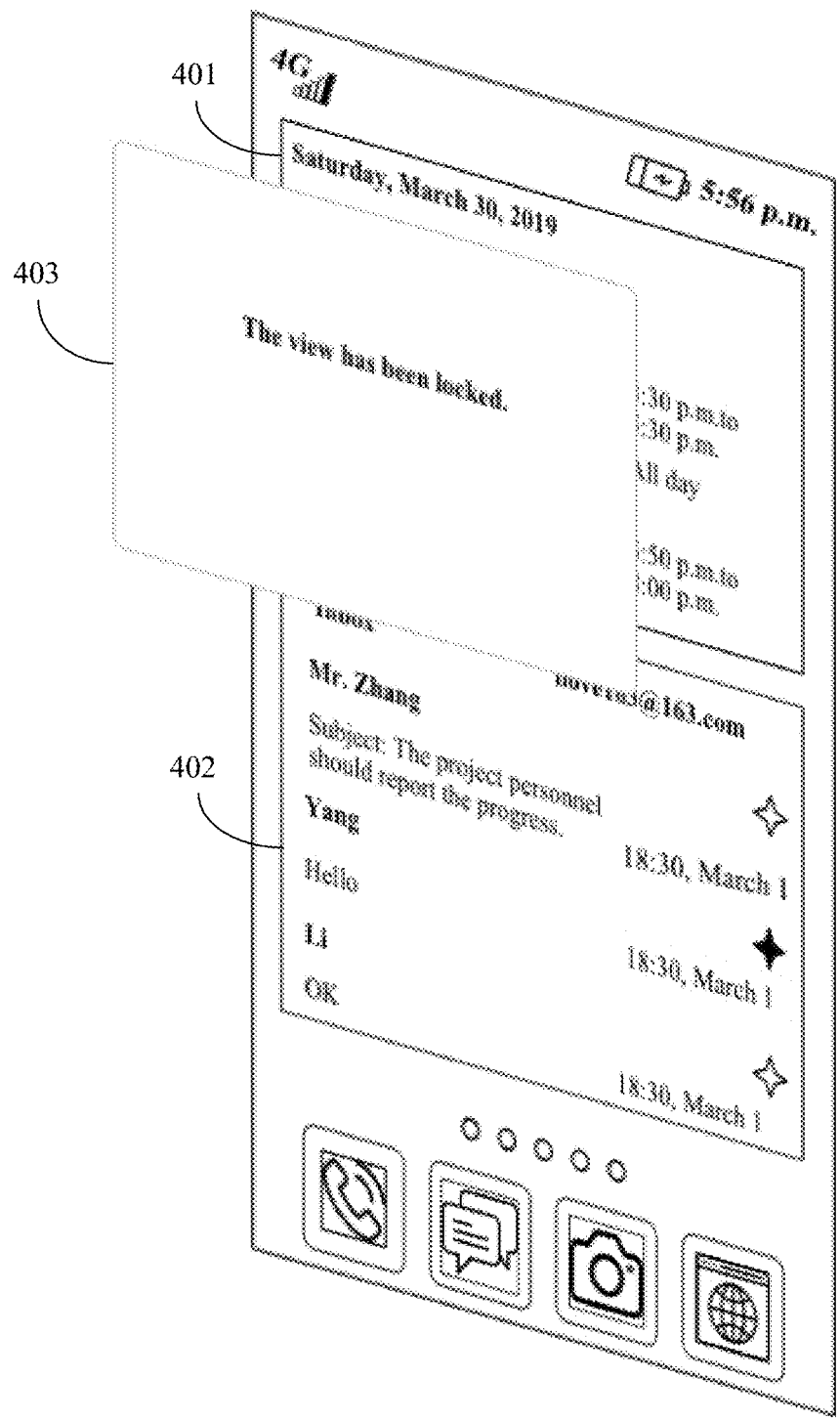
FIG. 4A-1 and FIG. 4A-2 are another schematic diagram of a home screen of an electronic device according to an embodiment of this application.
Figures 2, 4A:
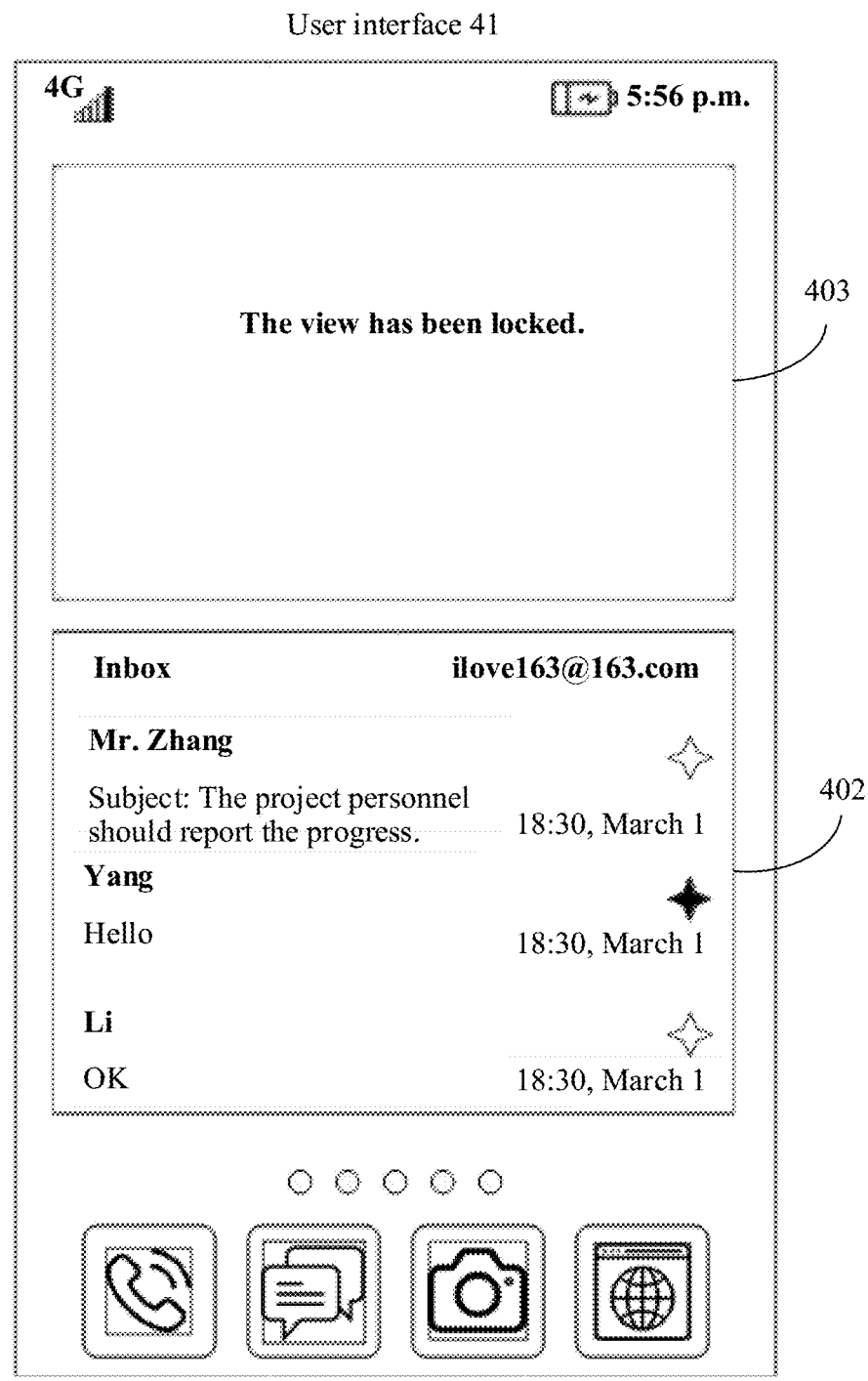

In some embodiments of this application, if an application is locked by an application lock, the electronic device displays a locking view over a view of widget that is of the application and that is on the home screen. The electronic device displays information in the widget view of the application only after the user unlocks the locking view. Displaying the locking view over the widget of the application means displaying the locking view in an overlapping manner over a layer at which the view of the widget of the application is located. The locking view may cover the widget of the application. For example, FIG. 4A-1 and FIG. 4A-2 are a schematic diagram of the home screen of the electronic device according to an embodiment of this application. A user interface 41 includes a locking view 403 and a view 402 of a mailbox application. An application lock for a calendar application is enabled, but an application lock for the mailbox application is disabled. The electronic device superimposes a locking view 403 over a layer at which a view 401 of the calendar application is located, and the locking view 403 may cover the view 401 of the calendar application. In some embodiments, after a user unlocks the locking view 403, the electronic device no longer displays the locking view 403, and may display the under view 401 of the calendar application. A manner of unlocking the locking view by the user is described in subsequent content. Details are not described herein.

Figure 4B:
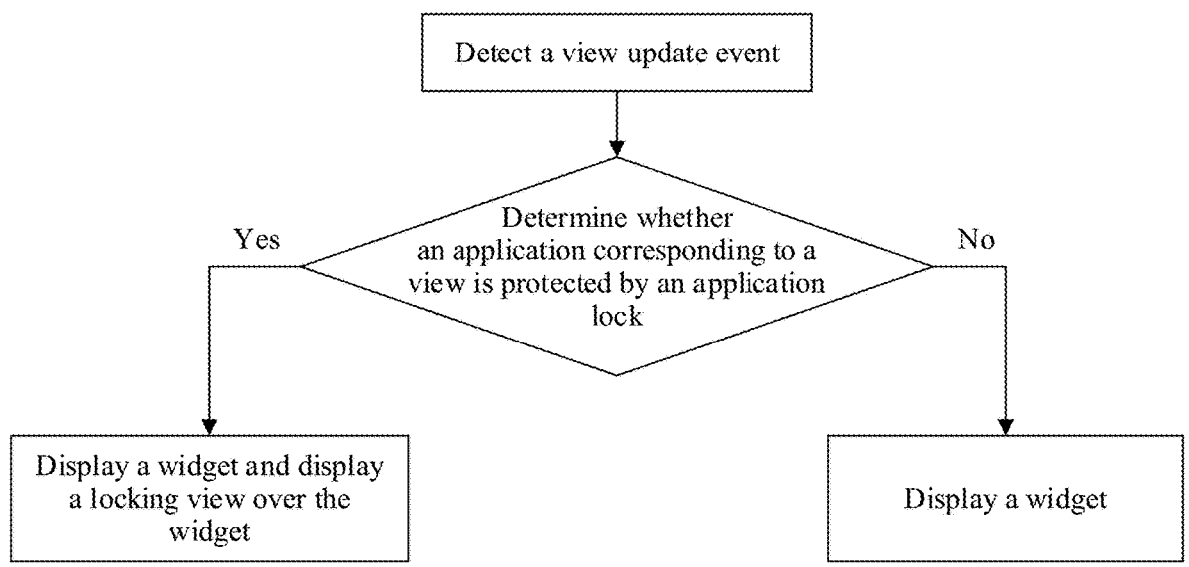
FIG. 4B is a flowchart of displaying a widget according to an embodiment of this application.
Figure 4C:
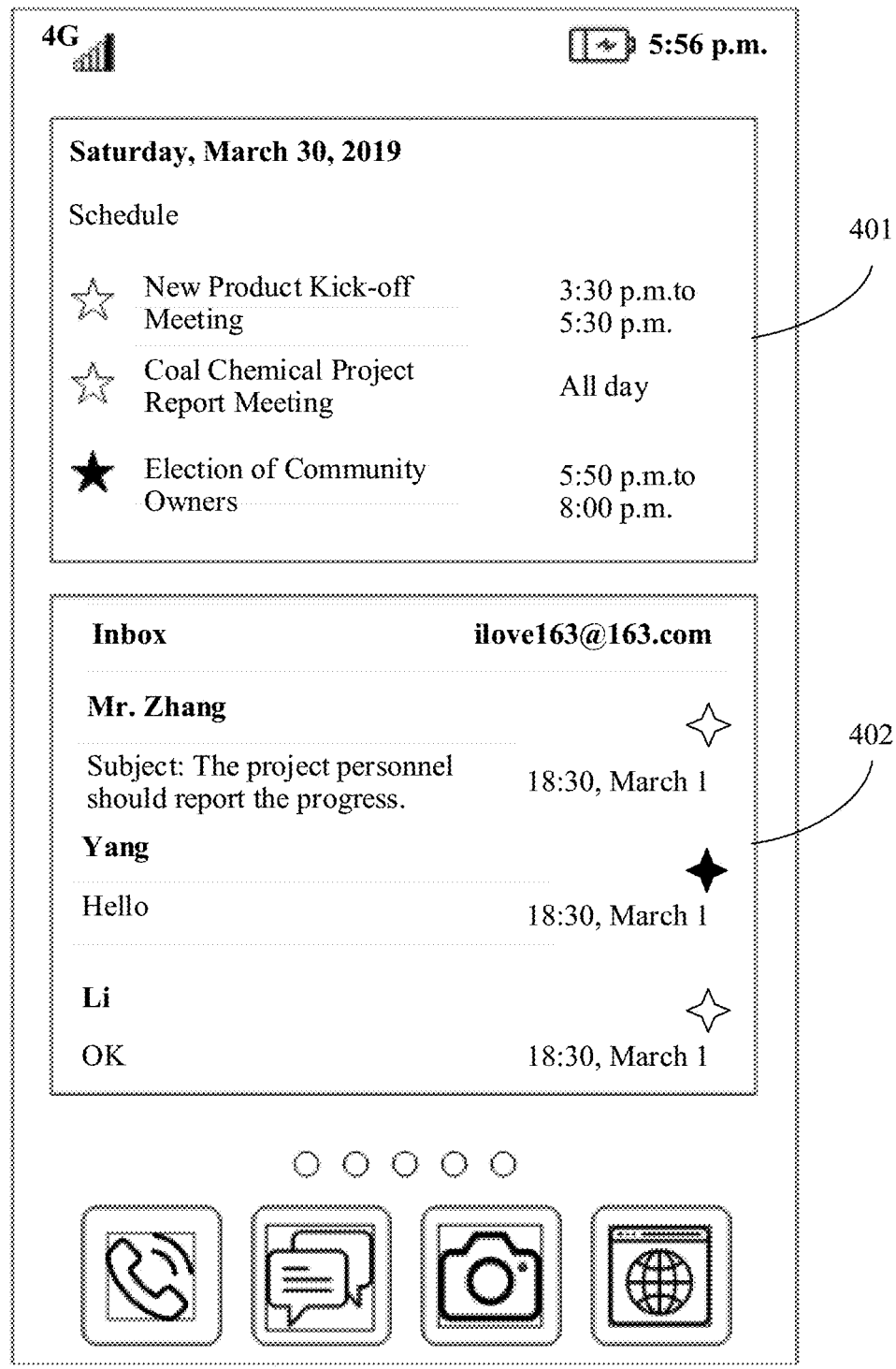
FIG. 4C is still another schematic diagram of a home screen of an electronic device according to an embodiment of this application.

FIG. 4B is a flowchart of displaying a widget according to an embodiment of this application. When the electronic device detects a widget update event, the electronic device determines whether an application corresponding to a view is protected by an application lock. For example, the widget update event may include an event, for example, turning a page of a home screen, powering on the electronic device, turning on a screen after the screen is locked, switching from an application interface to the home screen, or adding a new widget. If the electronic device determines that the application is protected by the application lock, the electronic device displays the widget, and displays a locking view over the widget. For example, for this display manner, refer to the user interface 41 shown in FIG. 4A-1 and FIG. 4A-2. If the electronic device determines that the application is not protected by the application lock, the electronic device displays the widget. For example, for this display manner, refer to a user interface 42 shown in FIG. 4C. In this manner, when an application is protected by an application lock, a locking view is displayed over a widget corresponding to the application. The locking view can avoid an information leak of the application, and this improves security of application information.

Figure 4D:
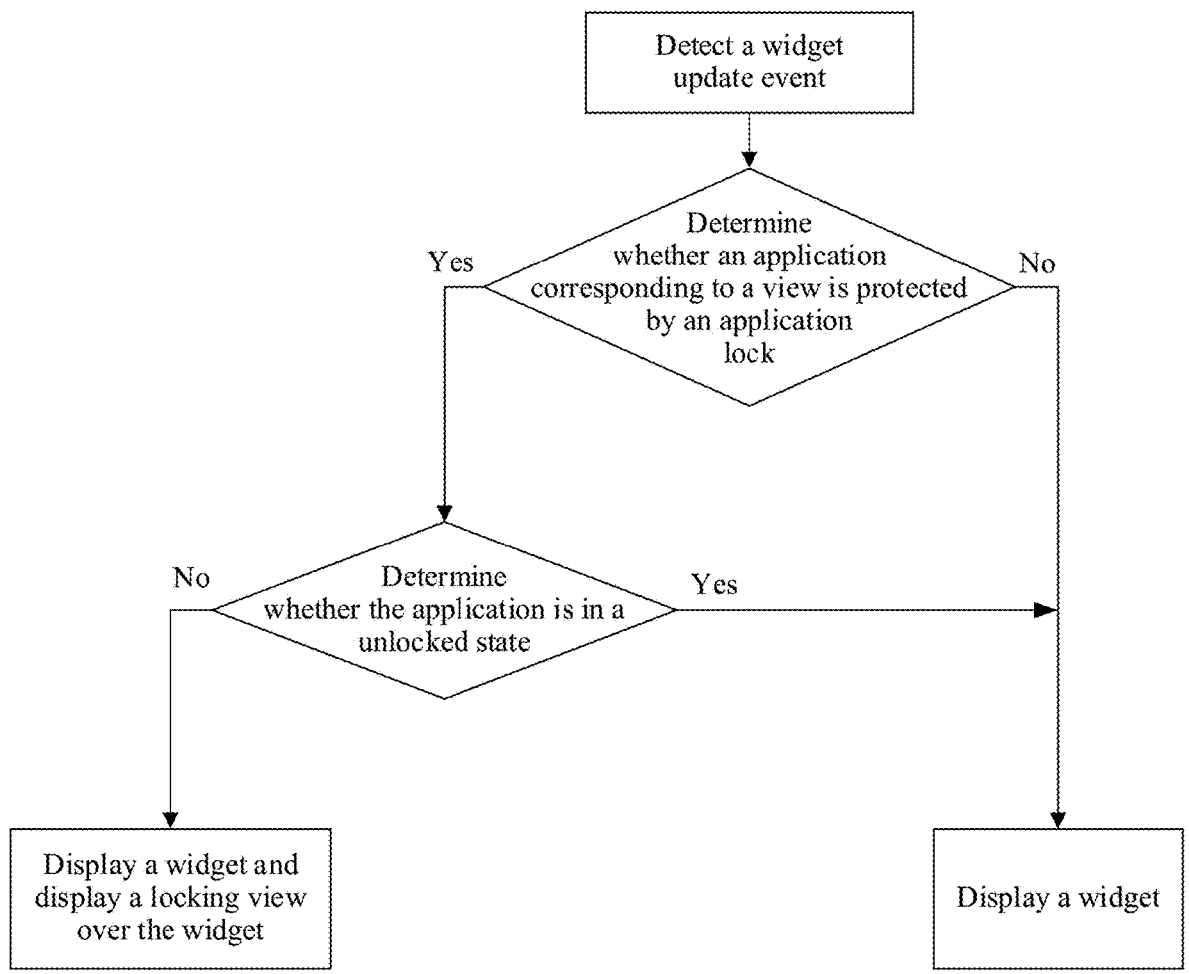
FIG. 4D is another flowchart of displaying a widget according to an embodiment of this application.

In some other embodiments of this application, for a process of displaying the widget by the electronic device, alternatively refer to a flowchart shown in FIG. 4D. In this embodiment, when the electronic device detects a widget update event, the electronic device determines whether an application corresponding to a view is protected by an application lock. If the electronic device determines that the application is not protected by the application lock, the electronic device displays the widget. If the electronic device determines that the application is protected by the application lock, the electronic device determines whether the application is in an unlocked state. If the application is in the unlocked state, the electronic device displays the widget. If the application is in a locked state, the electronic device displays the widget, and displays a locking view over the widget.

In some possible implementations, the electronic device may query, through the application lock module, whether the application corresponding to the widget is in the unlocked state. For example, the application lock module stores a record indicating whether each application is in the unlocked state. The electronic device may query the record in the application lock module based on an application identifier of the application corresponding to the widget, to determine whether the application corresponding to the widget is in the unlocked state. Alternatively, when the electronic device queries whether the application corresponding to the widget is in the unlocked state, the application lock module may determine a status of the application corresponding to the widget, and then feed back a determining result to the electronic device.

The following describes some manners in which the application lock module determines whether an application is in the unlocked state. In an optional manner, if the application lock module determines that the user has unlocked an application lock of the application, and time between a current moment and a moment at which the application lock of the application is successfully unlocked most recently (or a moment at which a user interface of the application is most recently displayed on a display) does not exceed a preset time period, the application lock module determines that the application is in the unlocked state. Otherwise, the application lock module determines that the application is in the locked state. In another optional manner, if the application lock module determines that the user has unlocked an application lock of the application, and the screen of the electronic device is not locked after the application lock of the application is successfully unlocked most recently, the application lock module determines that the application is in the unlocked state. Otherwise, the application lock module determines that the application is in the locked state. In another optional manner, if the application lock module determines that the user has unlocked an application lock of the application, the screen of the electronic device is not locked after the application lock of the application is successfully unlocked most recently, and time between a current moment and a moment at which the application lock of the application is successfully unlocked most recently (or a moment at which a user interface of the application is most recently displayed on the display) does not exceed a preset time period, it is determined that the application is in the unlocked state. Otherwise, the application lock module determines that the application is in the locked state. The application lock module may update, in real time based on a determining result, the record indicating whether each application is in the unlocked state. Alternatively, the application lock module may further determine the status of the application corresponding to the widget that is queried by the electronic device, and then feed back a determining result of the application to the electronic device.

In this manner, when an application is protected by an application lock and the application is in the locked state, a locking view is displayed over a widget corresponding to the application, so that an application information leak can be avoided, and security of application information can be improved. In addition, when an application is protected by an application lock and the application is in the unlocked state, the electronic device displays a widget. This can reduce user operations and improve efficiency of viewing the widget by the user. For example, in actual application, if a calendar application on the electronic device is protected by an application lock, a locking view is displayed over a widget corresponding to the calendar application on the home screen. Another user cannot view information about the calendar application through the home screen of the electronic device. This protects privacy information of the user. For example, for the home screen of the electronic device, refer to the user interface 41 shown in FIG. 4A-1 and FIG. 4A-2. After the user unlocks the application lock of the calendar application, the user may view an application interface of the calendar application, and operate the calendar application. Then, the user switches to another user interface for operating, for example, editing an email through a mailbox application. In this case, if the user needs to view schedule information, the user may switch back to the home screen to view the widget of the calendar application to obtain the schedule information. Because the time between the current moment and the moment at which the application lock of the application is successfully unlocked most recently (or a moment at which a user interface of the calendar application is most recently displayed on the display) does not exceed the preset time period (for example, a time period of three minutes or five minutes), the electronic device determines that the calendar application is in the unlocked state, and the widget of the calendar application is directly displayed on the home screen. For example, for the home screen of the electronic device, refer to a user interface 42 shown in FIG. 4C. In this manner, operations of unlocking the widget of the calendar application or the calendar application by the user to view the schedule information can be reduced, and operation efficiency of the user can be improved. In another case, if the user wants to lock the widget of the calendar application, the user may lock the screen of the electronic device. After the screen is locked, when the screen of the electronic device is turned on again, because the screen of the electronic device is locked after the calendar application is successfully unlocked most recently, the electronic device may determine that the calendar application is in the unlocked state. In this case, the locking view is displayed over the widget of the calendar application on the home screen. In this manner, the user can conveniently lock the widget, to avoid an application information leak and improve security of application information.

Figure 5A:
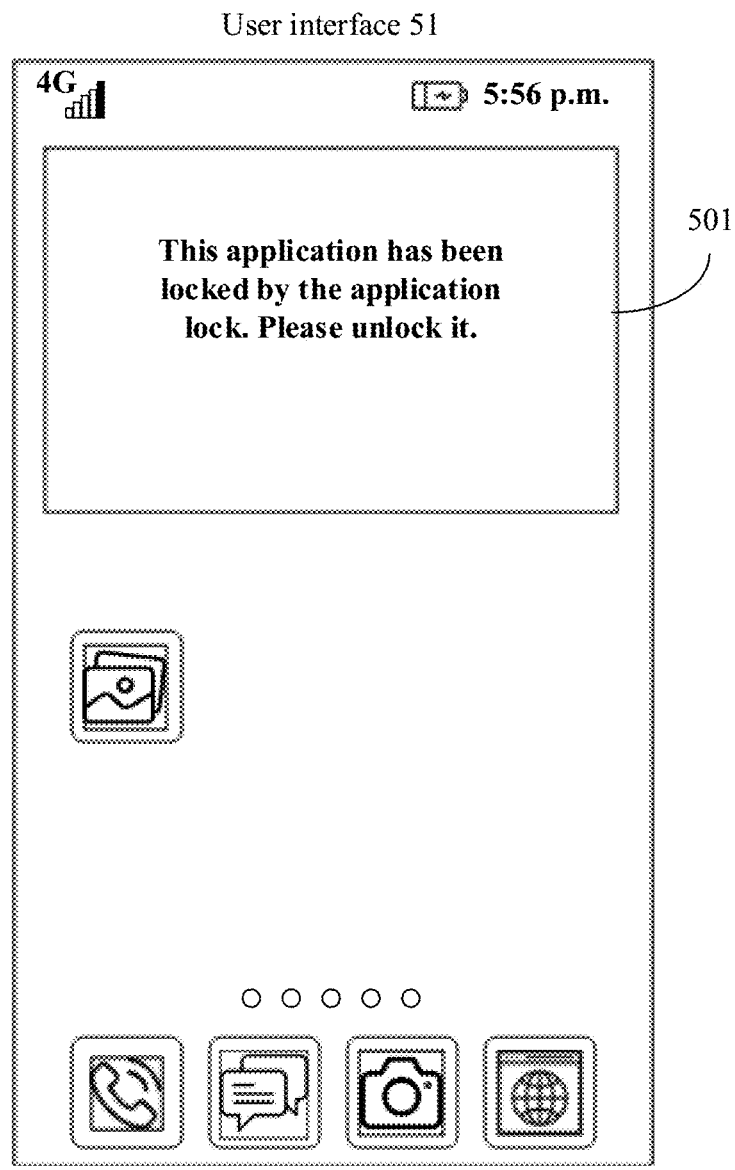
FIG. 5A is a schematic diagram of a user interface on which a widget is displayed according to an embodiment of this application.

In a possible implementation, if an application is protected by an application lock, view information of a widget provided by the application may be in a locked state. In this case, a widget displayed by the electronic device is a widget in the locked state. For example, FIG. 5A is a schematic diagram of displaying a widget according to an embodiment of this application. In this example, view information provided by a calendar application is in the locked state. In a user interface 51, the user interface includes a view 501 of the calendar application, and the view 501 is in the locked state.

Figure 5B:
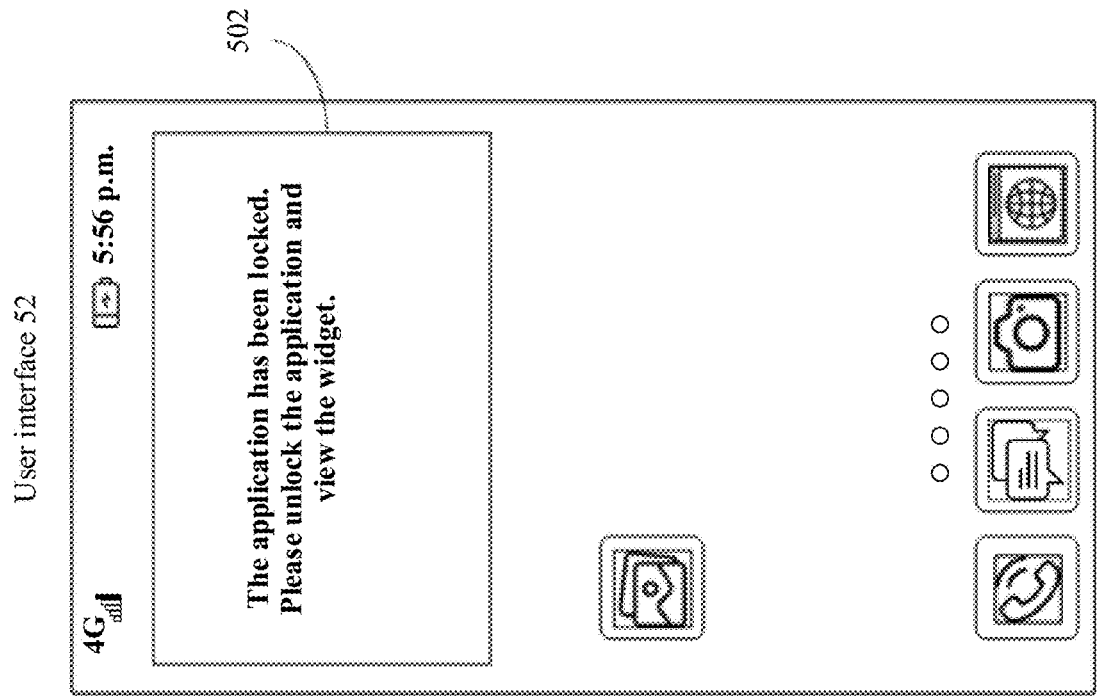
FIG. 5B is a schematic diagram of another user interface on which a widget is displayed according to an embodiment of this application.
Figure 5B:
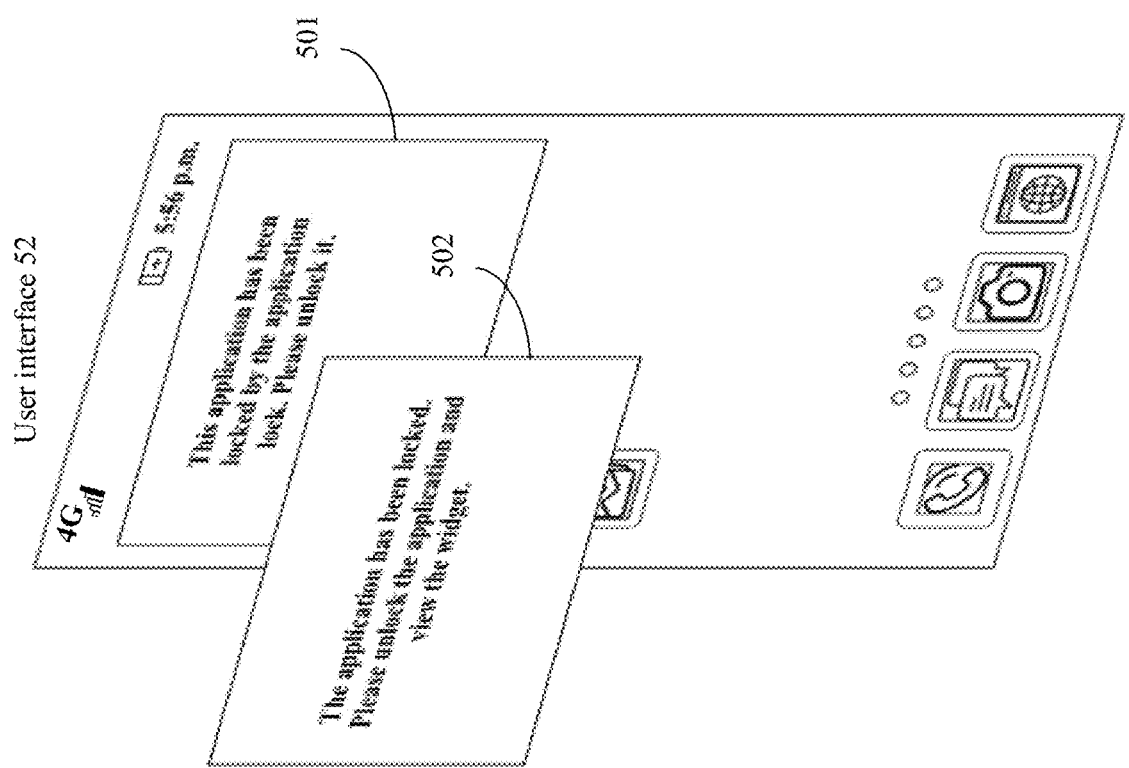

In some embodiments of this application, after the electronic device determines that an application is protected by an application lock, the electronic device displays a locking view over a widget of the application. FIG. 5B is a schematic diagram of displaying a widget according to an embodiment of this application. The calendar application originally provides the view 501 in the locked state. The electronic device may display a locking view 502 over the view 501.

Figure 5C:
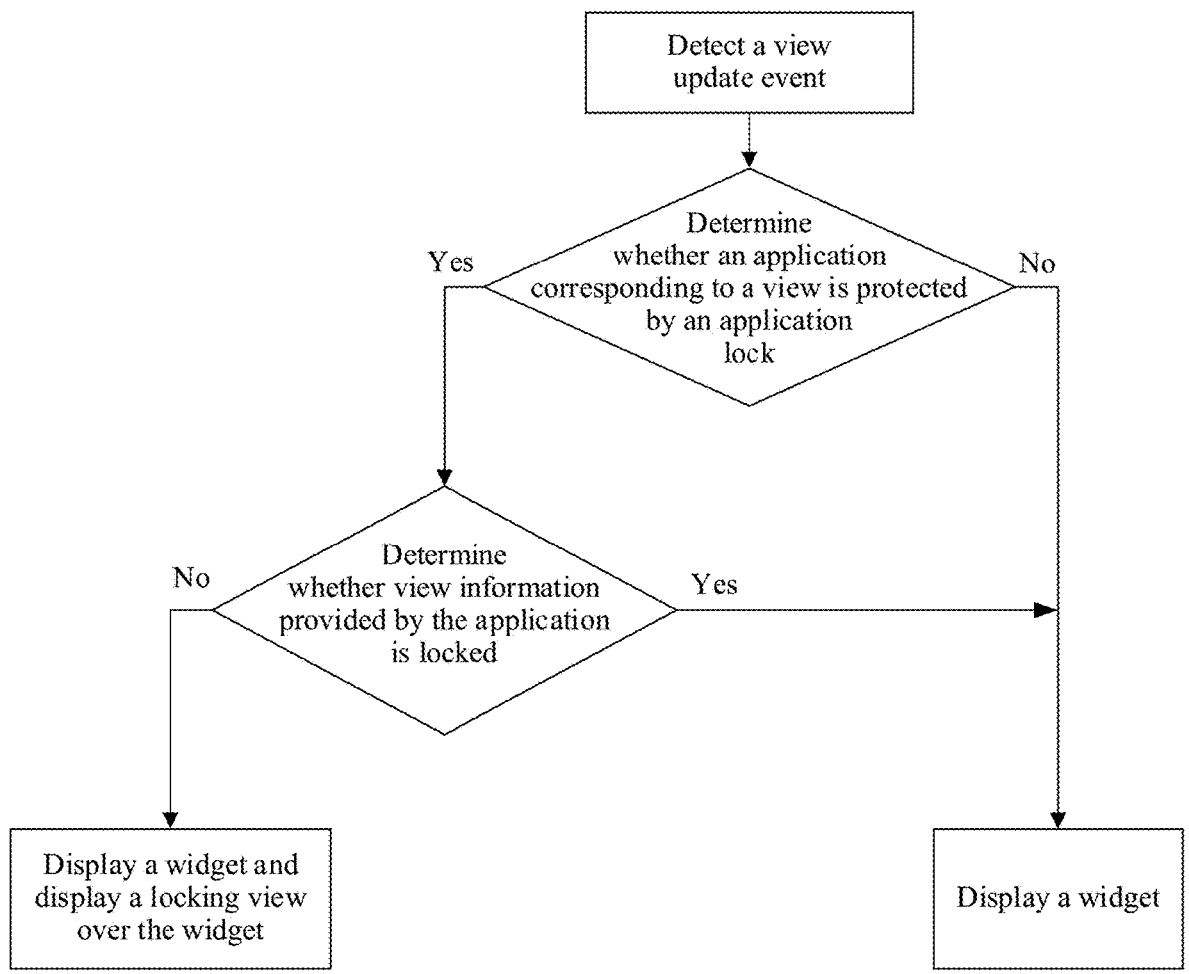
FIG. 5C is still another schematic diagram of displaying a widget according to an embodiment of this application.

In some other embodiments of this application, before displaying the widget of the application protected by the application lock, the electronic device may determine whether view information provided by the application is in the locked state. FIG. 5C is a flowchart of displaying a widget according to an embodiment of this application. In this embodiment, when the electronic device detects a widget update event, the electronic device determines whether an application corresponding to a view is protected by an application lock. If the electronic device determines that the application is not protected by the application lock, the electronic device displays a widget. If the electronic device determines that the application is protected by the application lock, the electronic device determines whether view information provided by the application is in the locked state. If the view information provided by the application is in the locked state, the electronic device displays the widget. If the view information provided by the application is not in the locked state, the electronic device displays the widget, and displays a locking view over the widget. In this manner, when the application provides the view information that is in the locked state, the electronic device may normally display the widget, and may retain a widget lock manner of the application.

Figure 5D:
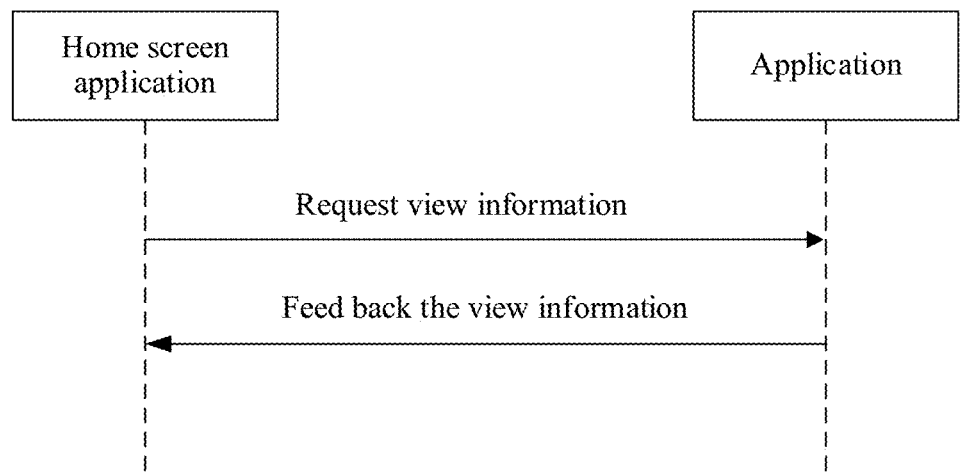
FIG. 5D is a flowchart of obtaining view information according to an embodiment of this application.

The following describes some manners in which the electronic device determines whether the view information provided by the application is in the locked state. Manner 1: FIG. 5D is a flowchart of obtaining view information according to an embodiment of this application. A home screen application of the electronic device detects a widget update event, and the home screen application initiates an update operation. The home screen application sends a request to an application corresponding to a widget, where the request is used to request view information. In response to the request, the application feeds back the view information to the home screen application. The view information may include information such as a display style, a location, and display data of the widget, and indication information indicating whether the view information is in the locked state. The home screen application may determine, based on the obtained view information, whether the view information provided by the application is in the locked state.

Figure 5E:
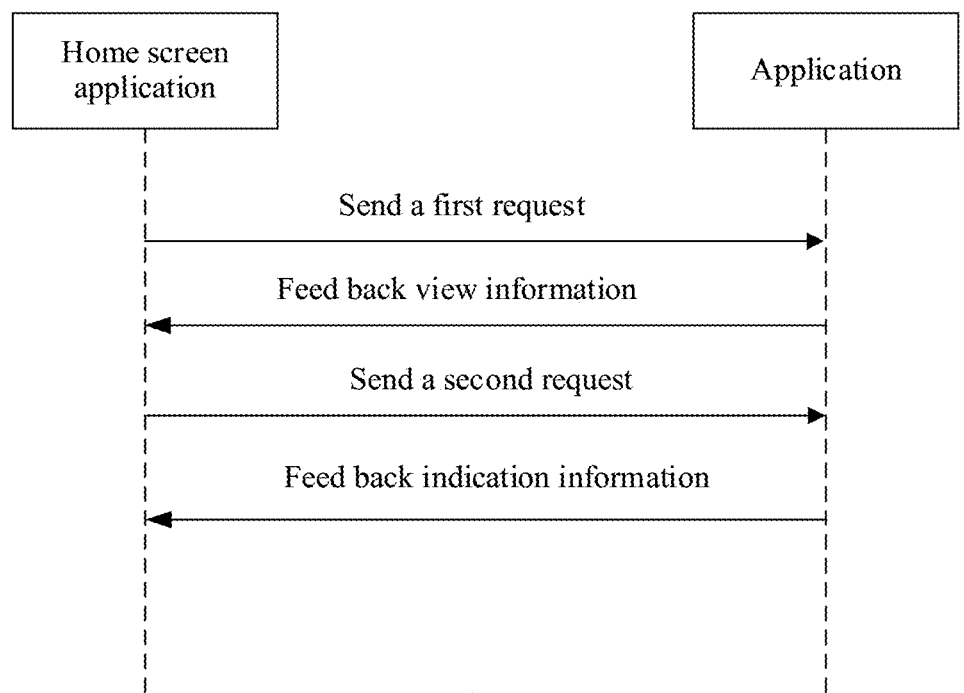
FIG. 5E is another flowchart of obtaining view information according to an embodiment of this application.

Manner 2: FIG. 5E is another flowchart of obtaining view information according to an embodiment of this application. A home screen application of the electronic device detects a widget update event, and the home screen application initiates an update operation. The home screen application sends a first request to an application corresponding to a widget, where the first request is used to request view information. In response to the first request, the application feeds back the view information to the home screen application. The view information may include information such as a display style, a location, and display data of the widget. Then, the home screen application sends a second request to the application, where the second request is used to query whether the view information is in the locked state. The second request includes an identifier of each piece of view information. Then, the application may feed back, to the home screen application based on the second request, indication information indicating whether the view information is in the locked state. Specifically, the application may determine, based on the identifier of each piece of view information, whether the view information corresponding to the identifier is in the locked state. The indication information may include information indicating whether each piece of view information is in the locked state.

Manner 3: A home screen application of the electronic device detects a widget update event, and the home screen application initiates an update operation. The home screen application sends a request to an application corresponding to a widget, where the request is used to request view information. In response to the request, the application feeds back the view information to the home screen application. Then, the home screen application may query, through a database or preset storage area of the electronic device, whether the view information is in the locked state. The database or the preset storage area of the electronic device may be used to store information indicating whether the view information is in the locked state. The application may write, into the database or the preset storage area, the information indicating whether the view information is in the locked state, and the home screen application may read, from the database or the preset storage area, the information indicating whether the view information is in the locked state.

Manner 4: A home screen application of the electronic device detects a widget update event, and the home screen application initiates an update operation. The home screen application sends a request to an application corresponding to a widget, where the request is used to request view information. In response to the request, the application feeds back the view information to the home screen application. Then, the application may broadcast information indicating whether the view information is in the locked state. The home screen application may determine, based on the received broadcast information, whether the view information provided by the application is in the locked state.

It should be noted that there may be another manner of determining whether the view information provided by the application is in the locked state.

Figure 5F:
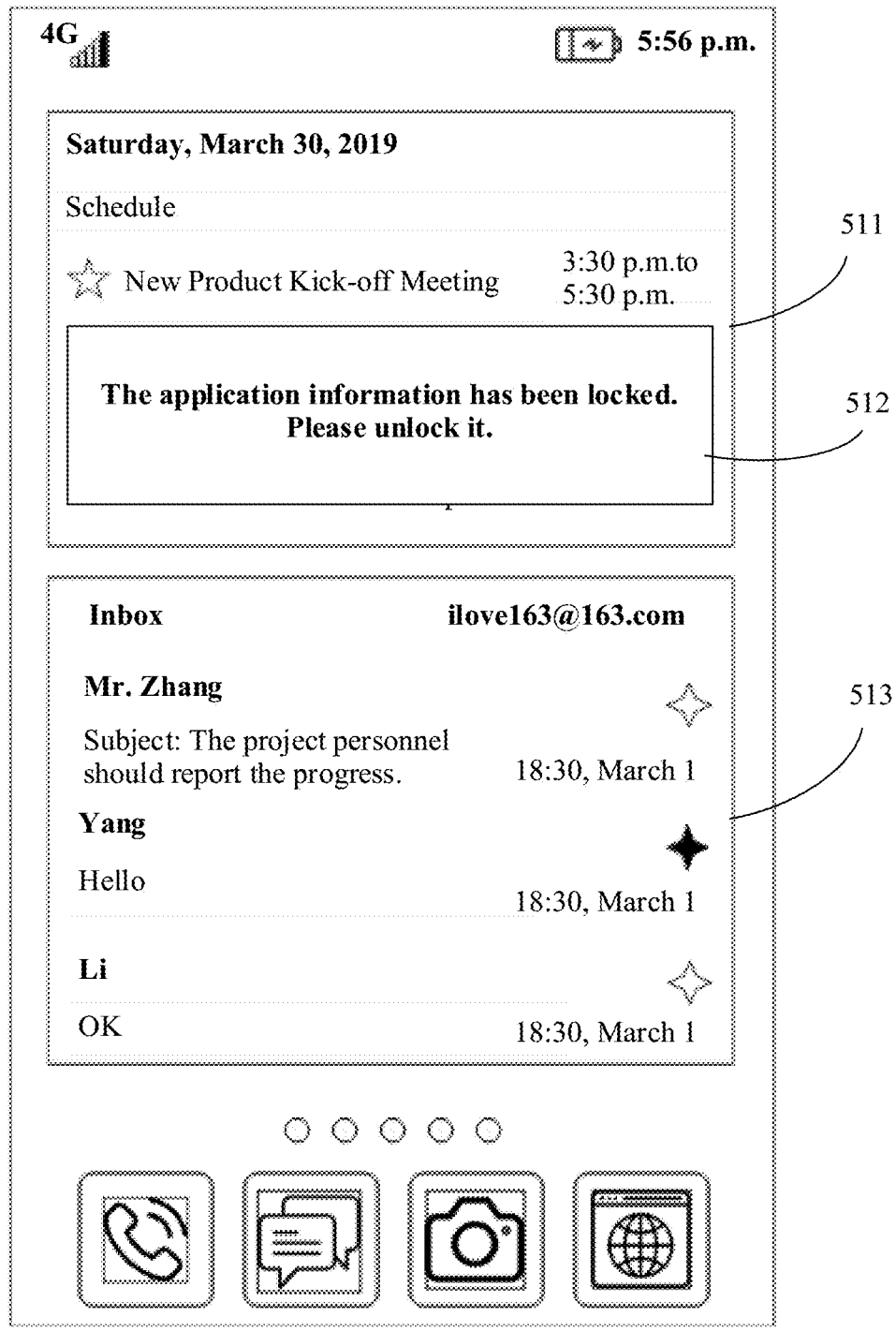
FIG. 5F is a schematic diagram of a display view according to an embodiment of this application.

In some other embodiments of this application, the electronic device may display a locking view over view information in the locked state, and normally display view information that is not in the locked state. For example, for this display manner, refer to a user interface shown in FIG. 5F. A user interface 53 includes a view 511 of the calendar application and a view 513 of a mailbox application. In the view 511, display data "Coal Chemical Project Report Meeting All day" and "Election of Community Owners Committee 5:50 p.m. to 8:00 p.m." is in the locked state. The electronic device displays a locking view 512 over the two pieces of view information. In this manner, the electronic device may display, in encrypted mode, information that needs to be protected, and normally display basic information.

Figure 6A:
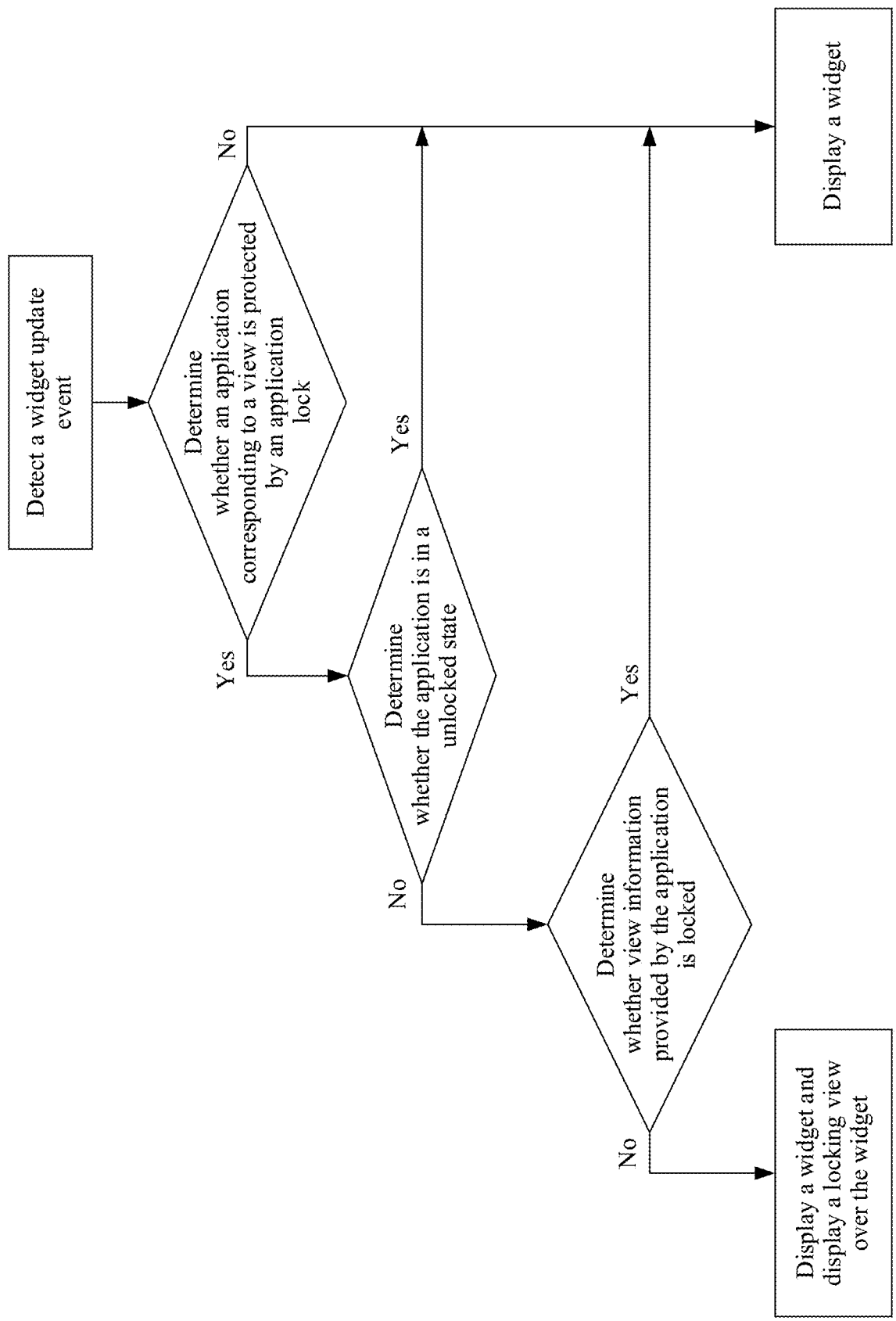
FIG. 6A is yet another flowchart of displaying a widget according to an embodiment of this application.

In some other embodiments of this application, for a process of displaying the widget by the electronic device, alternatively refer to a flowchart shown in FIG. 6A. In this embodiment, when the electronic device detects a widget update event, the electronic device determines whether an application corresponding to a view is protected by an application lock. If the electronic device determines that the application is not protected by the application lock, the electronic device displays a widget. If the electronic device determines that the application is protected by the application lock, the electronic device determines whether the application is in an unlocked state. If the application is in the unlocked state, the electronic device displays the widget. If the application is in a locked state, the electronic device determines whether view information provided by the application is in the locked state. If the view information provided by the application is in the locked state, the electronic device displays the widget. If the view information provided by the application is not in the locked state, the electronic device displays the widget, and displays a locking view over the widget.

It should be noted that the above listed locking view is only an example. In some possible implementations, the locking view may be in another form. For example, the locking view may alternatively be displayed as a magazine view. Optionally, some landscape or portrait graphics may be periodically updated in the magazine view. Alternatively, weather information, time information, or the like may be displayed in the locking view. Alternatively, the locking view may be displayed as a graphic or an image preset by a user. In this manner, display aesthetics of the electronic device may be further improved, and the locking view may be hidden to some extent, to improve security of user information.

According to the widget display method provided in embodiments of this application, when an application is locked by an application lock, the electronic device may lock a widget of the application on the home screen. In this manner, an application information leak can be avoided, and security of application information can be improved.

The foregoing describes the method for displaying the widget by the electronic device, and the following describes a method for unlocking the locking view of the widget. The locking view may be a view displayed over the widget on the home screen, or may be a widget in the locked state provided by the application.

Figure 6B:
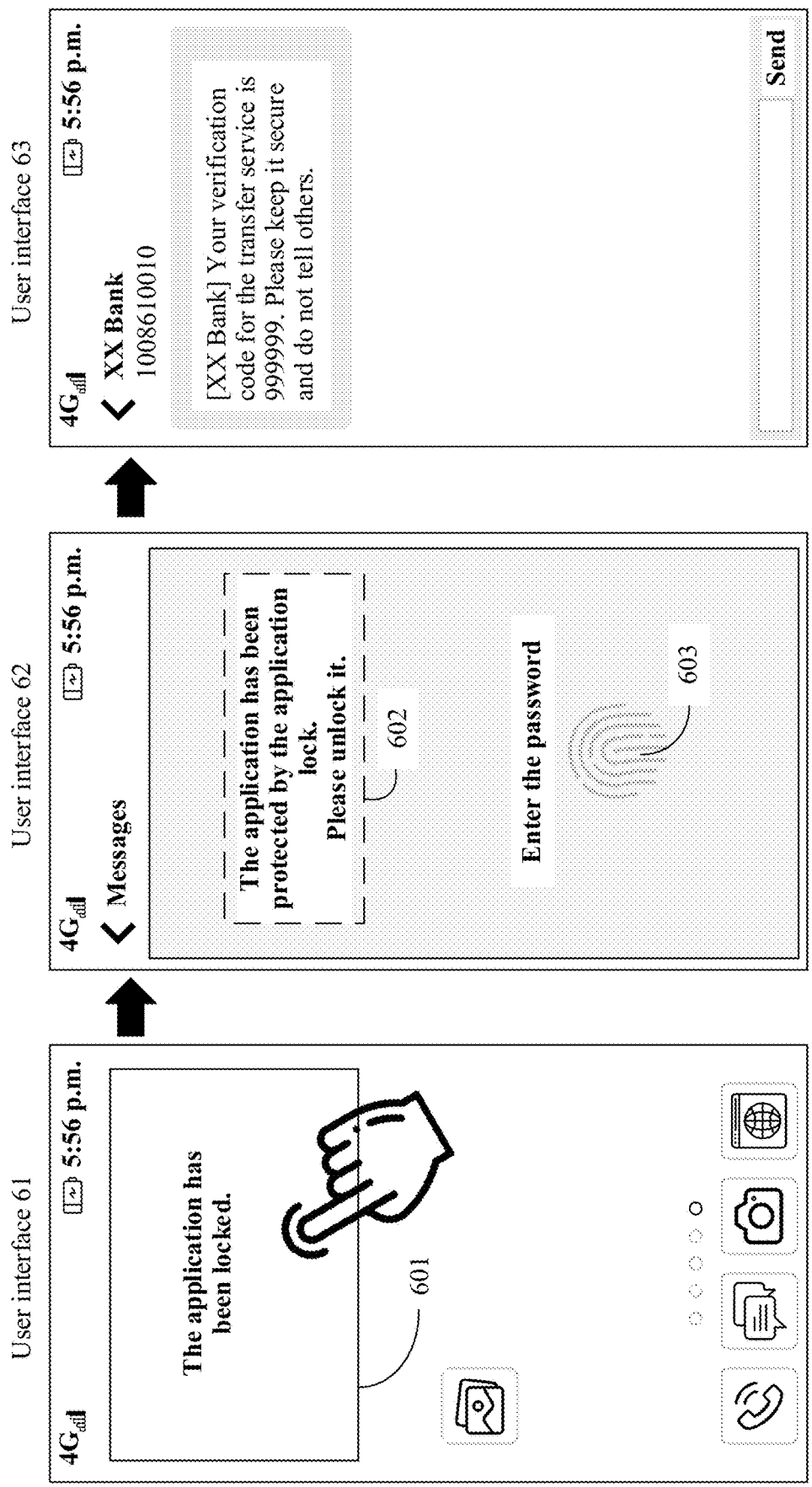
FIG. 6B is a schematic diagram of some user interfaces according to an embodiment of this application.

First, a method for unlocking the widget in the locked state provided by the application in the current technology is described. FIG. 6B is a schematic diagram of some user interfaces according to an embodiment of this application. When the user performs an operation (for example, a touch and hold operation, a tap operation, a double-tap operation, or a force touch operation) on a widget view 601, in response to the operation, the electronic device starts a message application corresponding to the widget view 601, and switches from displaying a user interface 61 to displaying a user interface 62. The user interface 62 is a user interface in the message application, and the user interface includes prompt information 602 and a fingerprint prompt 603. The prompt information 602 is used to prompt the user that the message application is protected by an application lock and the message application needs to be unlocked. The fingerprint indicator 603 is used to indicate a screen area that is on the display and that receives a fingerprint of the user.

When the electronic device successfully matches fingerprint information entered by the user with prestored fingerprint information, the electronic device may switch from displaying the user interface 62 to displaying a user interface 63. The user interface 63 is a user interface in the message application, and message content may be displayed in the interface. It can be seen that, in the current technology, if the user wants to view protected application information in the widget, the user needs to switch to an application to unlock the application before viewing the protected application information. After viewing, the user needs to perform an additional operation to return to the home screen. Therefore, user operations are complex, and user experience is poor.

The following describes a method for unlocking a locking view of a widget provided in embodiments of this application.

Figure 7A:
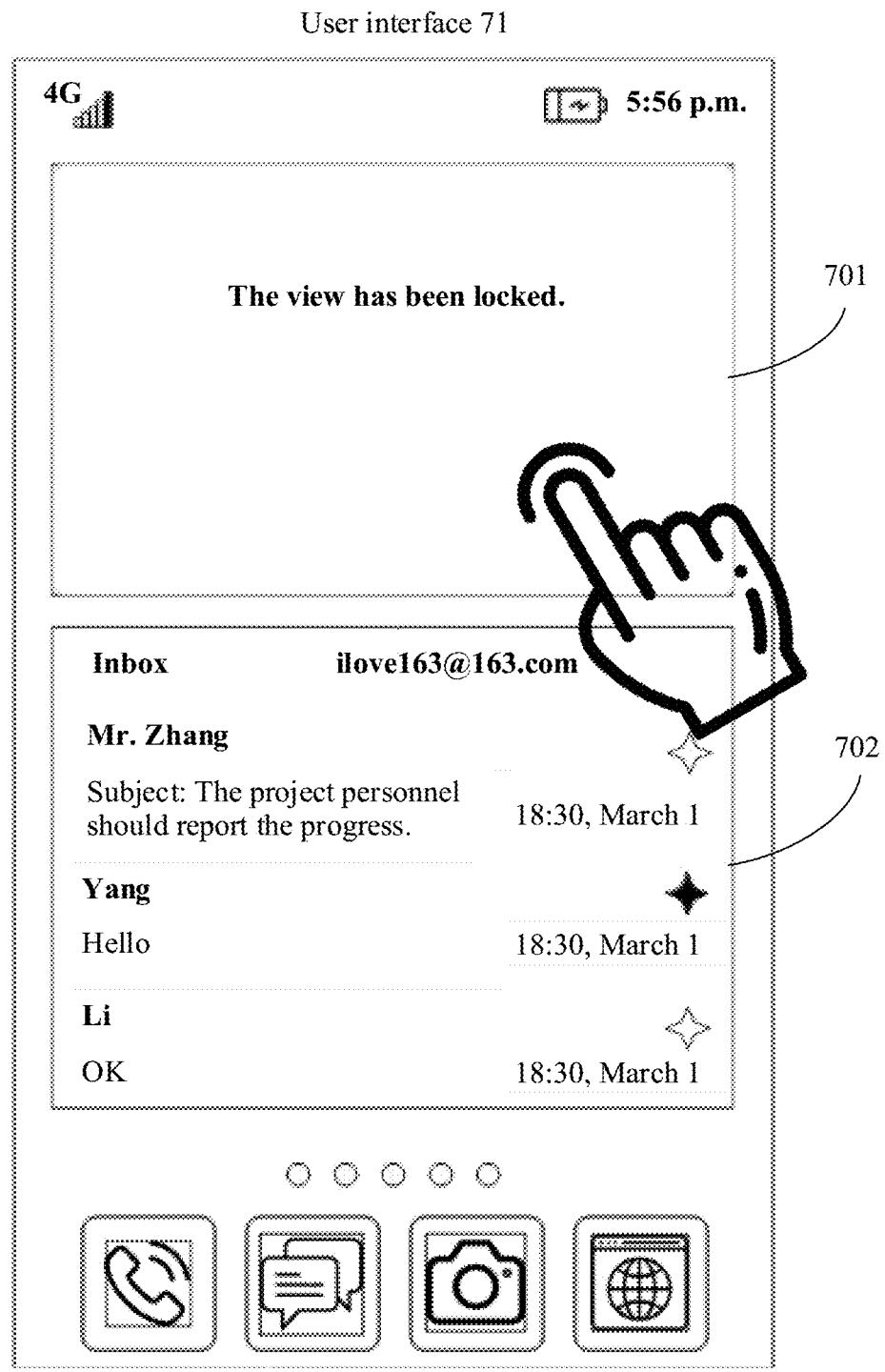
FIG. 7A to FIG. 7G are schematic diagrams of some display interfaces according to an embodiment of this application.
Figure 7B:
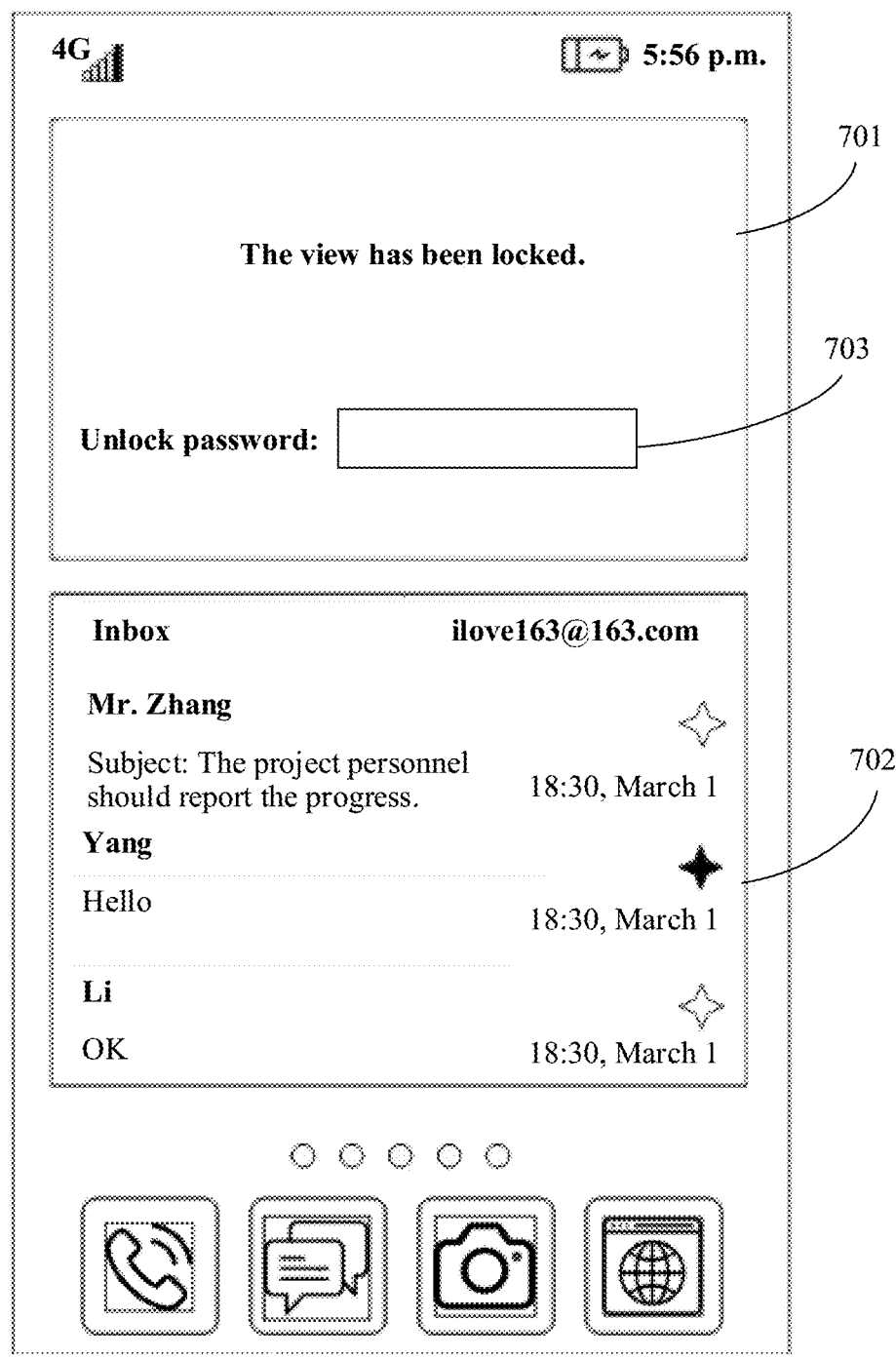

For example, as shown in FIG. 7A and FIG. 7B, in some embodiments of this application, when a user performs an operation (for example, a touch and hold operation, a double-tap operation, a tap operation, or a floating operation) on a locking view, the electronic device displays a password input box over the locking view in response to the operation.

FIG. 7A is a schematic diagram of a display interface according to an embodiment of this application. A user interface 71 is used to display the home screen of the electronic device, and the user interface 71 includes a locking view 701 and a view 702 of a mailbox application. When the user performs an operation on the locking view, in response to the operation, the electronic device switches from displaying the user interface 71 to displaying a user interface 72. FIG. 7B is a schematic diagram of another display interface according to an embodiment of this application. A user interface 72 is used to display the home screen of the electronic device, and the user interface 72 includes a locking view 701 and a view 702 of a mailbox application. A password input box 703 is displayed over the locking view 701. The user may enter an unlock password through the password input box 703, and the unlock password may be one or more of a number, a letter, and a symbol. When the unlock password entered by the user is the same as a prestored unlock password, the electronic device unlocks the locking view. It should be noted that, unlocking the locking view by the electronic device means that the electronic device no longer displays the locking view, and the electronic device updates a widget corresponding to the locking view. Information included in an updated widget is unlocked information. For example, after the unlocking succeeds, the electronic device may switch from displaying the user interface 72 to displaying the user interface 42.

In another possible implementation, when the user performs an operation (for example, a touch and hold operation, a double-tap operation, a tap operation, or a floating operation) on a locking view, the electronic device may alternatively display a pattern password over the locking view in response to the operation. For this display manner, refer to a user interface 73 shown in FIG. 7C. The user interface 73 includes a locking view 701 and a view 702 of the mailbox application. A pattern password 704 is displayed over the locking view 701. The user may enter an unlock track through the pattern password 704. When the unlock track entered by the user is the same as a prestored unlock track, the electronic device unlocks the locking view. For example, after the unlocking succeeds, the electronic device may switch from displaying the user interface 73 to displaying the user interface 42.

In some other embodiments, a locking view displayed by the electronic device may include a password input box or a pattern password. The user may directly enter an unlock password through the password input box, or enter an unlock track through the pattern password, and does not need to operate the locking view.

In some other embodiments, when the user performs an operation (for example, a touch and hold operation, a double-tap operation, a tap operation, or a floating operation) on a locking view, the electronic device may display a dialog box in response to the operation. The dialog box may include a password input box, a pattern password, or the like. For example, FIG. 7D is a schematic diagram of still another display interface according to an embodiment of this application. A user interface 74 includes a dialog box 705. The dialog box 705 includes a password input box 706. The user may enter an unlock password through the password input box 706. FIG. 7E is a schematic diagram of yet another display interface according to an embodiment of this application. A user interface 75 includes a dialog box 707. The dialog box 707 includes a pattern password 708. The user may enter an unlock track through the pattern password 708. It may be understood that the dialog box may alternatively be displayed in another manner, or the dialog box may be displayed over (or around) a locking view that needs to be unlocked. A display manner and a display location of the dialog box are not limited in embodiments of this application.

In some other embodiments, the electronic device may alternatively unlock a locking view in an in-screen fingerprint-based unlocking manner. For example, FIG. 7F is a schematic diagram of still yet another display interface according to an embodiment of this application. A user interface 76 includes a locking view 711 and a locking view 712. A fingerprint received in a screen area in which the locking view 711 is located may be used to unlock the locking view 711, and a fingerprint received in a screen area in which the locking view 712 is located may be used to unlock the locking view 712. If fingerprint information that is recognized based on the fingerprint entered by the user matches fingerprint information prestored in the electronic device, the electronic device unlocks a locking view corresponding to the fingerprint. For example, as shown in FIG. 7F, a finger of the user touches the screen area in which the locking view 711 is located. The electronic device unlocks the locking view 711 if fingerprint information that is recognized based on a fingerprint entered by the user matches the fingerprint information prestored in the electronic device. After the unlocking succeeds, for a display interface of the electronic device, refer to a user interface 77 shown in FIG. 7G. The user interface 77 includes a view 713 of a calendar application and the locking view 712. Optionally, to prevent the user from accidentally touching the locking view or to avoid an accidental touch caused when the user flips the home screen, the electronic device may verify the fingerprint of the user after detecting that the user touches the locking view for preset time.

In some other possible implementations, fingerprint-based unlocking of the electronic device may alternatively be performed in a specific area. In this case, if fingerprint information that is recognized based on a fingerprint entered by the user matches the fingerprint information prestored in the electronic device, the electronic device may unlock all locking views, or the electronic device unlocks a locking view on a currently displayed user interface, or the electronic device unlocks a locking view that is last touched by the user.

In some other embodiments, the electronic device may alternatively unlock a locking view through face-based unlocking. In a possible implementation, if face information that is recognized by the electronic device based on a user image obtained by a camera matches prestored face information, the electronic device may unlock all locking views, or the electronic device unlocks a locking view on a currently displayed user interface, or the electronic device unlocks a locking view that is last touched by the user.

In another possible implementation, the electronic device may collect an eyeball location by using the camera, to determine a current gaze location of human eyes. Then, the electronic device determines, based on the gaze location, a widget corresponding to the gaze location. If face information that is recognized by the electronic device based on a user image obtained by the camera matches the prestored face information, the electronic device unlocks the widget corresponding to the gaze location. For example, FIG. 7H is a schematic diagram of unlocking a locking view according to an embodiment of this application. The electronic device may collect an eyeball location of the user by using a camera 193, determine a current gaze location of human eyes, and then determine, based on the gaze location, that a widget corresponding to the gaze location is a locking view 733. The electronic device unlocks the locking view 733 when the electronic device determines that face information that is recognized by the electronic device based on a user image obtained by the camera 193 matches prestored face information.

The foregoing describes a manner of unlocking the locking view by the electronic device, and the following describes a process of unlocking the locking view by the electronic device.

Figure 8:
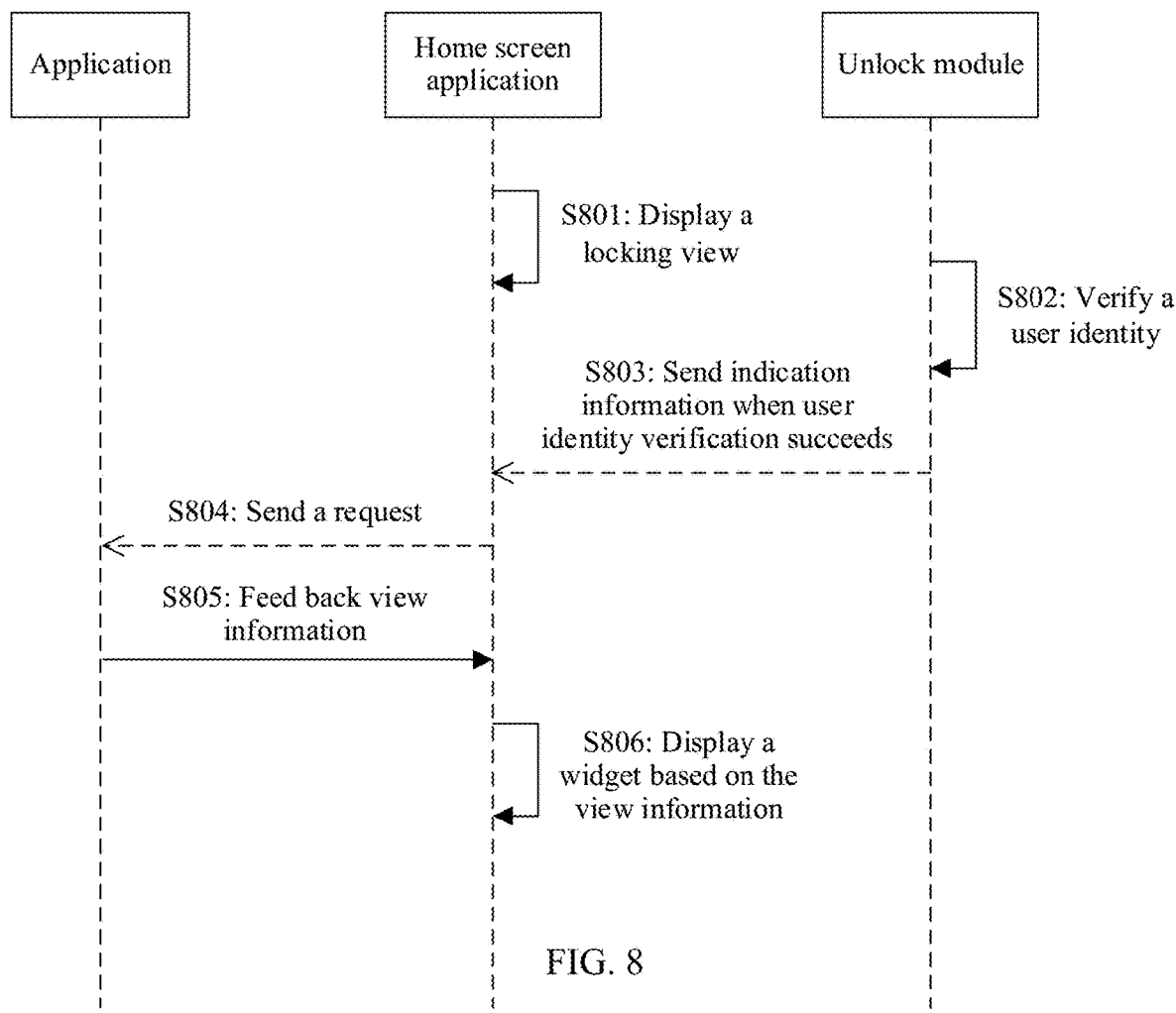
FIG. 8 is a flowchart of a method for unlocking a locking view according to an embodiment of this application.

FIG. 8 is a flowchart of a method for unlocking a locking view according to an embodiment of this application. The method is applied to the electronic device described in the foregoing content, and the method includes the following steps.

S801: A home screen application displays a locking view.

For example, for a user interface on the electronic device on which the locking view is displayed, refer to the user interface 41 shown in FIG. 4A-1 and FIG. 4A-2, the user interface 52 shown in FIG. 5B, the user interface 71 shown in FIG. 7A, the user interface 76 shown in FIG. 7F, a user interface 78 shown in FIG. 7H, and the like.

S802: The unlock module detects an unlock operation, and verifies a user identity.

Refer to the descriptions in the foregoing content. The unlock operation may be an operation or a series of operations. For each unlock operation, the electronic device performs a user identity verification method corresponding to the unlock operation. For example, the unlock operation may be the operation performed by the user for the locking view 701 and the operation of entering the unlock password in the password input box 703 in embodiments shown in FIG. 7A and FIG. 7B. The electronic device may verify the user identity in a password verification manner.

Figure 7C:
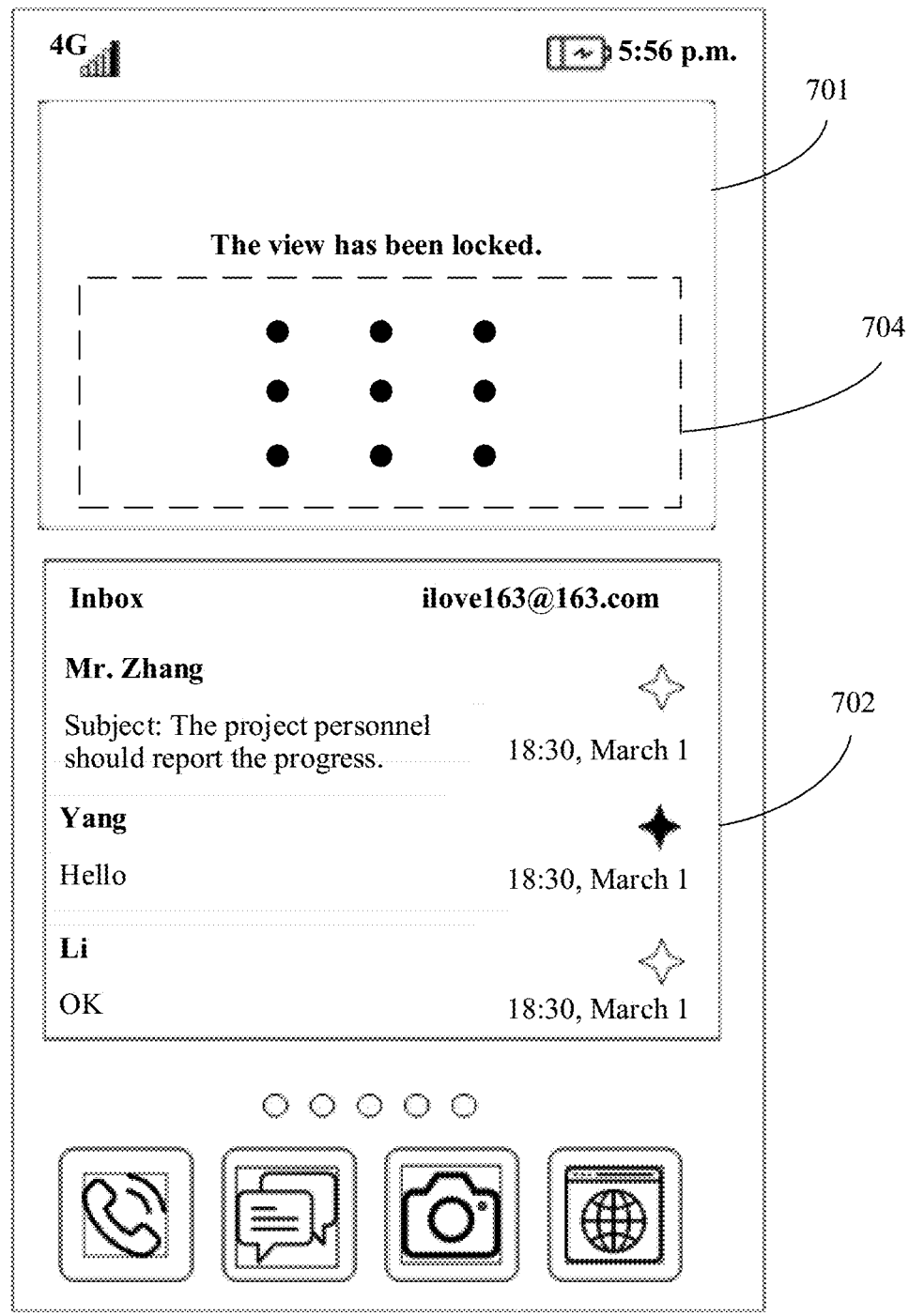
Figure 7D:
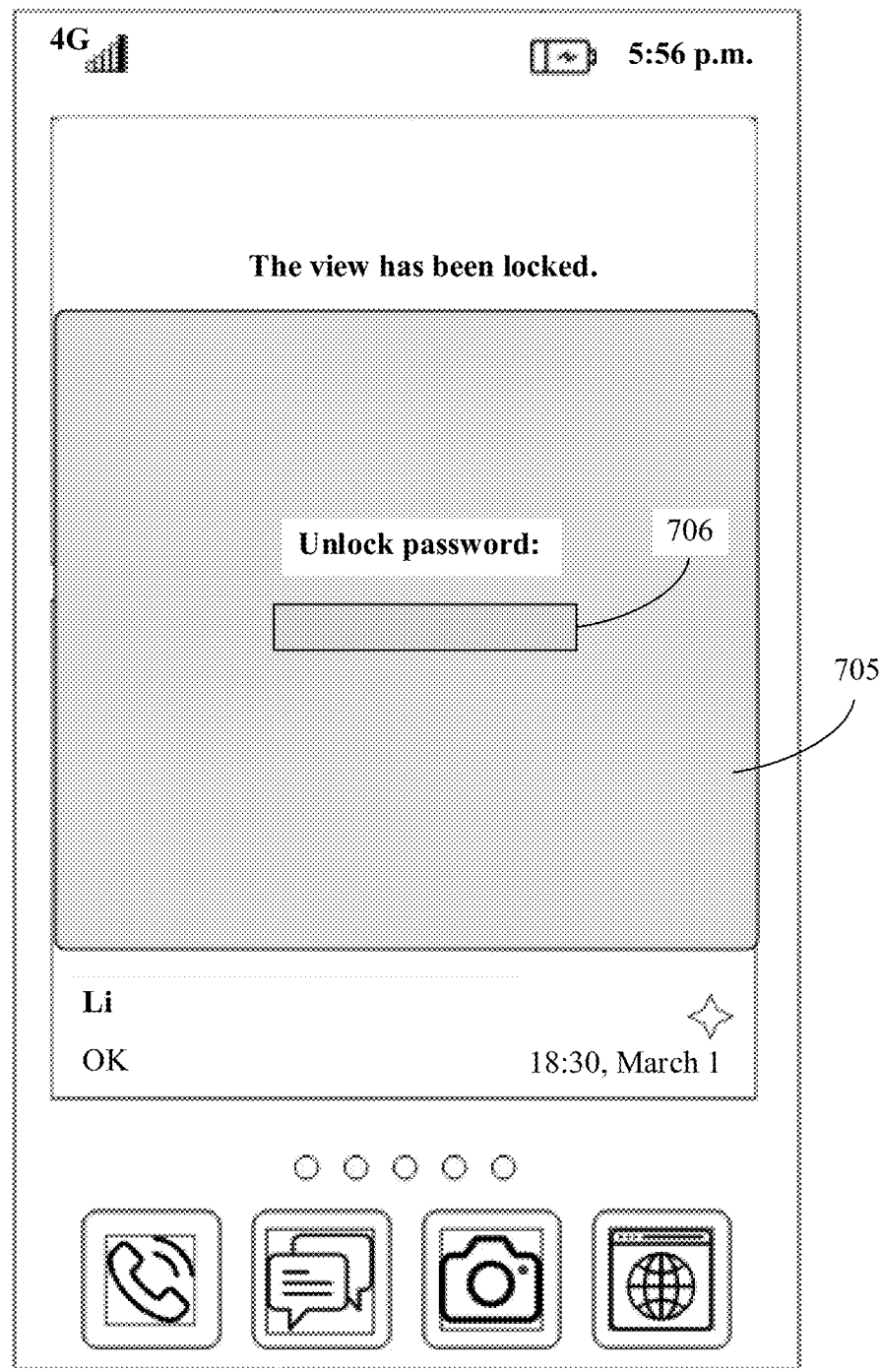
Figure 7E:
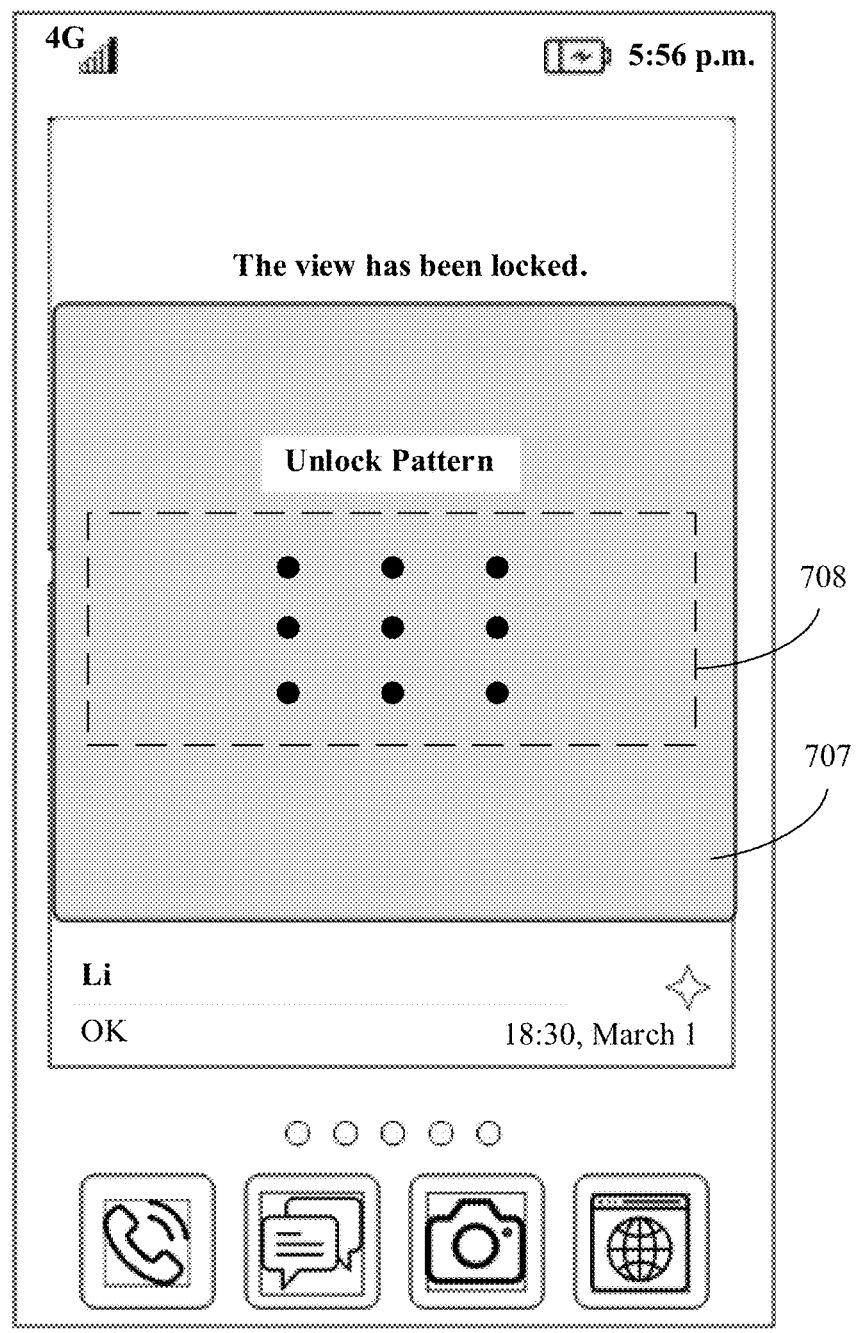
Figure 7F:
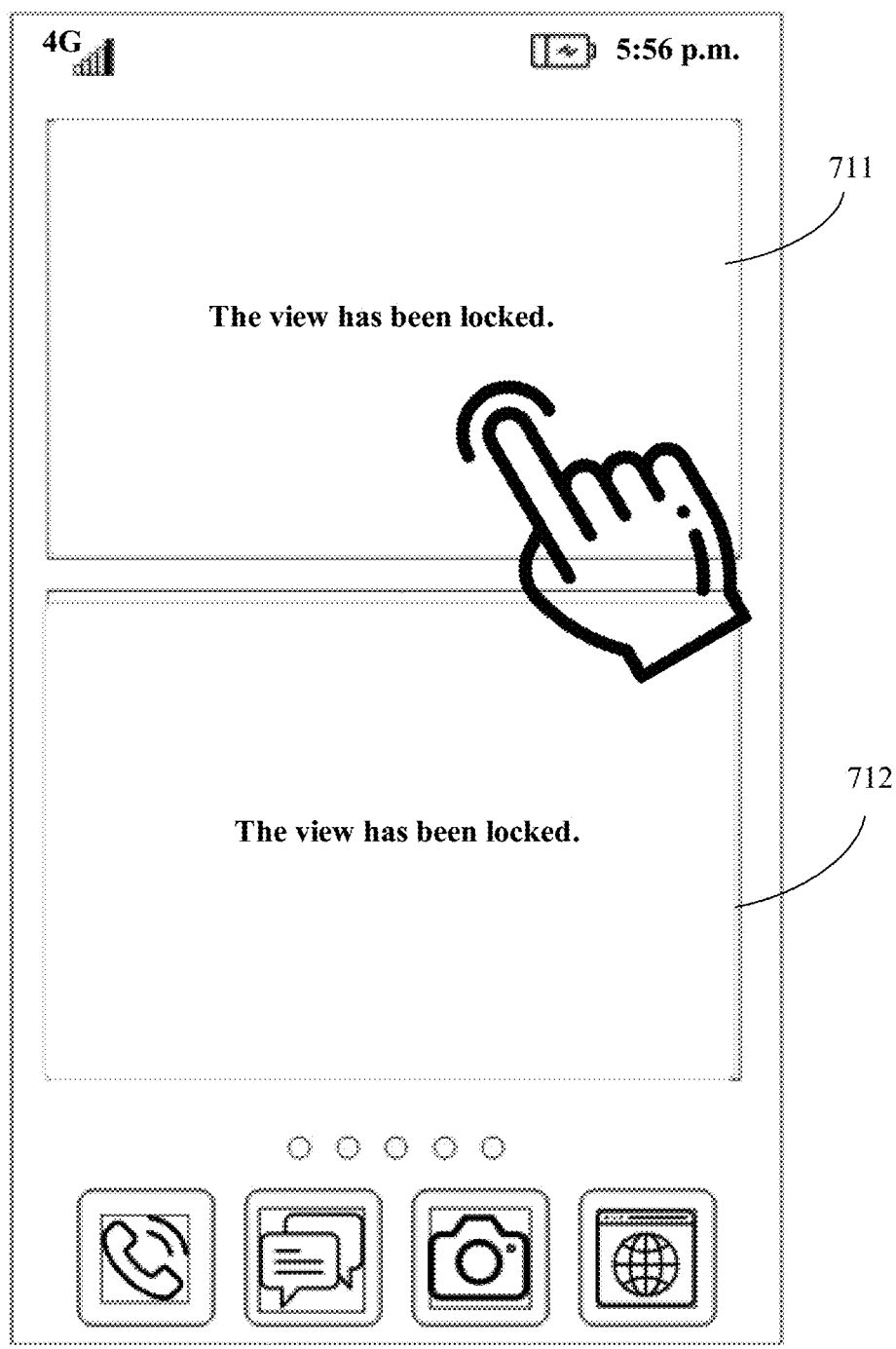

The unlock operation may alternatively be the operation performed by the user for the locking view 701 and the operation of entering the unlock track in the pattern password 704 in embodiments shown in FIG. 7A and FIG. 7C. The electronic device may verify the user identity in an entered track verification manner.

The unlock operation may alternatively be the operation performed by the user for the locking view 701 and the operation of entering the unlock password in the password input box 706 in the dialog box 705 in embodiments shown in FIG. 7A and FIG. 7D. The electronic device may verify the user identity in a password verification manner.

The unlock operation may alternatively be the operation performed by the user for the locking view 701 and the operation of entering the unlock track in the pattern password 708 in the dialog box 707 in embodiments shown in FIG. 7A and FIG. 7E. The electronic device may verify the user identity in an entered track verification manner.

Figure 7G:
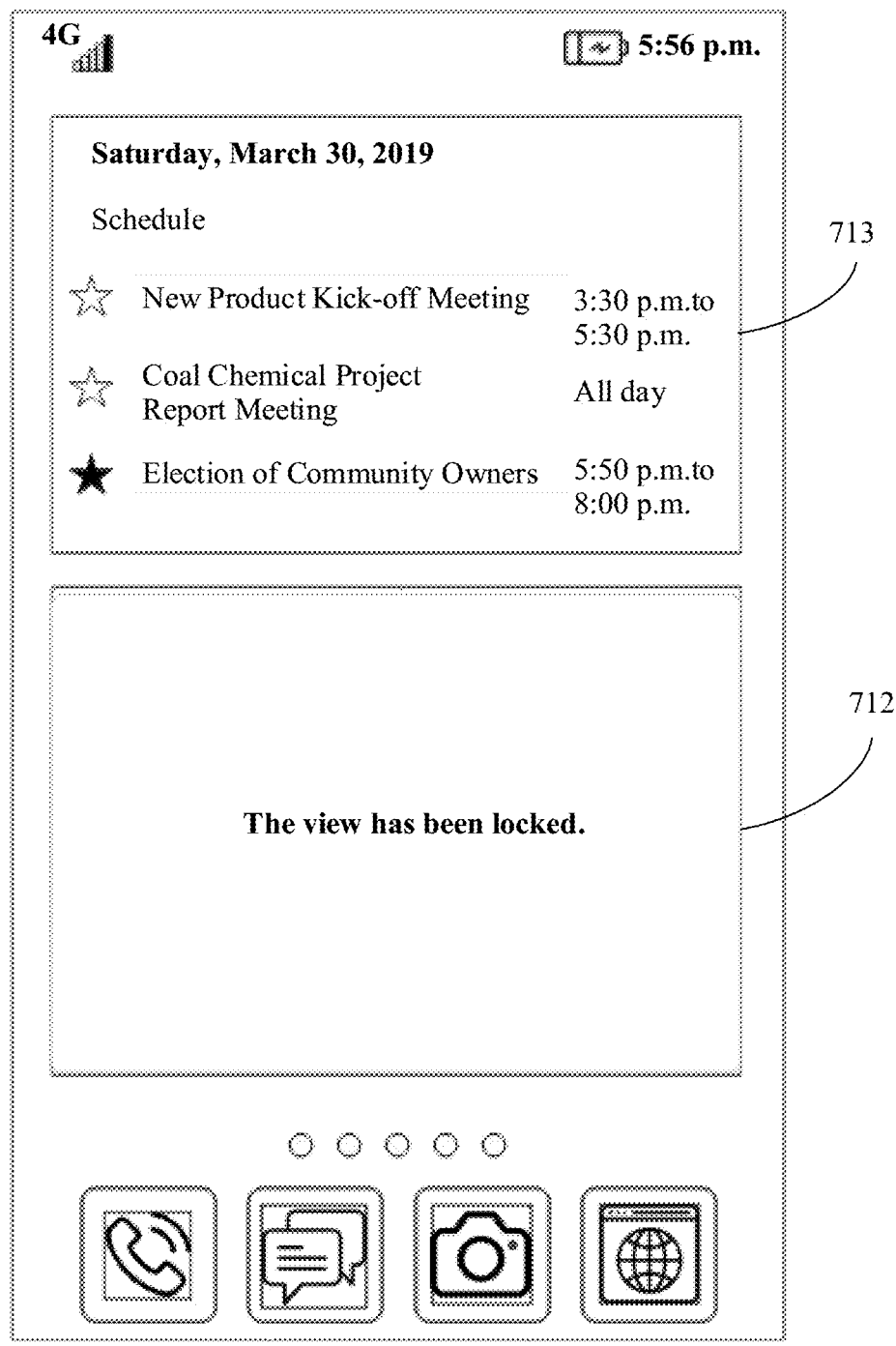
Figure 7H:
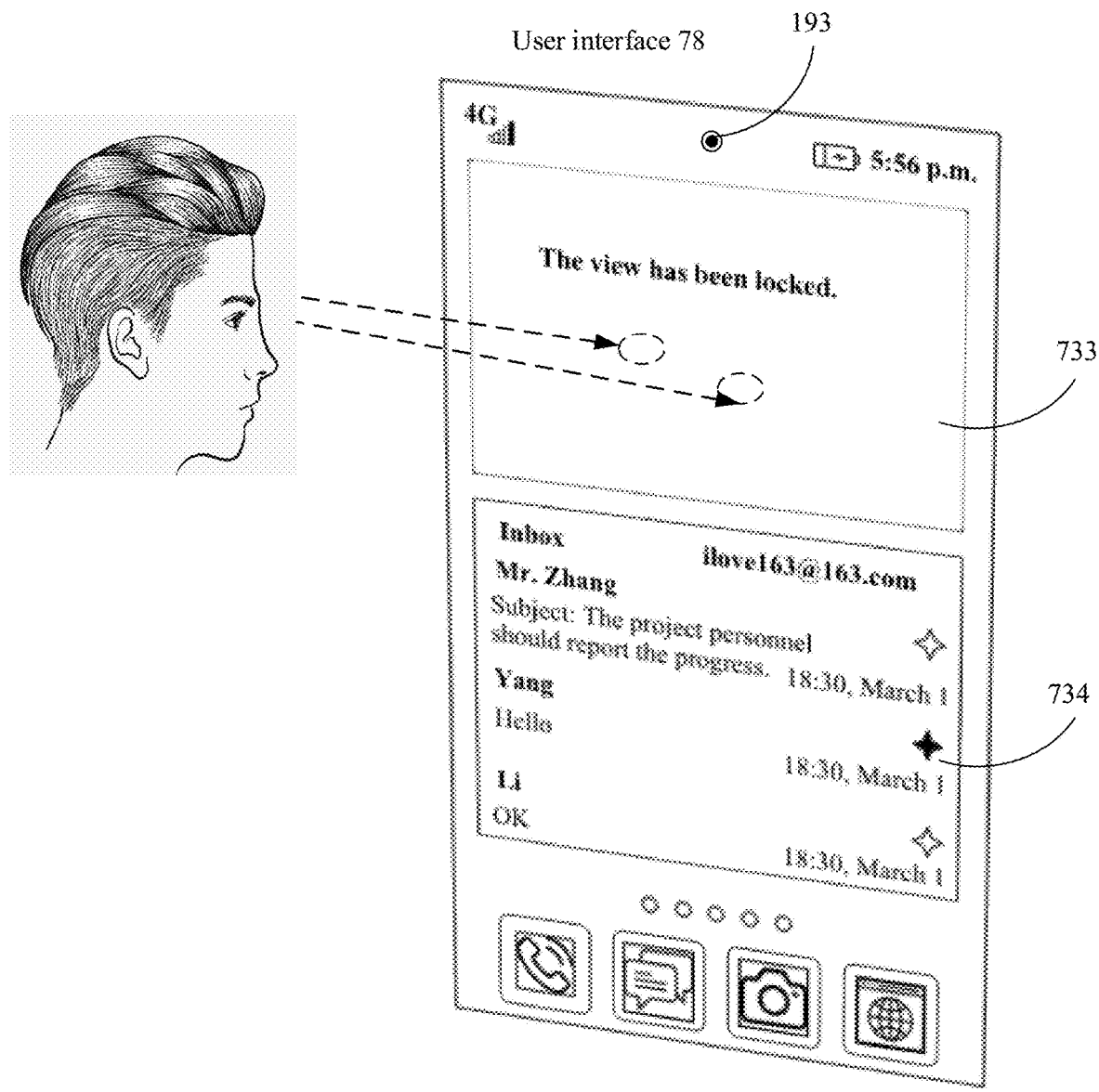
FIG. 7H is a schematic diagram of unlocking a locking view according to an embodiment of this application.

The unlock operation may alternatively be the operation performed by the user for the locking view 701 in embodiments shown in FIG. 7F and FIG. 7G. The electronic device may verify the user identity in a user fingerprint information verification manner.

The unlock operation may alternatively be the operation of gazing at the locking view 733 performed by the user in the embodiment shown in FIG. 7H. The electronic device may verify the user identity in a user face information verification manner.

It should be noted that, without being limited to the unlocking manner described in the foregoing content, the electronic device may alternatively verify the user identity in another manner. For example, the electronic device may alternatively verify the user identity in an iris recognition unlocking manner, a voiceprint recognition unlocking manner, and the like.

S803: The unlock module successfully verifies the user identity, and sends indication information to a home screen application.

The indication information is used to indicate that user identity verification succeeds. In a possible implementation, the indication information may include location information of the locking view. The location information may be determined by an unlock operation entered by the user. For example, in embodiments shown in FIG. 7A and FIG. 7B, the location information may be determined by an operation performed by the user for the locking view 701, and the location information may be information about a location at which the user performs the operation for the locking view. For example, in the embodiment shown in FIG. 7H, the location information may be determined by the gaze operation of the user, and the location information may be a gaze location determined based on the collected eyeball location of the user.

S804: The home screen application sends a request to an application based on the indication message, where the request is used to request view information.

In some embodiments, the application may be determined by the home screen application based on the received location information, and the application is an application corresponding to a widget view over the location information. For example, in embodiments shown in FIG. 7A and FIG. 7B, the home screen application may determine, based on the location information, that the application is a calendar application corresponding to the locking view 701. For example, in the embodiment shown in FIG. 7H, the home screen application may determine, based on the location information, that the application is a calendar application corresponding to the locking view 733.

In some other embodiments, the application may be an application corresponding to a widget view on a currently displayed user interface of the electronic device. In some other embodiments, the application may be an application corresponding to a widget view included on a home screen of the electronic device.

S805: The application feeds back the view information to the home screen application according to the request.

The view information may include information such as a display style, a location, and display data of a widget. It should be noted that the view information is unlocking view information.

S806: The home screen application displays the widget based on the view information fed back by the application.

In this manner, the user may directly unlock the locked widget on the home screen. Different from viewing information after switching to the application to unlock the application in the current technology, in this embodiment of this application, user operations can be reduced, and operation convenience can be improved. In addition, the electronic device may unlock a specific widget based on unlock location information, and this further improves security of application information.

The foregoing content describes the manners of locking and unlocking the widget of the application on the electronic device. In this embodiment of this application, the electronic device may also lock and unlock a notification message.

Figure 9A:
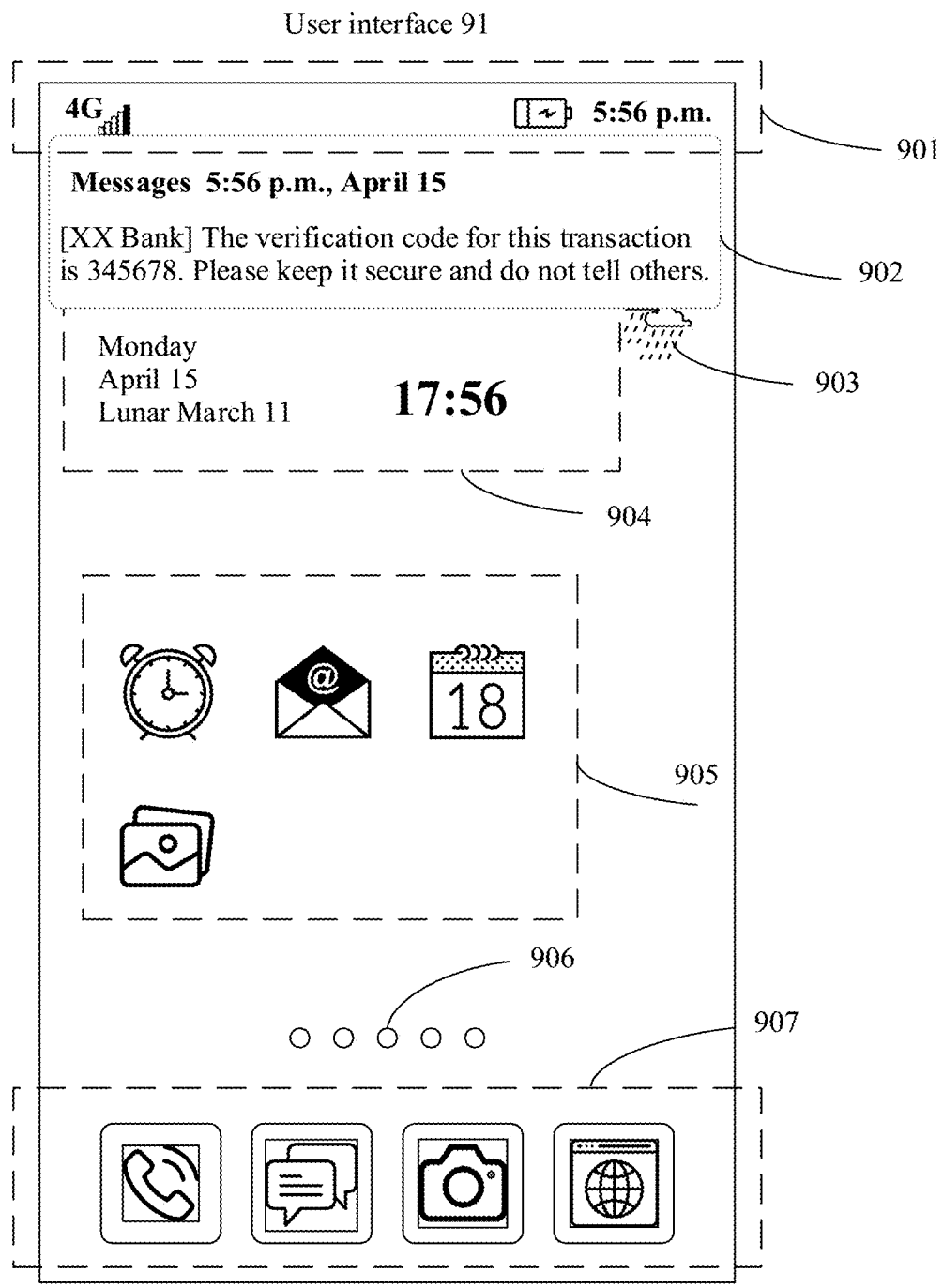
FIG. 9A is a schematic diagram of displaying a notification message according to an embodiment of this application.

FIG. 9A is a schematic diagram of displaying a notification message according to an embodiment of this application. A user interface 91 includes a status bar 901, a notification message 902, a weather indicator 903, a time indicator 904, an application icon display area 905, a page indicator 906, and a tray 907 including icons of frequently used applications. Herein, for the status bar 901, refer to the descriptions of the status bar in the foregoing content. Details are not described herein again.

When an application receives a notification message 902, or when current time reaches reminding time preset by the application, the electronic device may pop up the notification message 902. Optionally, when the user swipes up the notification message 902, the electronic device may no longer display the notification message 902 in response to the swipe-up operation of the user. Optionally, when display time of the notification message 902 exceeds preset time, the electronic device may no longer display the notification message 902. There is a correspondence between a notification message and an application. For example, there is a correspondence between the notification message 902 and an information application. For another example, there is a correspondence between a notification message of a schedule and a calendar application, and there is a correspondence between a notification message of receiving an email and a mailbox application.

The weather indicator 903 may be used to indicate a weather type, for example, cloudy to clear or light rain, and may be further used to indicate information such as a temperature.

The time indicator 904 may be used to indicate current time, for example, a date, a day of a week, and hour and minute information.

The application icon display area 905 may be used to display an icon of an application installed on the electronic device. The application icon included in the application icon display area 905 may be customized by the user.

The page indicator 906 may be used to indicate a quantity of pages and a page that is currently browsed by a user. In addition, the user may swipe leftward or rightward on the current page to browse an application icon on another page.

For the tray 907 including icons of frequently used applications, refer to the descriptions of the tray including icons of frequently used applications in the foregoing content. Details are not described herein again.

Figure 9B:
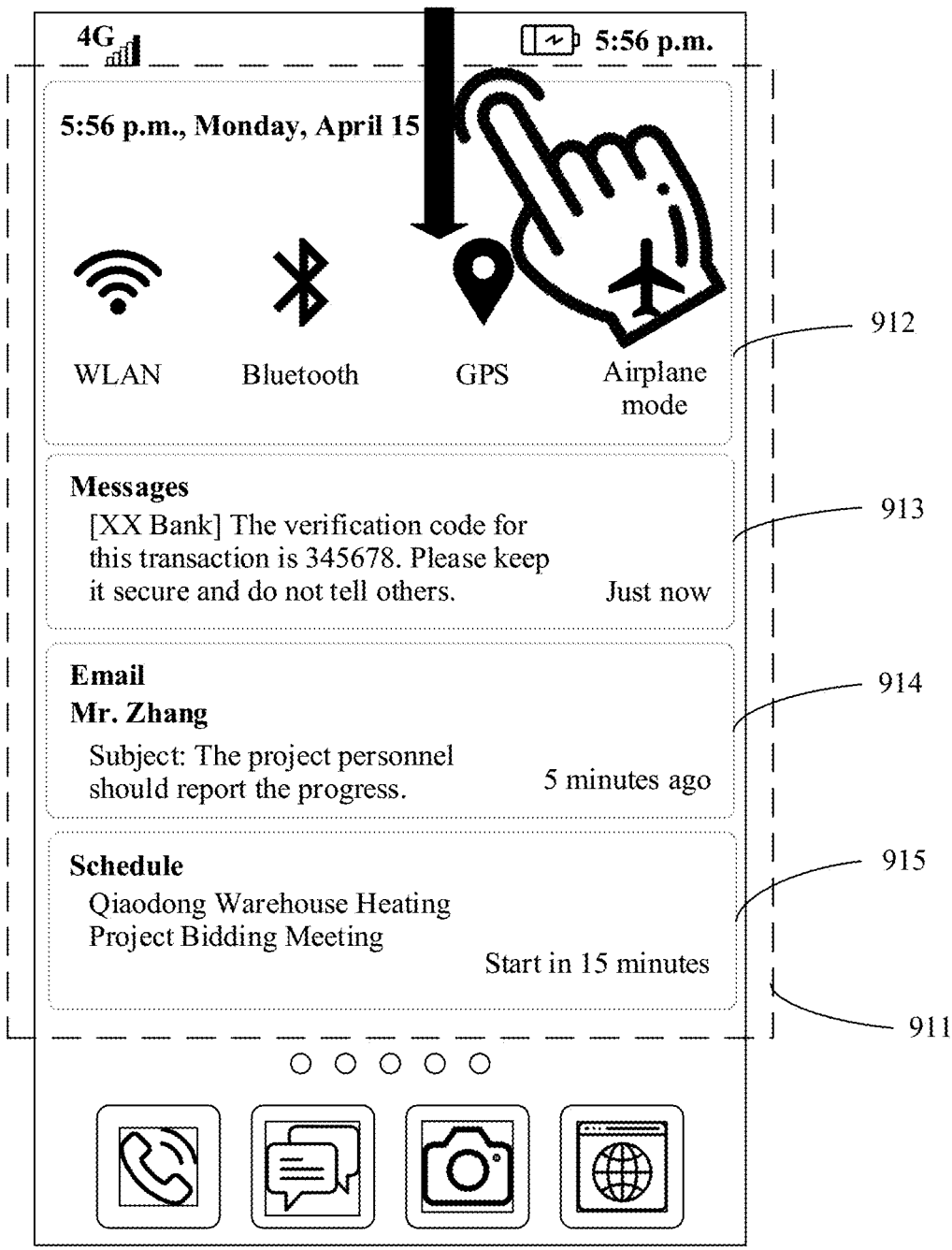
FIG. 9B is another schematic diagram of displaying a notification message according to an embodiment of this application.

FIG. 9B is another schematic diagram of displaying a notification message according to an embodiment of this application. When the user swipes down from a status bar, the electronic device displays a notification message list in response to the swipe operation of the user. A user interface 92 includes a notification message list 911. The notification message list 911 includes a shortcut menu 912, a notification message 913, a notification message 914, and a notification message 915.

The shortcut menu 912 may be used to display one or more operation controls, and the user may quickly enable or disable, through these operation controls, functions corresponding to the operation controls. The shortcut menu 912 includes a WLAN control, a Bluetooth control, a GPS control, and an airplane mode control. The WLAN control is used as an example. The user may enable or disable a WLAN function of the electronic device through the WLAN control.

The notification message list 911 alternatively includes the notification message 913, the notification message 914, and the notification message 915. The notification message 913 corresponds to a message application, the notification message 914 corresponds to a mailbox application, and the notification message 915 corresponds to a schedule application. One notification message may correspond to one application. It should be noted that the notification list may alternatively include a plurality of notification messages corresponding to one application.

In this embodiment of this application, similar to displaying a widget of an application, if an application is locked by an application lock, the electronic device displays a locking view over a notification message corresponding to the application.

Figure 10A:
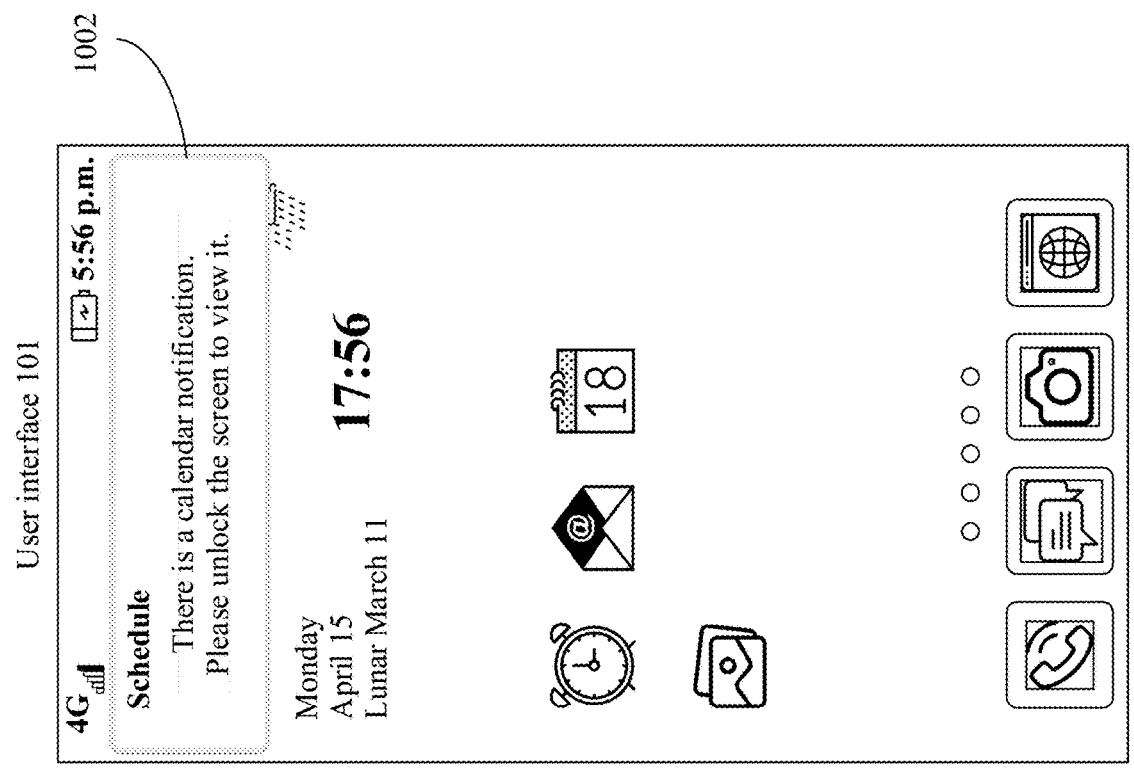
FIG. 10A is still another schematic diagram of displaying a notification message according to an embodiment of this application.
Figure 10A:
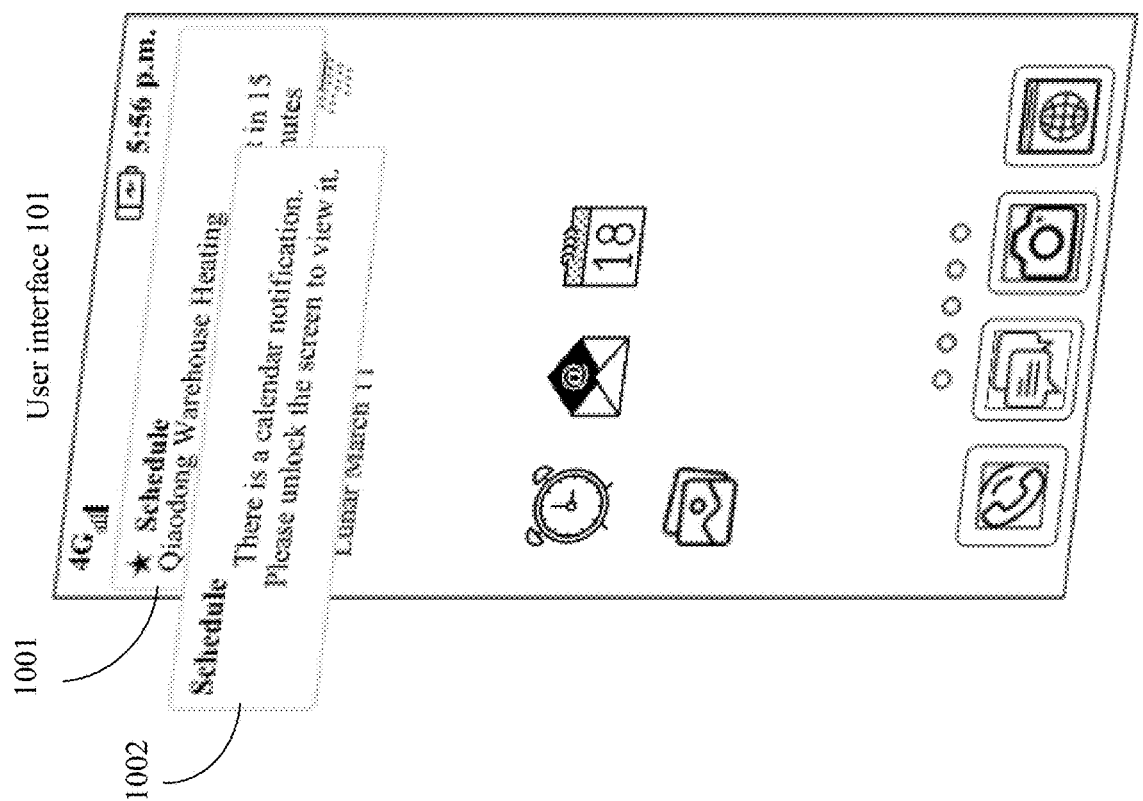

FIG. 10A is still another schematic diagram of displaying a notification message according to an embodiment of this application. A calendar application on the electronic device is locked by an application lock. In a user interface 101, the electronic device displays a locking view 1002 over a notification message 1001 of the calendar application.

Figure 10B:
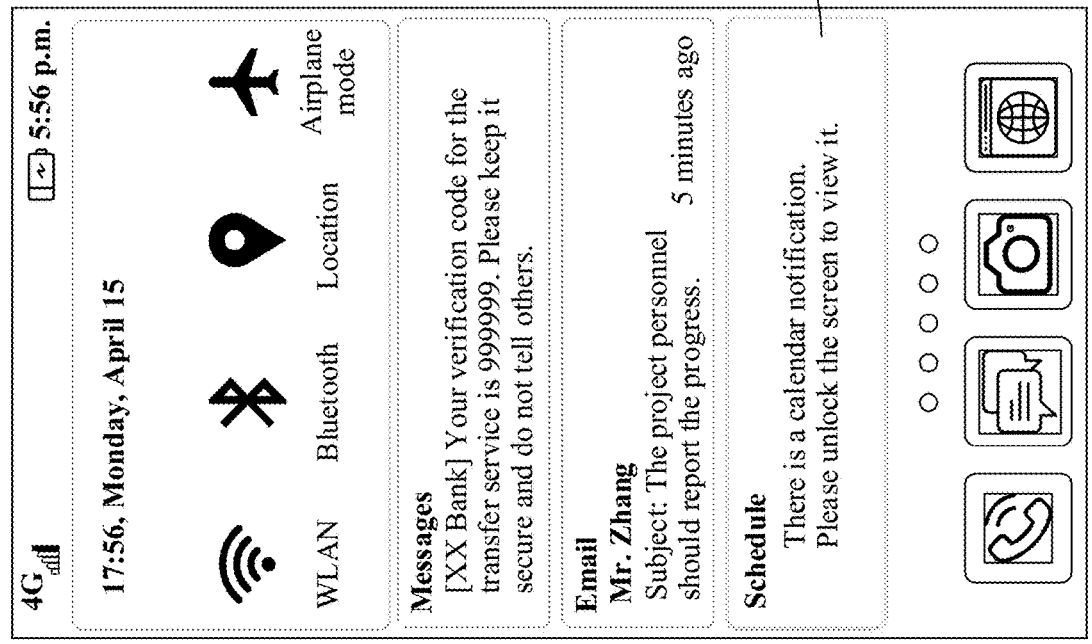
FIG. 10B is yet another schematic diagram of displaying a notification message according to an embodiment of this application.
Figure 10B:
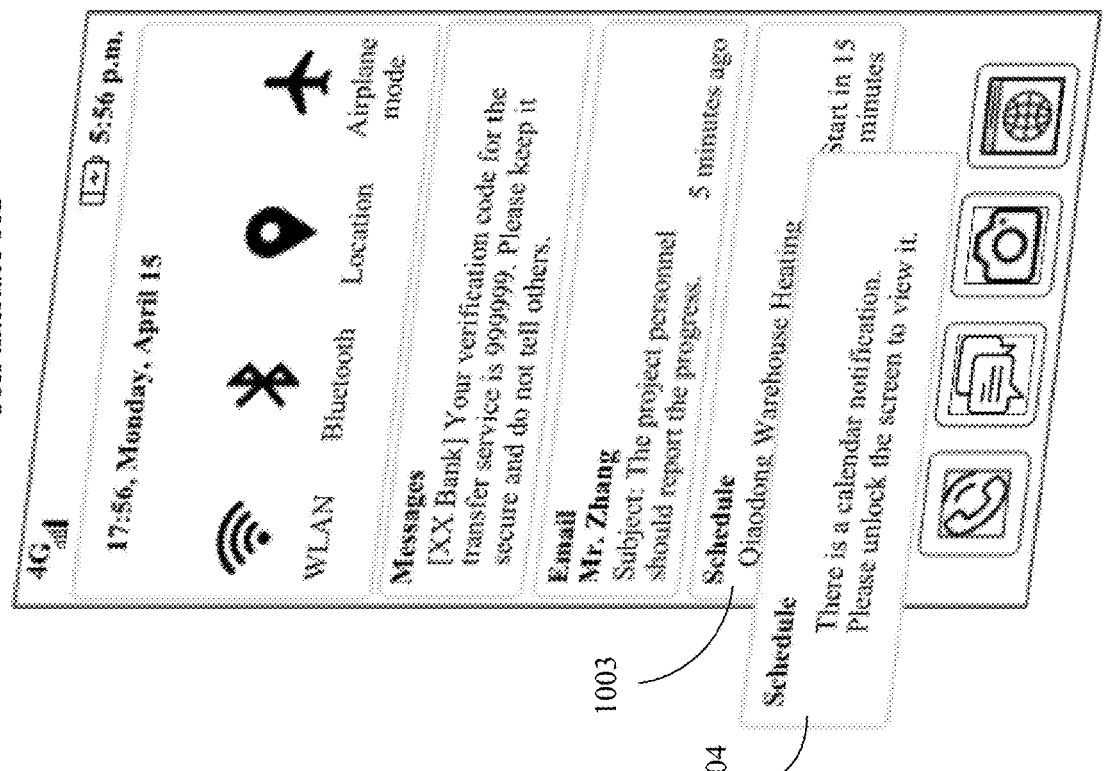

FIG. 10B is yet another schematic diagram of displaying a notification message according to an embodiment of this application. A calendar application on the electronic device is locked by an application lock. In a user interface 102, the electronic device displays a locking view 1004 over a notification message 1003 of the calendar application.

According to the method for displaying a notification message provided in this embodiment of this application, when an application is locked by an application lock, the electronic device may lock a notification message of the application. In this manner, an application information leak can be avoided, and security of application information can be improved.

It should be noted that, for a process in which the electronic device displays the notification message, refer to the process in which the electronic device displays the widget in the foregoing content. For example, in a possible implementation, when the electronic device detects a notification message display event, the electronic device determines whether the application corresponding to the notification message is protected by the application lock. For example, the notification message display event may include events such as receiving the notification message of the application, and detecting an operation for invoking a notification message list. If the electronic device determines that the application is protected by the application lock, the electronic device displays the notification message, and displays a locking view over the notification message. If the electronic device determines that the application is not protected by the application lock, the electronic device displays the notification message.

In another possible implementation, when the electronic device detects a notification message display event, the electronic device determines whether the application corresponding to the notification message is protected by the application lock. If the electronic device determines that the application is not protected by the application lock, the electronic device displays the notification message. If the electronic device determines that the application is protected by the application lock, the electronic device determines whether the application is in an unlocked state. If the application is in the unlocked state, the electronic device displays the notification message. If the application is in a locked state, the electronic device displays the notification message, and displays a locking view over the notification message.

The foregoing content describes a manner of displaying the notification message on the electronic device. The following describes a manner of unlocking the notification message on the electronic device. For the manner of unlocking the notification message on the electronic device, refer to the manner of unlocking the widget described in the foregoing content.

Figure 10C:
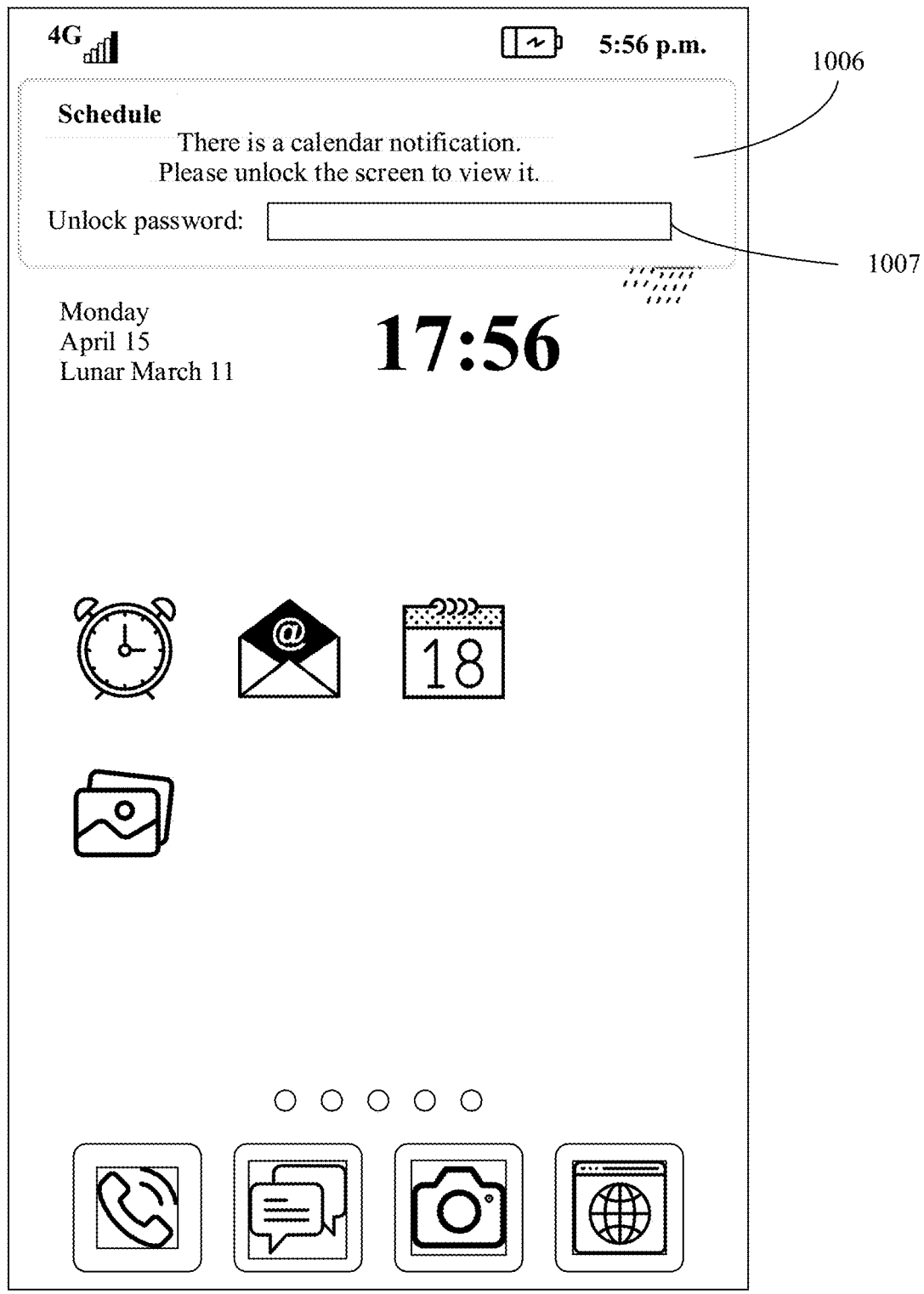
FIG. 10C is a schematic diagram of a user interface on which a locking view is displayed according to an embodiment of this application.

It should be noted that, in the current technology, the notification message displayed by the application may alternatively be a notification message in the locked state. First, the method for unlocking the notification message in the locked state in the current technology is described. FIG. 10E is a schematic diagram of some user interfaces according to an embodiment of this application. When the user performs an operation (for example, a touch and hold operation, a tap operation, a double-tap operation, or a force touch operation) on a notification message 1011, in response to the operation, the electronic device starts a message application corresponding to the notification message 1011, and switches from displaying a user interface 105 to displaying a user interface 106. The user interface 106 is a user interface in the message application, and the user interface includes prompt information 1012 and a fingerprint prompt 1013. The prompt information 1012 is used to prompt the user that the message application is protected by an application lock and the message application needs to be unlocked. The fingerprint indicator 1013 is used to indicate a screen area that is on the display and that receives a fingerprint of the user.

When the electronic device successfully matches fingerprint information entered by the user with prestored fingerprint information, the electronic device may switch from displaying the user interface 106 to displaying a user interface 107. The user interface 107 is a user interface in the message application, and message content may be displayed in the interface. It can be learned that in the current technology, if the user wants to view protected application information in a notification message, the user needs to switch to an application to unlock the application. After viewing, the user needs to perform an additional operation to return to the home screen. Therefore, user operations are complex, and user experience is poor.

The following describes a method for unlocking a locking view of the notification message according to an embodiment of this application.

In some embodiments, the locking view over the notification message includes a password input box. FIG. 10C is a schematic diagram of displaying a locking view according to an embodiment of this application. As shown in a user interface 103, a locking view 1006 is displayed over the notification message. The locking view 1006 includes a password input box 1007. The user may enter an unlock password through the password input box 1007. When the electronic device determines that the unlock password entered by the user is the same as a pre-stored unlock password, the electronic device no longer displays the locking view 1006.

Figure 10D:
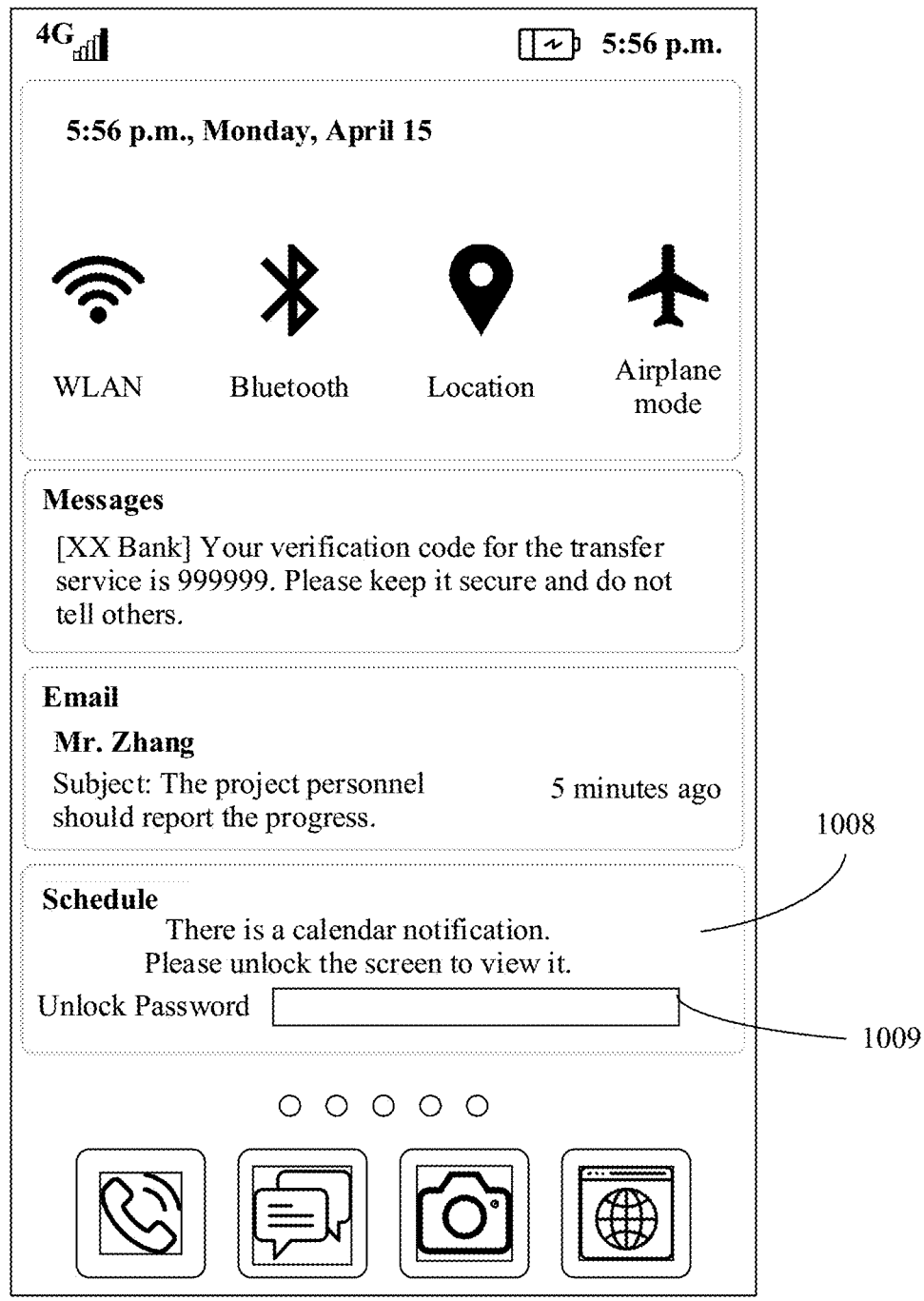
FIG. 10D is another schematic diagram of a user interface on which a locking view is displayed according to an embodiment of this application.
Figure 10E:
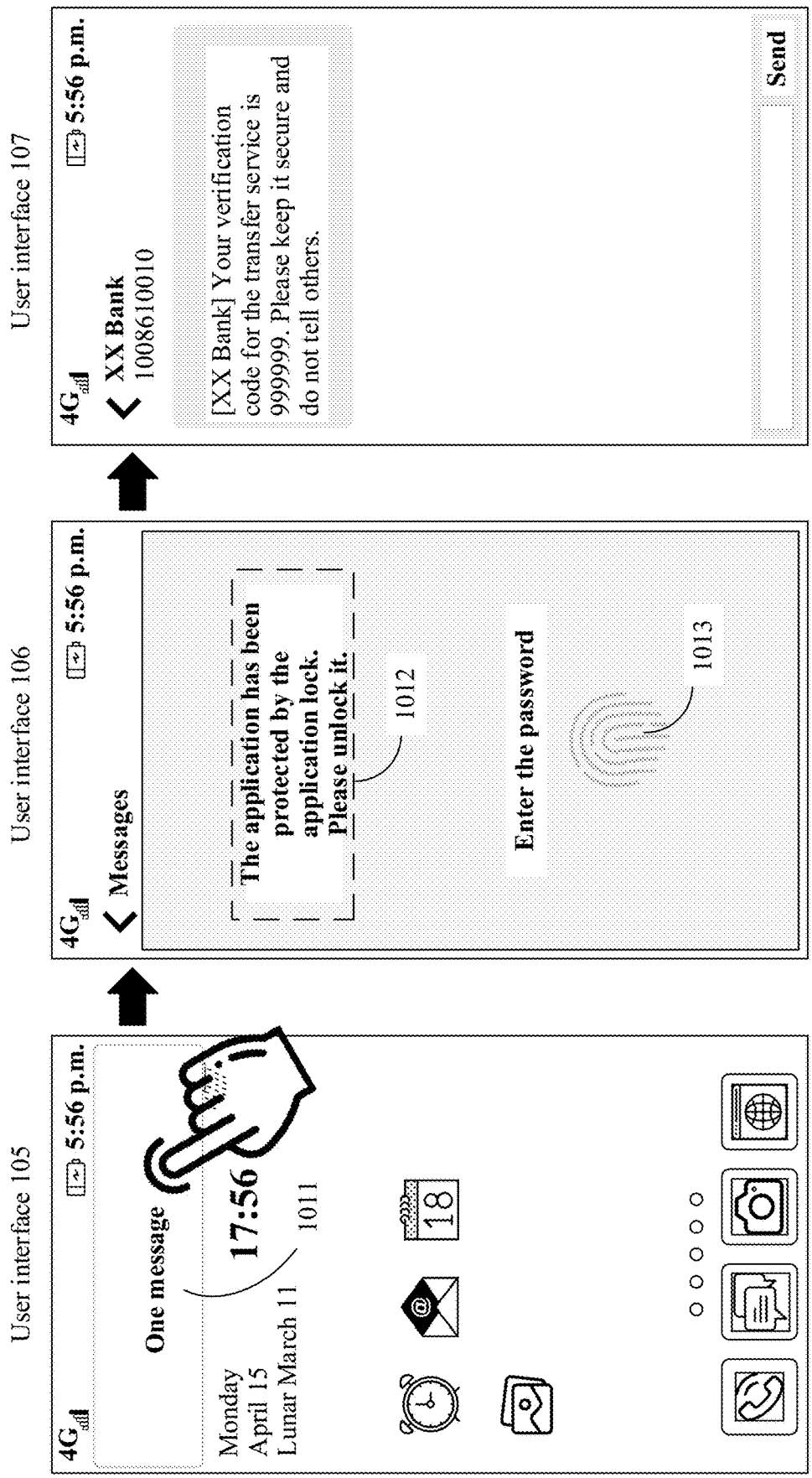
FIG. 10E is a schematic diagram of some user interfaces according to an embodiment of this application.

FIG. 10D is another schematic diagram of displaying a locking view according to an embodiment of this application. As shown in a user interface 104, a notification message list includes a locking view 1008. The locking view 1008 includes a password input box 1009. The user may enter an unlock password through the password input box 1009. When the electronic device determines that the unlock password entered by the user is the same as a pre-stored unlock password, the electronic device no longer displays the locking view 1008.

In a possible implementation, the locking view does not include the password input box. When the user performs an operation (for example, a tap operation, a touch and hold operation, or a force touch (force touch) operation) on the locking view, the electronic device displays the password input box in the locking view in response to the operation. For example, the electronic device displays the user interface 101. When the user performs the operation on the locking view 1002, the electronic device displays the user interface 103 in response to the operation. In another example, the electronic device displays the user interface 102. When the user performs the operation on the locking view 1004, the electronic device displays the user interface 104 in response to the operation.

In some other embodiments, the electronic device may alternatively unlock the locking view in an in-screen fingerprint-based unlocking manner. For example, the electronic device receives a notification message of a calendar application, the calendar application is locked by an application lock, and the electronic device displays the user interface 101. The electronic device detects an operation (for example, a touch and hold operation or a force touch operation) performed by the user on the locking view 1002, and the electronic device recognizes fingerprint information of the user in response to the operation. If the recognized fingerprint information matches fingerprint information prestored in the electronic device, the electronic device unlocks the locking view 1002 and no longer displays the locking view.

In another example, the electronic device detects an operation entered by the user for invoking a notification message list, and the electronic device displays the user interface 102 in response to the operation. The electronic device detects an operation (for example, a touch and hold operation or a force touch operation) performed by the user on the locking view 1004, and the electronic device recognizes fingerprint information of the user in response to the operation. If the recognized fingerprint information matches fingerprint information prestored in the electronic device, the electronic device unlocks the locking view 1004 and no longer displays the locking view.

In some other embodiments, the electronic device may further unlock the locking view through fingerprint-based unlocking in a specific area. For example, the electronic device receives a notification message of a calendar application, the calendar application is locked by an application lock, and the electronic device displays the user interface 101. If the electronic device detects a fingerprint-based unlock operation of the user in the specific area, the electronic device recognizes fingerprint information of the user in response to the operation. If the recognized fingerprint information matches fingerprint information prestored in the electronic device, the electronic device unlocks a locking view and no longer displays the locking view.

In another example, the electronic device detects an operation entered by the user for invoking a notification message list, and the electronic device displays the user interface 102 in response to the operation. If the electronic device detects a fingerprint-based unlock operation of the user in the specific area, the electronic device recognizes fingerprint information of the user in response to the operation. If the recognized fingerprint information matches fingerprint information prestored in the electronic device, the electronic device may unlock all locking views, or the electronic device unlocks a locking view on a currently displayed user interface, or the electronic device unlocks a locking view that is last touched by the user.

In some other embodiments, the electronic device may alternatively unlock a locking view through face-based unlocking. For example, the electronic device receives a notification message of a calendar application, the calendar application is locked by an application lock, and the electronic device displays the user interface 101. If the face information that is recognized by the electronic device based on a user image obtained by a camera matches prestored face information, the electronic device unlocks a locking view and no longer displays the locking view.

In another example, the electronic device detects an operation entered by the user for invoking a notification message list, and the electronic device displays the user interface 102 in response to the operation. The electronic device may collect face information of the user by using a camera. The electronic device may further collect an eyeball location of the user by using the camera, determine a current gaze location of human eyes, and then determine, based on the gaze location, a notification message corresponding to the gaze location. If the face information recognized by the electronic device matches prestored face information, the electronic device unlocks a locking view over the notification message corresponding to the gaze location.

The foregoing describes a manner in which the electronic device unlocks the locking view in the notification message. The following describes a process in which the electronic device unlocks the locking view.

Figure 11:
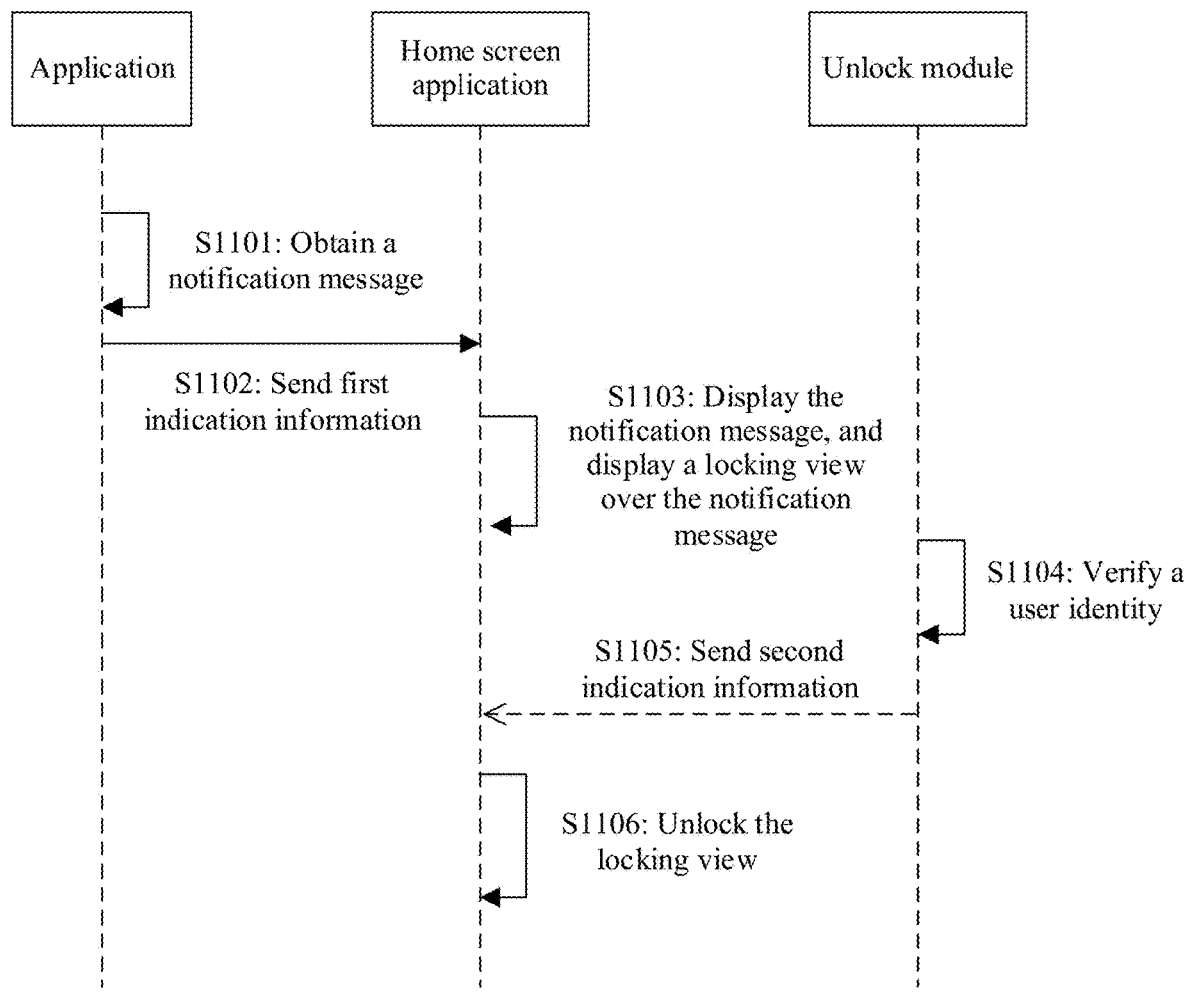
FIG. 11 is a flowchart of another method for unlocking a locking view according to an embodiment of this application.

FIG. 11 is a flowchart of a method for unlocking a locking view according to an embodiment of this application. The method is applied to the electronic device described in the foregoing content, and the method includes the following steps.

S1101: An application obtains a notification message.

S1102: The application sends first indication information to a home screen application, where the first indication information is used to indicate the home screen application to display a notification message.

S1103: After the home screen application receives the first indication information, the home screen application displays the notification message, and displays a locking view over the notification message.

Optionally, the home screen application determines that the application is protected by an application lock, and displays the locking view over the notification message.

Optionally, the home screen application determines that the application is protected by an application lock and the application is in a locked state, and displays the locking view over the notification message.

S1104: The unlock module detects an unlock operation, and verifies a user identity.

It should be noted that for an implementation of this step, refer to the descriptions of step S802 in the foregoing content. Details are not described herein again.

S1105: The unlock module successfully verifies the user identity, and sends second indication information to the home screen application.

The second indication information is used to indicate that user identity verification succeeds. In a possible implementation, the indication information may include location information of the locking view. The location information may be determined by the unlock operation entered by the user. For example, the location information may be determined by an operation performed by the user for the locking view, and the location information may be information about a location at which the user performs the operation for the locking view. For example, the location information may be determined by a gaze operation of the user, and the location information may be a gaze location determined based on a collected eyeball location of the user.

S1106: The home screen application unlocks the locking view based on the second indication information.

The home screen application unlocks the locking view. To be specific, the home screen application no longer displays the locking view over the notification message. The user can directly view content in the notification message. In a possible implementation, if the second indication message includes location information, the home screen application unlocks a locking view over a notification message corresponding to the location message.

In this manner, the user may directly unlock the locked notification message on the home screen. Different from viewing information after switching to the application to unlock the application in the current technology, in this embodiment of this application, user operations can be reduced, and operation convenience can be improved. In addition, the electronic device may unlock a specific notification message based on unlock location information, and this further improves security of application information.

The foregoing content describes manners in which the electronic device locks and unlocks the notification message of the application in embodiments of this application. In this embodiment of this application, the electronic device may alternatively lock and unlock a historical task interface. In this embodiment of this application, similar to displaying a widget of an application, if an application is locked by an application lock, the electronic device displays a locking view over an application interface of the application on a historical task interface.

The user may invoke the historical task interface in a plurality of manners. For example, the user may perform an operation (for example, a tap operation or a touch and hold operation) on a button in the invoked historical task interface, and the electronic device displays the historical task interface in response to the operation. For example, the user may swipe upward from the bottom of the display of the electronic device, and the electronic device displays the historical task interface in response to the swipe operation. The manner of invoking the historical task interface by the user is not limited in embodiments of this application.

Figure 12:
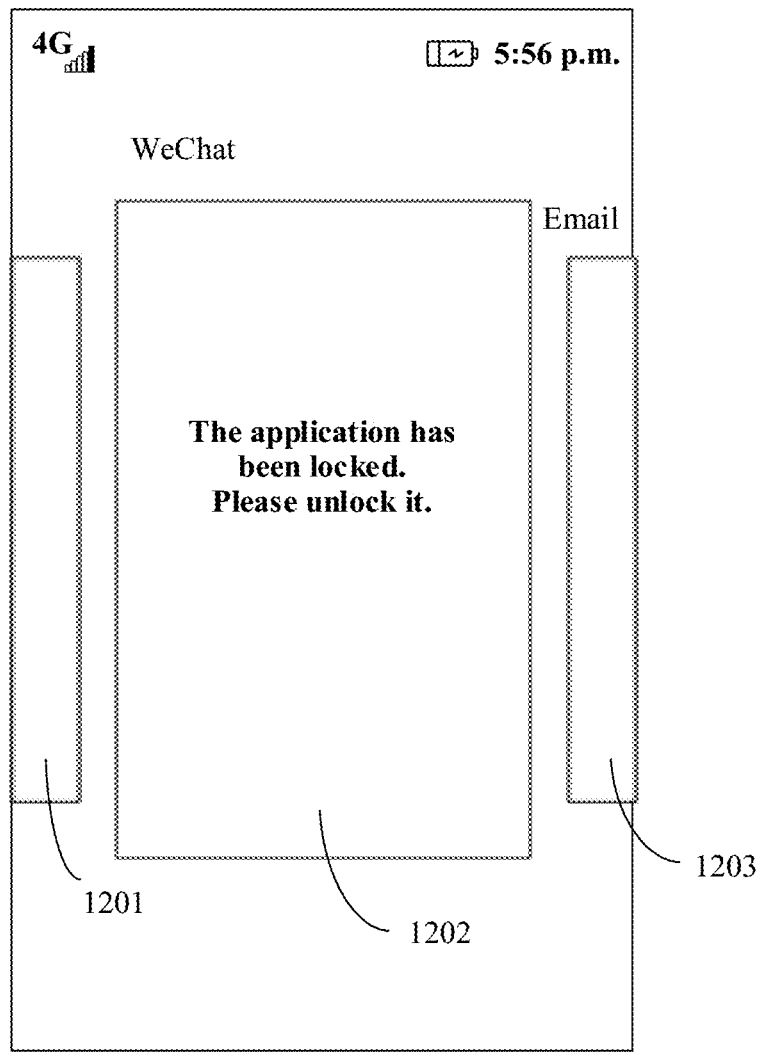
FIG. 12 is a schematic diagram of a historical task interface according to an embodiment of this application.

FIG. 12 is a schematic diagram of a historical task interface according to an embodiment of this application. A user interface 121 includes a contact application interface 1201, a WeChat application interface 1201, and a mailbox application interface 1203. Only parts of the contact application interface 1201 and the mailbox application interface 1203 are displayed. When the user swipes up an application interface (for example, the mailbox application interface 1203) on the historical task interface, in response to the swipe-up operation, the electronic device may no longer display the mailbox application interface 1203, and end running of a mailbox application. The user may further swipe left or right the user interface 121 to browse an application interface of another application on the historical task interface.

In this example, the WeChat application on the electronic device is protected by an application lock, and the electronic device displays a locking view over the WeChat application interface 1201. According to the method for displaying the historical task interface provided in this embodiment of this application, when an application is locked by an application lock, the electronic device may lock an application interface of the application on the historical task interface. In this manner, an application information leak can be avoided, and security of application information can be improved.

In some embodiments, when the electronic device detects an event for invoking the historical task interface, the electronic device determines whether a running application is protected by an application lock. If the electronic device determines that the running application is protected by the application lock, the electronic device displays a locking view over an application interface of the application. If the electronic device determines that the running application is not protected by the application lock, the electronic device displays an application interface.

In some other embodiments, when the electronic device detects an event for invoking the historical task interface, the electronic device determines whether a running application is protected by an application lock. If the electronic device determines that the running application is not protected by the application lock, the electronic device displays an application interface of the application. If the electronic device determines that the running application is protected by the application lock, the electronic device determines whether the application is in an unlocked state. If the application is in the unlocked state, the electronic device displays an application interface of the application. If the application is in a locked state, the electronic device displays a locking view over an application interface of the application. For a manner of determining whether the application is in the unlocked state, refer to the descriptions in the foregoing content. Details are not described herein again.

In addition, similar to the manner of unlocking the locking view described above, the user may unlock a locking view on a user interface in a plurality of manners. The unlocking manners include but are not limited to password unlocking, pattern track-based unlocking, fingerprint-based unlocking, voiceprint-based unlocking, face-based unlocking, iris-based unlocking, and the like. After user identity verification succeeds, the electronic device no longer displays the locking view, and displays a covered application interface. The user can view content on the application interface. According to the unlocking manner provided in this embodiment of this application, the user does not need to enter the application to unlock the application and then view information, so that the user can conveniently view the application interface. According to embodiments of this application, user operations can be reduced, operation convenience can be improved, and user experience can be improved.

In some application scenarios, the user may wake up an application on the electronic device through a voice assistant, to obtain application information in the application. For example, when the user may input a voice instruction "what is scheduled today", in response to the voice instruction, the electronic device may obtain a schedule of a current day by querying a calendar application, and broadcast the schedule in a voice form.

In this embodiment of this application, before displaying or broadcasting the application information corresponding to the voice instruction, the electronic device may determine whether the application is protected by an application lock. If the application is not protected by the application lock, the electronic device may display or broadcast the application information corresponding to the voice instruction. If the application is protected by the application lock, the electronic device does not display or broadcast the application information. Optionally, the electronic device may remind the user that the application is protected by the application lock. The reminding manner may include a voice form and/or a text form.

Figure 13A:
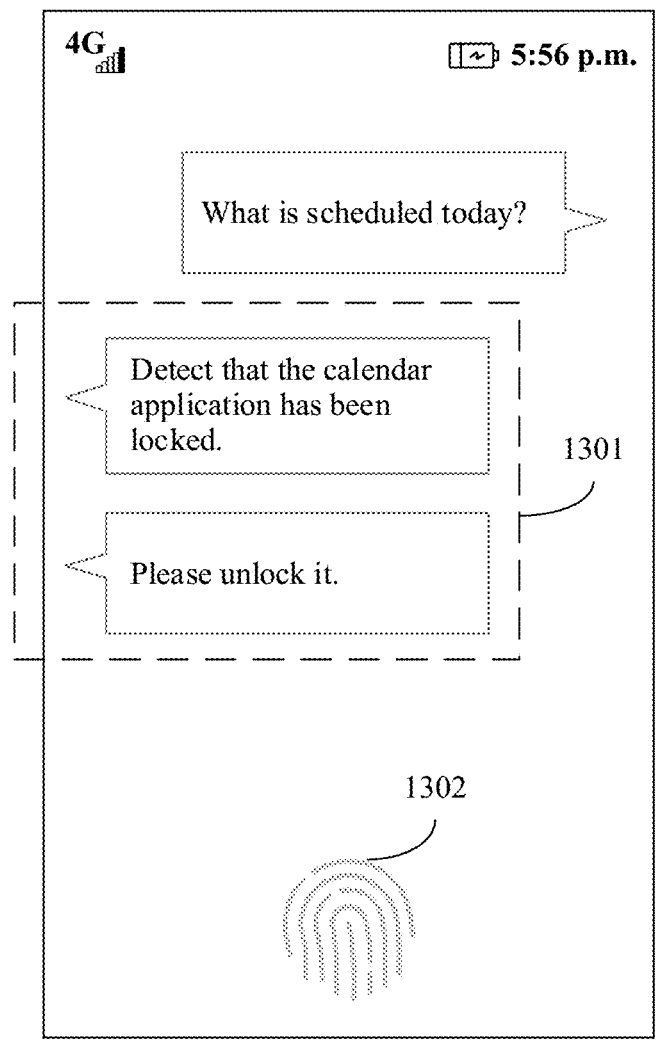
FIG. 13A is a schematic diagram of a display interface according to an embodiment of this application.

For example, FIG. 13A is a schematic diagram of a display interface according to an embodiment of this application. As shown in the figure, a user interface 131 includes prompt information 1301 and a fingerprint prompt 1302. When detecting a voice instruction "what is scheduled today" of the user, in response to the voice instruction, the electronic device determines whether a calendar application is protected by an application lock. In this example, the calendar application is protected by the application lock. When the electronic device determines that the calendar application is protected by the application lock, the electronic device displays the prompt information 1301 and the fingerprint prompt 1302. The prompt information 1301 is used to notify the user that the calendar application is protected by the application lock and the user needs to unlock the calendar application to view internal information of the application. The fingerprint indicator 1302 is used to indicate a screen area that is on the display and that receives a fingerprint of the user. In addition, the electronic device may broadcast content of the prompt message 1301 while displaying the prompt message 1301.

In this embodiment, if an application is protected by an application lock, when a voice assistant of the electronic device accesses application information, user identity verification needs to be performed. In this way, security of the application information can be improved.

Figure 13B:
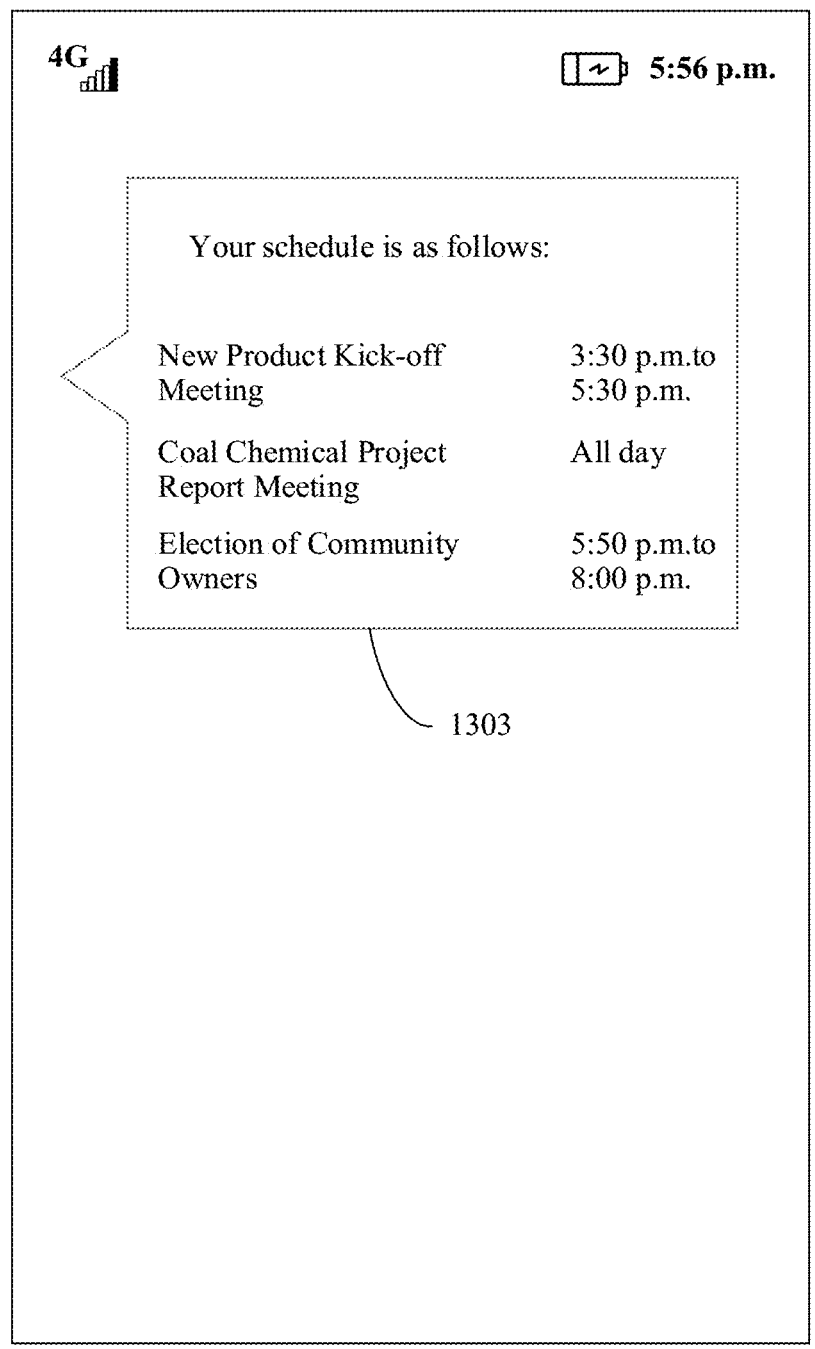
FIG. 13B is a schematic diagram of another display interface according to an embodiment of this application.

When the electronic device successfully verifies a user identity (for example, successfully matches fingerprint information entered by the user with prestored fingerprint information), the electronic device may switch from displaying the user interface 131 to displaying a user interface 132. FIG. 13B is a schematic diagram of another display interface according to an embodiment of this application. The user interface 132 includes indication information 1303. The indication information 1303 is used to indicate trip information prestored by the user. Specifically, when the electronic device successfully matches fingerprint information entered by the user with prestored fingerprint information, the electronic device queries a calendar application for a schedule of a current day, and displays the schedule on the display. In addition, the electronic device may broadcast content of the prompt message 1303 while displaying the prompt message 1303.

It should be noted that, in the foregoing content, fingerprint-based unlocking is used as an example to describe a manner of unlocking application information. The electronic device may further use another unlocking manner to unlock the application information. The unlocking manner includes but is not limited to password unlocking, pattern track-based unlocking, voiceprint-based unlocking, face-based unlocking, iris-based unlocking, and the like. After user identity verification succeeds, the electronic device displays application information corresponding to a voice instruction. According to the unlocking manner provided in embodiments of this application, the user does not need to enter the application to unlock the application and then view information, so that the user can conveniently view the application information. According to embodiments of this application, user operations can be reduced, operation convenience can be improved, and user experience can be improved.

All or some of the foregoing embodiments may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. A computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing embodiments are merely intended for describing the technical solutions of this application, rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
    detecting, by an electronic device, an update event of first application information, wherein the first application information is a widget or a notification message, and the first application information corresponds to a first application in a correspondence; and
    displaying, by the electronic device, a locking view over the first application information when the electronic device determines, in response to the update event of the first application information, that the first application is locked by an application lock, wherein displaying, by the electronic device, the locking view over the first application information when the electronic device determines that the first application is locked by the application lock comprises displaying, by the electronic device, the locking view over the first application information when the electronic device determines that the first application is locked by the application lock and the first application is in a locked state, wherein determining, by the electronic device, that the first application is in the locked state comprises:
    determining, by the electronic device, that a time between a current moment and a moment at which the application lock of the first application is successfully unlocked most recently exceeds a first preset time period, and
    performing, by the electronic device, one or more items of screen locking after determining that the application lock of the first application is successfully unlocked most recently.

2. The method according to claim 1, wherein:
    the first application information is the widget, and the update event of the first application information comprises: the electronic device switches from displaying another interface to displaying a home screen, the electronic device switches from a screen-off state to displaying the home screen, or the first application information is added to one or more items on the home screen, wherein the another interface is a user interface other than the home screen in user interfaces displayed by the electronic device; or
    the first application information is the notification message, and the update event of the first application information comprises: the first application receives the notification message, a current time reaches a preset display time of the notification message, or one or more items in a notification message list are invoked.

3. The method according to claim 1, wherein displaying, by the electronic device, the locking view over the first application information when the electronic device determines that the first application is locked by the application lock further comprises:
    determining, by the electronic device, that the time between the current moment and a moment at which a user interface of the first application is most recently displayed exceeds a second preset time period.

4. The method according to claim 1, wherein displaying, by the electronic device, the locking view over the first application information when the electronic device determines that the first application is locked by the application lock comprises:
    displaying, by the electronic device, the locking view over the first application information when the electronic device determines that the first application is locked by the application lock and data in the first application information is in an unlocked state.

5. The method according to claim 1, wherein displaying, by the electronic device, the locking view over the first application information when the electronic device determines that the first application is locked by the application lock comprises:
    displaying, by the electronic device, the locking view over data in the locked state in the first application information when the electronic device determines that the first application is locked by the application lock and data in the first application information comprises the data in the locked state.

6. The method according to claim 1, wherein displaying, by the electronic device, the locking view over the first application information when the electronic device determines that the first application is locked by the application lock comprises:
    displaying, by the electronic device, the locking view over the first application information when the electronic device determines that the first application is locked by the application lock, the first application is in the locked state, and data in the first application information is in an unlocked state.

7. The method according to claim 1, further comprising:
    detecting, by the electronic device, an operation for the locking view;
    displaying, by the electronic device, a password input box in response to the operation for the locking view, wherein the password input box is usable to receive an unlock password or an unlock track;
    receiving, by the electronic device, an entered unlock password or unlock track; and
    unlocking, by the electronic device, the locking view when the electronic device determines that the unlock password is the same as a pre-stored unlock password or the unlock track is the same as a pre-stored unlock track.

8. The method according to claim 1, further comprising:
    detecting, by the electronic device, an operation for the locking view;
    obtaining, by the electronic device, physiological data of a user in response to the operation for the locking view, wherein the physiological data of the user comprises one or more of fingerprint information, voiceprint information, iris information, or face information; and
    unlocking, by the electronic device, the locking view when the electronic device determines that the physiological data of the user matches pre-stored physiological data.

9. The method according to claim 1, wherein the first application information comprises a plurality of pieces of first application information, the plurality of pieces of first application information comprises a piece of second application information and a piece of third application information, and the method further comprises:
- detecting, by the electronic device, a touch operation for a target locking view, wherein the target locking view is one of a locking view over the piece of second application information and a locking view over the piece of third application information;
- obtaining, by the electronic device, fingerprint information of a user through a screen area in which the target locking view is located; and
- unlocking, by the electronic device, the locking view over the piece of second application information when the electronic device determines that the fingerprint information matches pre-stored fingerprint information and the target locking view is the locking view over the piece of second application information; and
- unlocking, by the electronic device, the locking view over the piece of third application information when the electronic device determines that the fingerprint information matches pre-stored fingerprint information and the target locking view is the locking view over the piece of third application information.

10. The method according to claim 1, wherein the first application information comprises a plurality of pieces of first application information, and the plurality of pieces of first application information comprises a piece of fourth application information and a piece of fifth application information, and the method further comprises:
- collecting, by the electronic device, an eyeball location and face information of a user;
- determining, by the electronic device, a gaze location of human eyes based on the eyeball location;
- unlocking, by the electronic device, a locking view over the piece of fourth application information when the electronic device determines that the face information matches pre-stored face information and the gaze location corresponds to the locking view over the piece of fourth application information; and
- unlocking, by the electronic device, a locking view over the piece of fifth application information when the electronic device determines that the face information matches pre-stored face information and the gaze location corresponds to the locking view over the piece of fifth application information.

11. An electronic device, comprising:
- one or more processors and a memory with program code stored thereon, wherein the memory is coupled to the one or more processors, and the one or more processors invoke the program code to enable the electronic device to perform the following operations:
- detecting an update event of first application information, wherein the first application information is a widget or a notification message, and the first application information corresponds to a first application in a correspondence; and
- displaying a locking view over the first application information when the electronic device determines, in response to the update event of the first application information, that the first application is locked by an application lock, wherein displaying, by the electronic device, the locking view over the first application information when the electronic device determines that the first application is locked by the application lock comprises displaying, by the electronic device, the locking view over the first application information when the electronic device determines that the first application is locked by the application lock and the first application is in a locked state, wherein determining, by the electronic device, that the first application is in the locked state comprises:
- determining, by the electronic device, that a time between a current moment and a moment at which the application lock of the first application is successfully unlocked most recently exceeds a first preset time period, and
- performing, by the electronic device, one or more items of screen locking after determining that the application lock of the first application is successfully unlocked most recently.

12. The electronic device according to claim 11, wherein:
the first application information is the widget, and the update event of the first application information comprises: the electronic device switches from displaying another interface to displaying a home screen, the electronic device switches from a screen-off state to displaying the home screen, or the first application information is added to one or more items on the home screen, wherein the another interface is a user interface other than the home screen in user interfaces displayed by the electronic device; or
the first application information is the notification message, and the update event of the first application information comprises: the first application receives the notification message, a current time reaches preset display time of the notification message, or one or more items in a notification message list are invoked.

13. The electronic device according to claim 11, wherein determining that the first application is in the locked state further comprises:
- determining that a time between the current moment and a moment at which a user interface of the first application is most recently displayed exceeds a second preset time period.

14. The electronic device according to claim 11, wherein the one or more processors invoke the program code to enable the electronic device to perform the following operations:
- displaying the locking view over the first application information when the electronic device determines that the first application is locked by the application lock and data in the first application information is in an unlocked state.

15. The electronic device according to claim 11, wherein the one or more processors invoke the program code to enable the electronic device to perform the following operations:
- displaying the locking view over data in the locked state in the first application information when the electronic device determines that the first application is locked by the application lock and data in the first application information comprises the data in the locked state.

16. The electronic device according to claim 11, wherein the one or more processors invoke the program code to enable the electronic device to perform the following operations:
- displaying the locking view over the first application information when the electronic device determines that the first application is locked by the application lock, the first application is in the locked state, and data in the first application information is in an unlocked state.

17. The electronic device according to claim 11, wherein the one or more processors invoke the program code to enable the electronic device to further perform the following operations:
- detecting an operation for the locking view;
- displaying a password input box in response to the operation for the locking view, wherein the password input box is usable to receive an unlock password or an unlock track;
- receiving an entered unlock password or unlock track; and
- unlocking the locking view when the electronic device determines that the unlock password is the same as a pre-stored unlock password or the unlock track is the same as a pre- stored unlock track.

18. The electronic device according to claim 11, wherein the one or more processors invoke the program code to enable the electronic device to further perform the following operations:
- detecting an operation for the locking view;
- obtaining physiological data of a user in response to the operation for the locking view, wherein the physiological data of the user comprises one or more of fingerprint information, voiceprint information, iris information, or face information; and
- unlocking the locking view when the electronic device determines that the physiological data of the user matches pre-stored physiological data.

19. The electronic device according to claim 11, wherein the first application information comprises a plurality of pieces of first application information, the plurality of pieces of first application information comprises a piece of second application information and a piece of third application information, and the one or more processors invoke the program code to enable the electronic device to further perform the following operations:
- detecting a touch operation for a target locking view, wherein the target locking view is one of a locking view over the piece of second application information or a locking view over the piece of third application information;
- obtaining fingerprint information of a user through a screen area in which the target locking view is located; and
- unlocking the locking view over the piece of second application information when the electronic device determines that the fingerprint information matches pre-stored fingerprint information and the target locking view is the locking view over the piece of second application information; and
- unlocking the locking view over the piece of third application information when the electronic device determines that the fingerprint information matches pre-stored fingerprint information and the target locking view is the locking view over the piece of third application information.

20. The electronic device according to claim 11, wherein the first application information comprises a plurality of pieces of first application information, the plurality of pieces of first application information comprises a piece of fourth application information and a piece of fifth application information, and the one or more processors invoke the program code to enable the electronic device to further perform the following operations:
- collecting an eyeball location and face information of a user;
- determining a gaze location of human eyes based on the eyeball location; and
- unlocking a locking view over the piece of fourth application information when the electronic device determines that the face information matches pre-stored face information and the gaze location corresponds to the locking view over the piece of fourth application information; and
- unlocking a locking view over the piece of fifth application information when the electronic device determines that the face information matches pre-stored face information and the gaze location corresponds to the locking view over the piece of fifth application information.

* * * * *